US012613451B2

(12) United States Patent
You et al.

(10) Patent No.: US 12,613,451 B2
(45) Date of Patent: Apr. 28, 2026

(54) CAMERA MODULE AND ELECTRONIC DEVICE

(71) Applicant: Huawei Technologies Co., Ltd., Shenzhen (CN)

(72) Inventors: Zhongcheng You, Dongguan (CN); Dengfeng Li, Dongguan (CN); Haibo Wan, Dongguan (CN); Gang Wang, Wuhan (CN); Shixin Qin, Dongguan (CN); Xiaohan Liu, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 186 days.

(21) Appl. No.: 18/270,608

(22) PCT Filed: Dec. 13, 2021

(86) PCT No.: PCT/CN2021/137571
§ 371 (c)(1),
(2) Date: Jun. 30, 2023

(87) PCT Pub. No.: WO2022/143135
PCT Pub. Date: Jul. 7, 2022

(65) Prior Publication Data
US 2024/0061317 A1 Feb. 22, 2024

(30) Foreign Application Priority Data

Jan. 4, 2021 (CN) .......................... 202110004385.9
Mar. 30, 2021 (CN) .......................... 202110341343.4

(51) Int. Cl.
*G03B 5/00* (2021.01)
*G02B 27/64* (2006.01)
*G03B 13/36* (2021.01)

(52) U.S. Cl.
CPC ............. *G03B 5/00* (2013.01); *G02B 27/646* (2013.01); *G03B 13/36* (2013.01); *G03B 2205/0076* (2013.01)

(58) Field of Classification Search
CPC . G03B 9/02; G03B 9/06; G03B 30/00; G03B 2205/0069
See application file for complete search history.

(56) References Cited

U.S. PATENT DOCUMENTS 5,955,806 A * 9/1999 Devenyi ................ H02K 26/00
310/67 R
9,807,312 B1 * 10/2017 Kim ........................ H04N 23/54
(Continued)

FOREIGN PATENT DOCUMENTS

CN 204556937 U 8/2015
CN 207937737 U 10/2018
(Continued)

*Primary Examiner* — Noam Reisner
(74) *Attorney, Agent, or Firm* — Slater Matsil, LLP

(57) ABSTRACT

This application provides a camera module and an electronic device, and relates to the field of electronic device technologies. The camera module includes an optical camera lens, a variable aperture, and an SMA motor. The variable aperture has an aperture hole whose size is adjustable. The SMA motor includes a first carrier, a base, and an SMA drive assembly. The optical camera lens is fastened to the first carrier. The SMA drive assembly is connected between the first carrier and the base. The SMA drive assembly is configured to drive the first carrier, the optical camera lens, and the variable aperture to move together relative to the base, so as to implement automatic focusing and/or optical image stabilization.

20 Claims, 34 Drawing Sheets

(56) References Cited

U.S. PATENT DOCUMENTS

| | | | |
|---|---|---|---|
| 2014/0028906 A1* | 1/2014 | Chen | G03B 5/00 |
| | | | 348/375 |
| 2016/0223780 A1* | 8/2016 | Baek | H02K 37/12 |
| 2017/0357144 A1 | 12/2017 | Kim et al. | |
| 2020/0357838 A1 | 11/2020 | Fukuyama et al. | |
| 2021/0109305 A1* | 4/2021 | Hu | G02B 7/00 |
| 2021/0124144 A1* | 4/2021 | Chen | G02B 7/09 |

FOREIGN PATENT DOCUMENTS

| | | |
|---|---|---|
| CN | 209400775 U | 9/2019 |
| CN | 110602367 A | 12/2019 |
| CN | 210442607 U | 5/2020 |
| CN | 210534499 U | 5/2020 |
| CN | 212115444 U | 12/2020 |

* cited by examiner

31

31a

312

311

31b

327

328

327

331

331b

331c

331c

331a

331b

CAMERA MODULE AND ELECTRONIC DEVICE

CROSS REFERENCE TO RELATED APPLICATIONS

This application is a national stage of International Application No. PCT/CN2021/137571, filed on Dec. 13, 2021, which claims priority to Chinese Patent Application No. 202110004385.9, filed on Jan. 4, 2021 and Chinese Patent Application No. 202110341343.4, filed on Mar. 30, 2021. All of the aforementioned patent applications are hereby incorporated by reference in their entireties.

TECHNICAL FIELD

This application relates to the field of electronic device technologies, and in particular, to a camera module and an electronic device.

BACKGROUND

At present, electronic devices such as a mobile phone, a tablet computer, and a personal computer (personal computer, PC) need to maintain constant shooting quality under a plurality of brightness conditions. A variable aperture may be disposed on a light inlet side of an optical camera lens in a camera module, to achieve this objective. A size of an aperture hole of the variable aperture is variable. In a high-brightness environment, the size of the aperture hole may be reduced to allow a smaller amount of light to enter the optical camera lens. In a low-brightness environment, the size of the aperture hole may be increased to allow a larger amount of light to enter the optical camera lens. In this way, an amount of admitted light of the optical camera lens is adjusted, to ensure shooting quality.

In addition, in some high-end electronic devices, a drive motor is further integrated into the camera module. The drive motor is configured to drive an optical camera lens to move, so as to implement automatic focusing (automatic focusing, AF) and/or optical image stabilization (optical image stabilization, OIS). This ensures shooting definition of the electronic device.

For a type of camera module integrated with both a variable aperture and a drive motor, how to ensure shooting quality of the camera module and reduce a volume of the camera module is an important research direction of vendors.

SUMMARY

Embodiments of this application provide a camera module and an electronic device, to ensure shooting quality of the camera module, and reduce a volume of the camera module.

The following technical solutions are used in embodiments of this application, to achieve the foregoing objectives.

According to a first aspect, some embodiments of this application provide a camera module. The camera module includes an optical camera lens, a variable aperture, and an SMA motor. Relative positions of the variable aperture and the optical camera lens are fixed. The variable aperture has an aperture hole whose size is adjustable. The aperture hole is located on a light inlet side of the optical camera lens, and is opposite to a light inlet surface of the optical camera lens. The SMA motor includes a first carrier, a base, and an SMA drive assembly. The optical camera lens is fastened to the first carrier. The SMA drive assembly is connected between the first carrier and the base. The SMA drive assembly is configured to drive the first carrier, the optical camera lens, and the variable aperture to move together relative to the base, so as to implement automatic focusing and/or optical image stabilization.

In this embodiment of this application, the relative positions of the variable aperture and the optical camera lens are fixed, and the SMA drive assembly is configured to drive the first carrier, the optical camera lens, and the variable aperture to move together relative to the base, so as to implement automatic focusing and/or optical image stabilization. Therefore, during driving by the SMA drive assembly for motion, the relative positions of the variable aperture and the optical camera lens can remain unchanged, so that shooting quality of the camera module can be ensured. In addition, the SMA drive assembly has features such as large driving force and a small volume, and therefore can reduce a volume of the camera module.

In a possible implementation of the first aspect, the variable aperture includes a case, a second carrier, a plurality of blades, and a drive apparatus. Relative positions of the case and the optical camera lens are fixed. The second carrier is rotatably connected to the case, and a rotation axis of the second carrier is collinear with a central axis of the aperture hole. The plurality of blades are disposed in a circumferential direction of the second carrier, and the plurality of blades form the aperture hole through enclosure. Each blade is rotatably connected to the case and slidably connected to the second carrier. The drive apparatus is connected between the second carrier and the case. The drive apparatus is configured to: drive the second carrier to rotate relative to the case, and drive each blade to rotate relative to the case and slide relative to the second carrier, so as to change an aperture of the aperture hole. The variable aperture has a simple structure and is easy to implement.

Each blade includes a first part, a second part, and a third part that are connected in sequence. The first part of the blade is rotatably connected to the case. The second part of the blade is slidably connected to the second carrier. The third parts of the plurality of blades form the aperture hole through enclosure. When being rotated relative to the case, the second carrier may drive the first parts of the plurality of blades to rotate relative to the case and the second parts of the plurality of blades to slide relative to the second carrier, so as to change the aperture of the aperture hole formed by the third parts of the plurality of blades through enclosure. The variable aperture has the simple structure and is easy to implement.

In addition, a plurality of first long grooves are disposed on an outer side surface of the second carrier. Herein, "a plurality of" means more than two. Optionally, there are four first long grooves. The plurality of first long grooves are evenly disposed in the circumferential direction of the second carrier. In addition, each first long groove extends in the circumferential direction of the second carrier. A second long groove is disposed at a position that corresponds to each first long groove and that is on an inner side surface of the case. The second long groove and the first long groove form a raceway through enclosure. The variable aperture further includes a plurality of balls. The plurality of balls are respectively located in a plurality of raceways, and can roll along the plurality of raceways. In this way, the second carrier is rotatably connected to the case by using a rolling friction pair. The rolling friction pair has a little wear, and can prolong a service life of the variable aperture.

Further, optionally, the second long groove is formed by butting two half long grooves in a direction of an optical axis of the optical camera lens. The two half long grooves are respectively located on a pedestal and a side frame. When the ball is mounted, the ball may be first mounted in the first long groove of the second carrier and the half long groove on the pedestal. Then, the side frame is fastened to the pedestal, and the half long groove on the side frame is butted with the half long groove on the pedestal, to limit the ball. In this way, the ball is mounted, and the mounting operation is simple, and is easy to implement.

In a possible implementation of the first aspect, a rotation hole is disposed on the first part of the blade, and a rotating shaft is fastened to the case. The first part of the blade is sleeved on the rotating shaft through the rotation hole, and can be rotated around the rotating shaft. A mounting notch is further disposed on the first part of the blade. One end of the mounting notch is connected to the rotation hole, and the other end of the mounting notch runs through an edge of the blade. A width of the mounting notch is less than a diameter of the rotation hole. An elastic notch is further disposed on the first part of the blade, and the elastic notch is disposed close to the mounting notch. A part that is located between the elastic notch and the mounting notch and that is of the blade forms a first elastic rib. The first elastic rib has a small width, and has specific elasticity. In a process in which the rotating shaft is mounted into the rotation hole through the mounting notch, the first elastic rib is forced to generate elastic deformation. When the rotating shaft is mounted into the rotation hole, the first elastic rib is reset, to prevent the blade from being separated from the rotating shaft.

In a possible implementation of the first aspect, a guide hole is disposed on the second part of the blade. The guide hole is a strip-shaped hole. One of two ends of the guide hole that are in a length direction of the guide hole is disposed closer to the rotation hole than the other end. A sliding column is fastened to the second carrier. The second part of the blade is sleeved on the sliding column through the guide hole, and can be slid relative to the sliding column. A diameter of the sliding column is greater than a width of the guide hole. An elastic hole is further disposed on the second part of the blade, and the elastic hole is disposed close to the guide hole. A part that is located between the elastic hole and the guide hole and that is of the blade forms a second elastic rib. The second elastic rib has a small width, and has specific elasticity. When the sliding column is mounted into the guide hole, the second elastic rib is forced to generate elastic deformation, so as to apply elastic compression force to the sliding column. This can improve fitting tightness between the sliding column and the guide hole.

In a possible implementation of the first aspect, the third part of the blade includes an inner edge. The inner edge is an edge that forms the aperture hole. A shape of the inner edge may be a straight line, an arc line, or partially a straight line and partially an arc line.

In a possible implementation of the first aspect, a cover plate, the top of the rotating shaft, and the top of the sliding column are located on a same side of the blade. The top of the rotating shaft means a highest end part that protrudes from the side frame and that is of the rotating shaft. Similarly, the top of the sliding column means a highest end part that protrudes from the second carrier and that is of the sliding column. The cover plate is configured to limit the blade, so as to prevent the blade from being detached from the top of the rotating shaft and the top of the sliding column.

In a possible implementation of the first aspect, a first avoidance hole is disposed at a position that corresponds to the rotating shaft and that is on the cover plate. The top of the rotating shaft is located in the first avoidance hole. A second avoidance hole is disposed at a position that corresponds to the sliding column and that is on the cover plate. The top of the sliding column is located in the second avoidance hole. In this way, the cover plate can be closer to the blade. A height of the variable aperture in the direction of the optical axis of the optical camera lens can be reduced.

In a possible implementation of the first aspect, the drive apparatus includes at least one actuator. The actuator includes one first magnet and one coil. The first magnet is fastened to the second carrier, and the coil is fastened to the case. The first magnet is opposite to the coil. The structure is simple, and is easy to implement.

In a possible implementation of the first aspect, the drive apparatus includes at least one actuator. The actuator includes one first magnet and a plurality of coils. The first magnet is fastened to the second carrier, and the plurality of coils are fastened to the case. The plurality of coils are arranged along an arc-shaped track line. A circle center line corresponding to the arc-shaped track line is collinear with the rotation axis of the second carrier. The first magnet is opposite to more than two adjacent coils of the plurality of coils. In this way, a rotation angle of the second carrier relative to the case can be increased by using the plurality of coils, to increase an adjustment range of the size of the aperture hole. For example, an F value of the variable aperture can be adjusted in a range from 1.X to 10.X.

In a possible implementation of the first aspect, a magnetization direction of the first magnet is a radial direction of the second carrier, and a plane on which at least one coil is located is parallel to the rotation axis of the second carrier.

In a possible implementation of the first aspect, a magnetization direction of the first magnet is parallel to the rotation axis of the second carrier, and a plane on which at least one coil is located is perpendicular to the rotation axis of the second carrier.

In a possible implementation of the first aspect, the variable aperture further includes a position-limiting structure. The position-limiting structure is configured to limit the rotation angle of the second carrier relative to the case. For example, the position-limiting structure includes a long position-limiting groove and a position-limiting protrusion. The long position-limiting groove is disposed on the second carrier, and the position-limiting protrusion is disposed on the case. In another embodiment, the long position-limiting groove is disposed on the case, and the position-limiting protrusion is disposed on the second carrier. The long position-limiting groove extends in the circumferential direction of the second carrier, and the position-limiting protrusion is located in the long position-limiting groove. When the second carrier is rotated relative to the case, the position-limiting protrusion is moved along the long position-limiting groove. When the position-limiting protrusion is moved to an end part of the long position-limiting groove, an inner wall of the end part of the long position-limiting groove implements a function of stopping the position-limiting protrusion, to prevent the second carrier from continuing to be rotated. In this way, the rotation angle of the second carrier is limited.

Optionally, there are a plurality of long position-limiting grooves, and the plurality of long position-limiting grooves are evenly arranged in the circumferential direction of the second carrier. Correspondingly, there are a plurality of position-limiting protrusions, and the plurality of position-limiting protrusions are evenly arranged along a circumference of an inner wall of the case. The plurality of position-limiting protrusions are respectively located in the plurality of long position-limiting grooves. When the second carrier is rotated relative to the case, the plurality of position-limiting protrusions are separately moved in the plurality of long position-limiting grooves, and are separately limited by using end parts of the plurality of long position-limiting grooves. In this way, impact force during position limitation is evenly dispersed between the plurality of position-limiting protrusions and the end parts of the plurality of long position-limiting grooves. Impact wear can be reduced, and a service life can be prolonged.

In a possible implementation of the first aspect, the variable aperture further includes a first magnetic plate. The first magnetic plate is fastened to the case. The first magnetic plates are separately disposed close to the first magnet of the actuator. There is magnetic attraction force between the first magnetic plate and the first magnet of the actuator. When the drive apparatus drives the second carrier to rotate relative to the case, the magnetic attraction force has second component force in a tangential direction around the second carrier. When driving force of the drive apparatus is removed, under an action of the second component force, the second carrier can be driven to restore to an initial position.

In a possible implementation of the first aspect, the SMA drive assembly includes at least four groups of drive units. The at least four groups of drive units are evenly arranged in a circumferential direction of the first carrier. Each group of drive units includes one pair of movable clamping jaws, one pair of fixed clamping jaws, and two SMA wires. The pair of movable clamping jaws is fastened to the first carrier. The pair of fixed clamping jaws is fastened to the base. The pair of movable clamping jaws and the pair of fixed clamping jaws are arranged at an interval in the circumferential direction of the first carrier. Two movable clamping jaws in the pair of movable clamping jaws are arranged in an extension direction of the optical axis of the optical camera lens. Two fixed clamping jaws in the pair of fixed clamping jaws are arranged in the extension direction of the optical axis of the optical camera lens. The two SMA wires are crosswise connected between the pair of movable clamping jaws and the pair of fixed clamping jaws. Pairs of movable clamping jaws of two adjacent groups of drive units are disposed adjacently or pairs of fixed clamping jaws of two adjacent groups of drive units are disposed adjacently in the circumferential direction of the first carrier. The drive assembly has a simple structure, the large driving force, and the small volume, can implement both automatic focusing and optical image stabilization, and can further reduce the volume of the camera module.

In a possible implementation of the first aspect, the base has a second electrical connection structure. The second electrical connection structure is electrically connected to the fixed clamping jaw of the SMA drive assembly. The SMA motor further includes a first electrical connection structure and a first electrical connector. The first electrical connection structure is connected between the first carrier and the base, and the first electrical connection structure has an SMA drive line. A part that is located on the first carrier and that is of the SMA drive line is electrically connected to the movable clamping jaw on the first carrier. A part that is located on the base and that is of the SMA drive line is electrically connected to one end of the first electrical connector. The first electrical connector is fastened to the base. The other end of the first electrical connector is electrically connected to the second electrical connection structure. In this way, a circuit connection of the SMA drive assembly can be implemented.

In a possible implementation of the first aspect, the SMA drive assembly includes four groups of drive units, and the SMA drive line includes a first electrical connection line and a second electrical connection line. There are two first electrical connectors. A part that is located on the first carrier and that is of the first electrical connection line is electrically connected to movable clamping jaws of two adjacent groups of drive units. A part that is located on the base and that is of the first electrical connection line is electrically connected to one end of one first electrical connector. A part that is located on the first carrier and that is of the second electrical connection line is electrically connected to movable clamping jaws of other two adjacent groups of drive units. A part that is located on the base and that is of the second electrical connection line is electrically connected to one end of the other first electrical connector. The other end of each of the two first electrical connectors is electrically connected to the second electrical connection structure.

In a possible implementation of the first aspect, the first electrical connection structure includes a first electrical connection unit and a second electrical connection unit. Both the first electrical connection unit and the second electrical connection unit are long-strip-shaped. The middle parts of the first electrical connection unit and the second electrical connection unit are fastened to the first carrier. Two ends of each of the first electrical connection unit and the second electrical connection unit are fastened to the base. The first electrical connection line and the second electrical connection line are respectively located on the first electrical connection unit and the second electrical connection unit.

In a possible implementation of the first aspect, the first electrical connection structure further has a variable aperture drive line. A part that is located on the first carrier and that is of the variable aperture drive line is electrically connected to the variable aperture. The SMA motor further includes a second electrical connector. The second electrical connector is fastened to the base. One end of the second electrical connector is electrically connected to a part that is located on the base and that is of the variable aperture drive line, and the other end of the second electrical connector is electrically connected to the second electrical connection structure. In this way, a layout of an electrical connection line of the variable aperture is convenient.

In a possible implementation of the first aspect, the variable aperture drive line includes a third electrical connection line, a fourth electrical connection line, a fifth electrical connection line, and a sixth electrical connection line. The third electrical connection line and the fourth electrical connection line are disposed on the first electrical connection unit and are respectively located on two sides of the middle part of the first electrical connection unit. The third electrical connection line and the fourth electrical connection line are disposed on the second electrical connection unit and are respectively located on two sides of the middle part of the second electrical connection unit. One end of the third electrical connection line, one end of the fourth electrical connection line, one end of the fifth electrical connection line, and one end of the sixth electrical connection line form a first part of the variable aperture drive line. The other end of the third electrical connection line, the other end of the fourth electrical connection line, the other end of the fifth electrical connection line, and the other end of the sixth electrical connection line form a second part of the variable aperture drive line.

In a possible implementation of the first aspect, at least parts that are located between the first carrier and the base and that are in the first electrical connection unit and the second electrical connection unit each are a flexible structure extending along a curve. In this way, when the first carrier is moved relative to the base, the part has specific elongation and shortening capabilities. As a result, the first electrical connection structure can be prevented from interfering with relative motion between the first carrier and the base.

In a possible implementation of the first aspect, the camera module further includes a photosensitive assembly. The photosensitive assembly includes a circuit board. The circuit board is located on a light outlet side of the optical camera lens, and the circuit board and the base of the SMA motor are fastened relative to each other. The second electrical connection structure is electrically connected to the circuit board. Optionally, the second electrical connection structure is electrically connected to the circuit board by using a golden finger.

In a possible implementation of the first aspect, the photosensitive assembly further includes an image sensor, a light filter, and a holder. The image sensor is disposed on the circuit board, and a photosensitive surface of the image sensor faces a light output surface of the optical camera lens. The light filter is located between the optical camera lens and the image sensor, and the light filter is fastened to the circuit board by using the holder.

In a possible implementation of the first aspect, a sunken groove is disposed on a surface that is close to the photosensitive assembly and that is of the base. The light filter and the holder are located in the sunken groove. In this way, a height of the camera module can be reduced.

In a possible implementation of the first aspect, the base includes a substrate part and a support column. The substrate part is located on a side that is far away from the aperture hole and that is of the first carrier. The support column is fastened to a surface that is close to the first carrier and that is of the substrate part. The fixed clamping jaw of the SMA drive assembly is fastened to the support column. A first soft elastic material is disposed in a gap between the first carrier and the support column, and the first soft elastic material is fastened to one of the first carrier and the support column. In this way, the first soft elastic material is used for buffering, so that generation of a fragment under impact of the first carrier can be avoided, to prevent an impurity from entering an optical path and affecting the shooting quality. In addition, the soft elastic material is used for buffering, so that a service life of the support column can be prolonged.

In a possible implementation of the first aspect, the SMA motor further includes a housing. The first carrier, the base, and the SMA drive assembly are located in the housing. The housing and the base are fastened relative to each other. A second soft elastic material is disposed in a gap between the movable clamping jaw of the SMA drive assembly and an inner wall of the housing. The second soft elastic material is fastened to one of the movable clamping claw and the housing. In this way, when the first carrier is moved, impact wear between the movable clamping jaw on the first carrier and the inner wall of the housing can be reduced by using the second soft elastic material. This helps ensure the shooting quality and prolong a service life of the camera module.

In a possible implementation of the first aspect, an avoidance notch is disposed at a position that corresponds to the movable clamping jaw and that is on an edge of the base. The movable clamping jaw extends into the avoidance notch. In some embodiments, there are two avoidance notches. The two avoidance notches are disposed along a diagonal. In the four groups of drive units, movable clamping jaws of two adjacent groups of drive units sink into one avoidance notch, and movable clamping jaws of other two adjacent groups of drive units sink into the other avoidance notch. In this way, a height of the SMA motor can be reduced.

In a possible implementation of the first aspect, a second magnet is disposed on the first carrier, and a second magnetic plate is disposed on the base. The second magnet and the second magnetic plate are disposed opposite to each other. There is magnetic attraction force between the second magnet and the second magnetic plate. When the drive assembly does not work, the magnetic attraction force can fix relative positions of the first carrier and the base. When the drive assembly works, driving force applied by the SMA drive assembly to the first carrier can overcome the magnetic attraction force, to implement automatic focusing and optical image stabilization.

In a possible implementation of the first aspect, a first position-limiting column and/or a first position-limiting groove are/is disposed on a surface that is close to the first carrier and that is of the base. A second position-limiting groove and/or a second position-limiting column are/is disposed on a surface that is close to the base and that is of the first carrier. The first position-limiting column is located in the second position-limiting groove, and the second position-limiting column is located in the first position-limiting groove. There are a gap between the first position-limiting column and an inner wall of the second position-limiting groove and a gap between the second position-limiting column and an inner wall of the first position-limiting groove. The gaps enable the first carrier to move close to a substrate part body of the base in a Z-axis direction, and tilt in any direction around, so as to implement automatic focusing and optical image stabilization. When the first carrier is moved close to the substrate part body for a specific distance or tilts to the any direction around by a specific angle, the first position-limiting column and the first position-limiting groove can stop the first carrier, to limit a maximum distance and a maximum tilt angle for and by which the first carrier is moved close to the substrate part body.

In a possible implementation of the first aspect, the first position-limiting column includes an inner core and a cladding. The inner core is fastened to the base, and the inner core is made of a rigid material. The cladding wraps the inner core, and the cladding is made of a soft elastic material. In this way, the cladding is used for buffering, so that generation of the fragment under impact of the first carrier can be avoided, to prevent the impurity from entering the optical path and affecting the shooting quality. In addition, the soft elastic material is used for buffering, so that a service life of the first position-limiting column can be prolonged.

According to a second aspect, some embodiments of this application provide an electronic device. The electronic device includes a computing control unit and the camera module according to any one of the foregoing technical solutions. The computing control unit is electrically connected to the camera module.

The electronic device provided in this embodiment of this application includes the camera module according to any one of the foregoing technical solutions. Therefore, the electronic device and the camera module can resolve a same technical problem, and achieve a same technical effect.

DESCRIPTION OF EMBODIMENTS

The terms "first", "second", "third", "fourth", "fifth", and "sixth" in embodiments of this application are merely intended for a purpose of description, and shall not be understood as an indication or implication of relative importance or implicit indication of a quantity of indicated technical features. Therefore, a feature limited by "first", "second", "third", "fourth", "fifth", or "sixth" may explicitly or implicitly include one or more features.

In descriptions of this application, it should be understood that directions or position relationships indicated by the terms "center", "upper", "lower", "front", "rear", "left", "right", "vertical", "horizontal", "top", "bottom", "inside", "outside", and the like are directions or location relationships shown based on the accompanying drawings, and are merely intended for ease of description and simplification of description, but are not intended to indicate or imply that an indicated apparatus or component needs to have a specific direction and needs to be constructed and operated in the specific direction, and therefore shall not be understood as a limitation on this application.

The term "include", "comprise", or any other variant thereof in embodiments of this application is intended to cover a non-exclusive inclusion, so that a process, a method, an article, or an apparatus that includes a list of elements not only includes those elements but also includes other elements that are not expressly listed, or further includes elements inherent to such a process, method, article, or apparatus. An element preceded by "includes a . . . " does not, without more constraints, preclude existence of an additional identical element in a process, a method, an article, or an apparatus that includes the element.

The term "and/or" in embodiments of this application describes only an association relationship between associated objects and represents that three relationships may exist. For example, A and/or B may represent the following three cases: Only A exists, both A and B exist, and only B exists. In addition, the character "/" in this specification generally indicates an "or" relationship between associated objects.

This application provides an electronic device. The electronic device is a type of electronic device having an image shooting function. Specifically, the electronic device may be a portable electronic apparatus or another appropriate electronic apparatus. For example, the electronic device may be a mobile phone, a tablet personal computer (tablet personal computer), a laptop computer (laptop computer), a personal digital assistant (personal digital assistant, PDA), a camera, a personal computer, a notebook computer, a vehicle-mounted device, a wearable device, augmented reality (augmented reality, AR) glasses, an AR helmet, virtual reality (virtual reality, VR) glasses, or a VR helmet.

Figure 1:
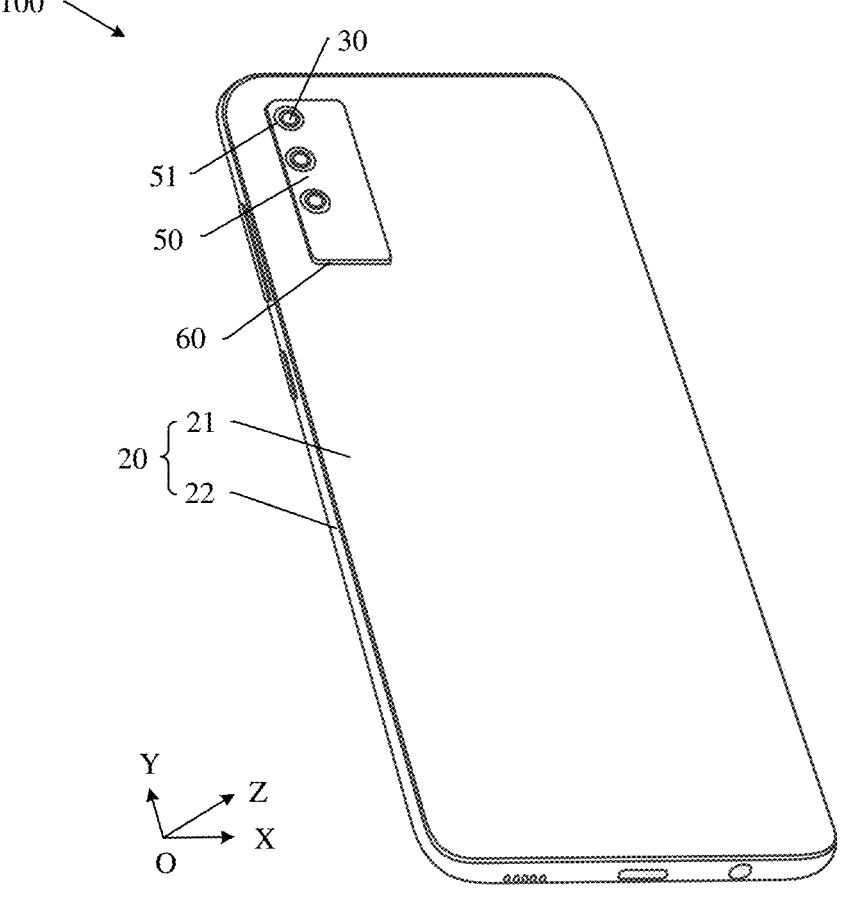
FIG. 1 is a three-dimensional diagram of an electronic device according to some embodiments of this application.
Figure 2:
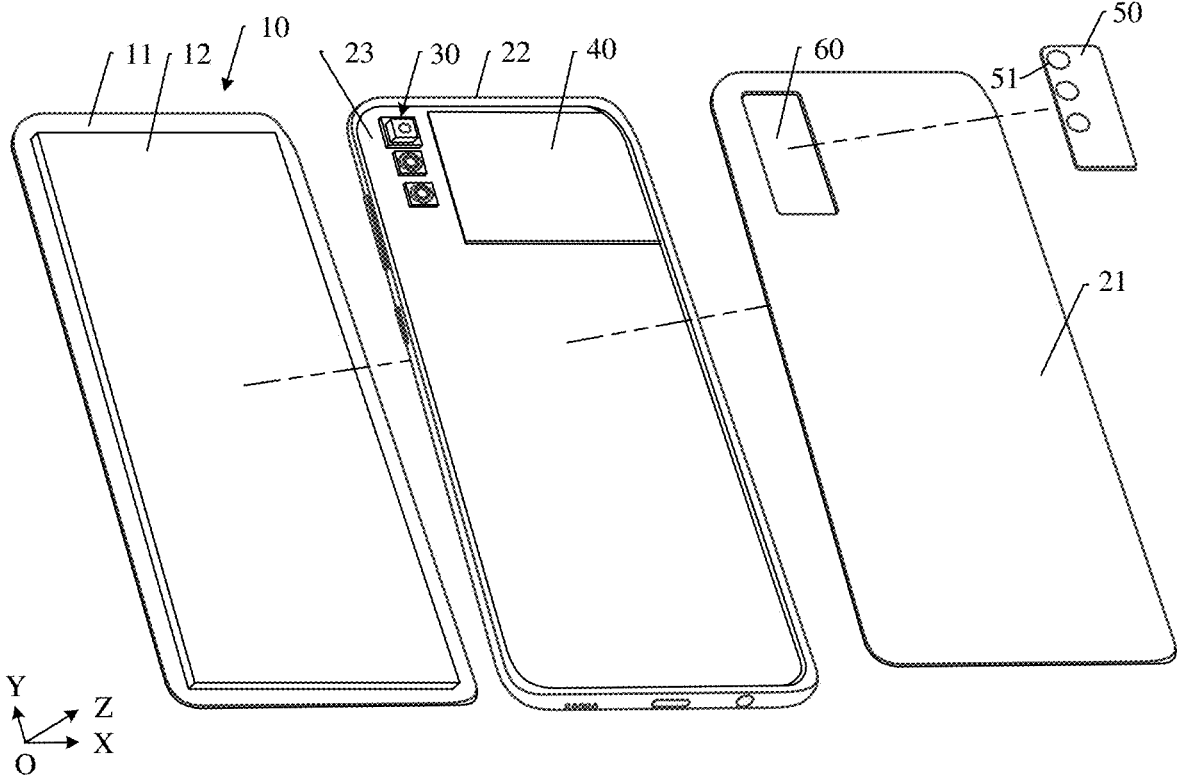
FIG. 2 is an exploded view of the electronic device shown in FIG. 1.

Refer to FIG. 1 and FIG. 2. FIG. 1 is a three-dimensional diagram of an electronic device 100 according to some embodiments of this application. FIG. 2 is an exploded view of the electronic device 100 shown in FIG. 1. In this embodiment, the electronic device 100 is a mobile phone. The electronic device 100 includes a screen 10, a back housing 20, a camera module 30, a mainboard 40, and a camera decorative cover 50.

It may be understood that FIG. 1 and FIG. 2 merely show, as an example, some components included in the electronic device 100, and actual shapes, actual sizes, actual positions, and actual structures of these components are not limited by FIG. 1 and FIG. 2. In some other examples, the electronic device 100 may alternatively include no screen 10 and camera decorative cover 50.

The screen 10 is configured to display an image, a video, and the like. The screen 10 includes a transparent cover plate 11 and a display 12. The transparent cover plate 11 and the display 12 are stacked and fixedly connected. The transparent cover plate 11 is mainly configured to implement protection and dust prevention functions for the display 12. A material of the transparent cover plate 11 includes but is not limited to glass. The display 12 may be a flexible display or a rigid display. For example, the display 12 may be an organic light-emitting diode (organic light-emitting diode, OLED) display, an active-matrix organic light-emitting diode (active-matrix organic light-emitting diode, AMO-LED) display, a mini light-emitting diode (mini light-emitting diode) display, a micro light-emitting diode (micro light-emitting diode) display, a micro organic light-emitting diode (micro organic light-emitting diode) display, a quantum dot light-emitting diode (quantum dot light-emitting diode, QLED) display, or a liquid crystal display (liquid crystal display, LCD).

The back housing 20 is configured to protect an internal electronic component of the electronic device 100. The back housing 20 includes a back cover 21 and a bezel 22. The back cover 21 is located on a side that is far away from the transparent cover plate 11 and that is of the display 12, and is stacked with the transparent cover plate 11 and the display 12. The bezel 22 is fastened to the back cover 21. For example, the bezel 22 may be fixedly connected to the back cover 21 through adhesive bonding. The bezel 22 and the back cover 21 may be alternatively an integrated structure, that is, the bezel 22 and the back cover 21 are an integral structure. The bezel 22 is located between the back cover 21 and the transparent cover plate 11. The transparent cover plate 11 may be fastened to the bezel 22 through adhesive bonding. The transparent cover plate 11, the back cover 21, and the bezel 22 form internal accommodation space of the electronic device 100 through enclosure. The internal accommodation space accommodates the display 12.

For ease of description below, a direction in which the transparent cover plate 11, the display 12, and the back cover 21 in the electronic device 100 are stacked is defined as a Z-axis direction. A plane parallel to the transparent cover plate 11, the display 12, and the back cover 21 is a plane XY. It may be understood that a coordinate system of the electronic device 100 may be flexibly set based on a specific actual requirement. This is not specifically limited herein.

The camera module 30 is configured to shoot a photo/video. The camera module 30 is integrated with a variable aperture (variable aperture, VA) and a drive motor. The variable aperture is configured to adjust an amount of admitted light. The drive motor is configured to implement automatic focusing (automatic focusing, AF) and/or optical image stabilization (optical image stabilization, OIS). The camera module 30 is fastened to the internal receptacle of the electronic device 100. For example, the camera module 30 may be fastened to a surface that is close to the back cover 21 and that is of the display 12 in a manner, for example, a threaded connection, clamping, or welding. In another embodiment, refer to FIG. 2. The electronic device 100 further includes a middle plate 23. The middle plate 23 is fastened to a circumference of an inner surface of the bezel 22. For example, the middle plate 23 may be fastened to the bezel 22 through welding. The middle plate 23 and the bezel 22 may be alternatively an integrated structure. The middle plate 23 is used as a structural "framework" of the electronic device 100. The camera module 30 may be fastened to the middle plate 23 in a manner, for example, a threaded connection, clamping, or welding.

The camera module 30 may be used as a rear-facing camera module or a front-facing camera module.

For example, refer to FIG. 1 and FIG. 2. The camera module 30 is fastened to a surface that is close to the back cover 21 and that is of the middle plate 23, and a light inlet surface of the camera module 30 faces the back cover 21. A mounting opening 60 is disposed on the back cover 21, and the camera decorative cover 50 covers and is fastened to the mounting opening 60. The camera decorative cover 50 is configured to protect the camera module 30. In some embodiments, the camera decorative cover 50 protrudes to a side that is far away from the transparent cover plate 11 and that is of the back cover 21. In this way, the camera decorative cover 50 can increase mounting space of the camera module 30 in the electronic device 100 in the Z-axis direction. In some other embodiments, the camera decorative cover 50 may be alternatively flush with the back cover 21 or concave to the internal accommodation space of the electronic device 100. A transparent window 51 is disposed on the camera decorative cover 50. The transparent window 51 allows scene light to come into the light inlet surface of the camera module 30. In this embodiment, the camera module 30 is used as the rear-facing camera module of the electronic device 100. For example, the camera module 30 may be used as a rear-facing primary camera module. In another example, the camera module 30 may be alternatively used as a rear-facing wide-angle camera module or long-focus camera module.

In another embodiment, the camera module 30 is fastened to a surface that is close to the transparent cover plate 11 and that is of the middle plate 23. The light inlet surface of the camera module 30 faces the transparent cover plate 11. An optical path avoidance hole is disposed on the display 12. The optical path avoidance hole allows the scene light to come into the light inlet surface of the camera module 30 after passing through the transparent cover plate 11. In this way, the camera module 30 is used as the front-facing camera module of the electronic device 100.

The mainboard 40 is fastened to the internal receptacle of the electronic device 100. For example, the mainboard 40 may be fastened to the middle plate 23 in a manner, for example, a threaded connection or clamping. When the electronic device 100 includes no middle plate 23, the mainboard 40 may be alternatively fastened to the surface, that is close to the back cover 21 and that is of the display 12, in a manner, for example, a threaded connection or clamping.

Figure 3:
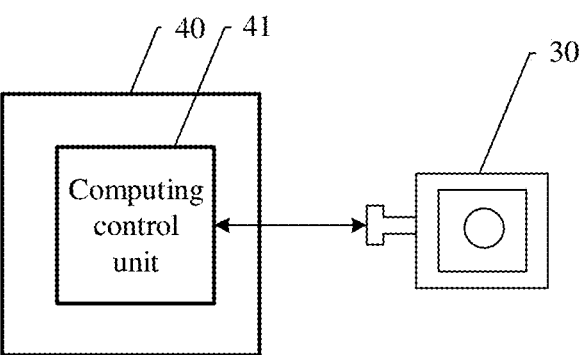
FIG. 3 is a diagram of an internal circuit of the electronic device shown in FIG. 1 and FIG. 2.

FIG. 3 is a diagram of an internal circuit of the electronic device 100 shown in FIG. 1 and FIG. 2. The electronic device 100 further includes a computing control unit 41. For example, the computing control unit 41 may be disposed on the mainboard 40. The computing control unit 41 may be alternatively disposed on another circuit board in the electronic device, for example, disposed on a circuit board on which a universal serial bus (universal serial bus, USB) component is located. In some embodiments, the computing control unit 41 is an application processor (application processor, AP).

The computing control unit 41 is electrically connected to the camera module 30. The computing control unit 41 is configured to receive and process an electrical signal that includes image information and that is from the camera module 30. The computing control unit 41 is further configured to control the variable aperture and the drive motor of the camera module 30 to move, so as to implement adjustment of an amount of admitted light, AF motion, and/or OIS motion of the camera module 30.

Figure 4:
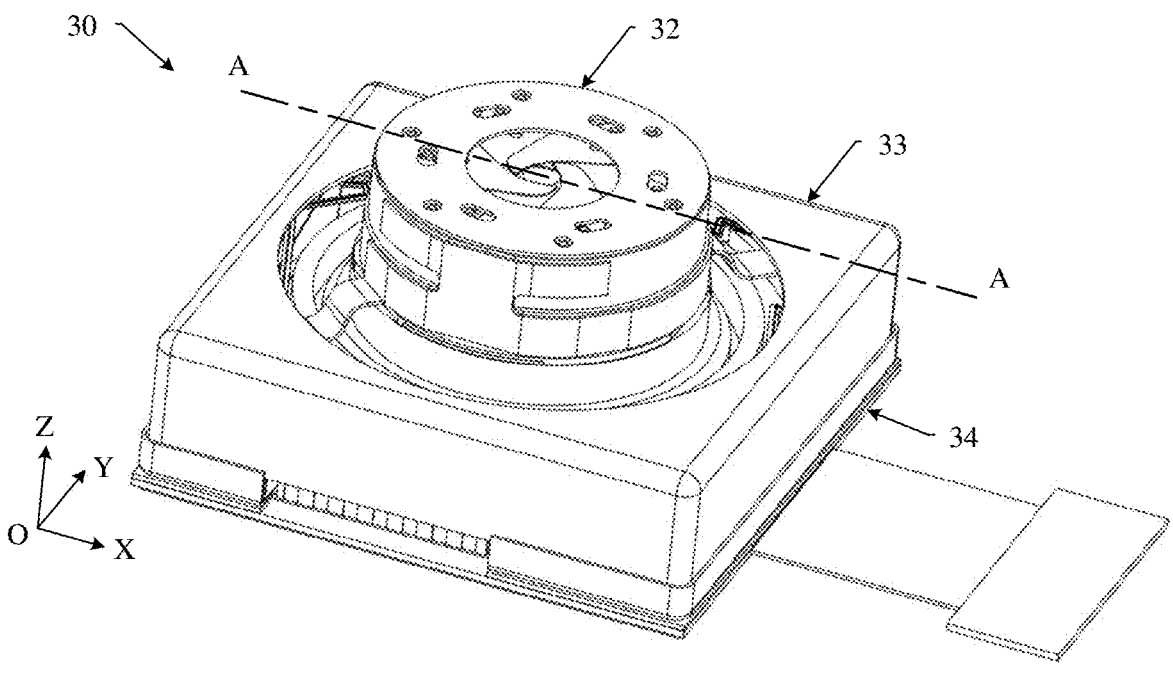
FIG. 4 is a three-dimensional diagram of a camera module in the electronic device shown in FIG. 1 and FIG. 2.
Figure 5:
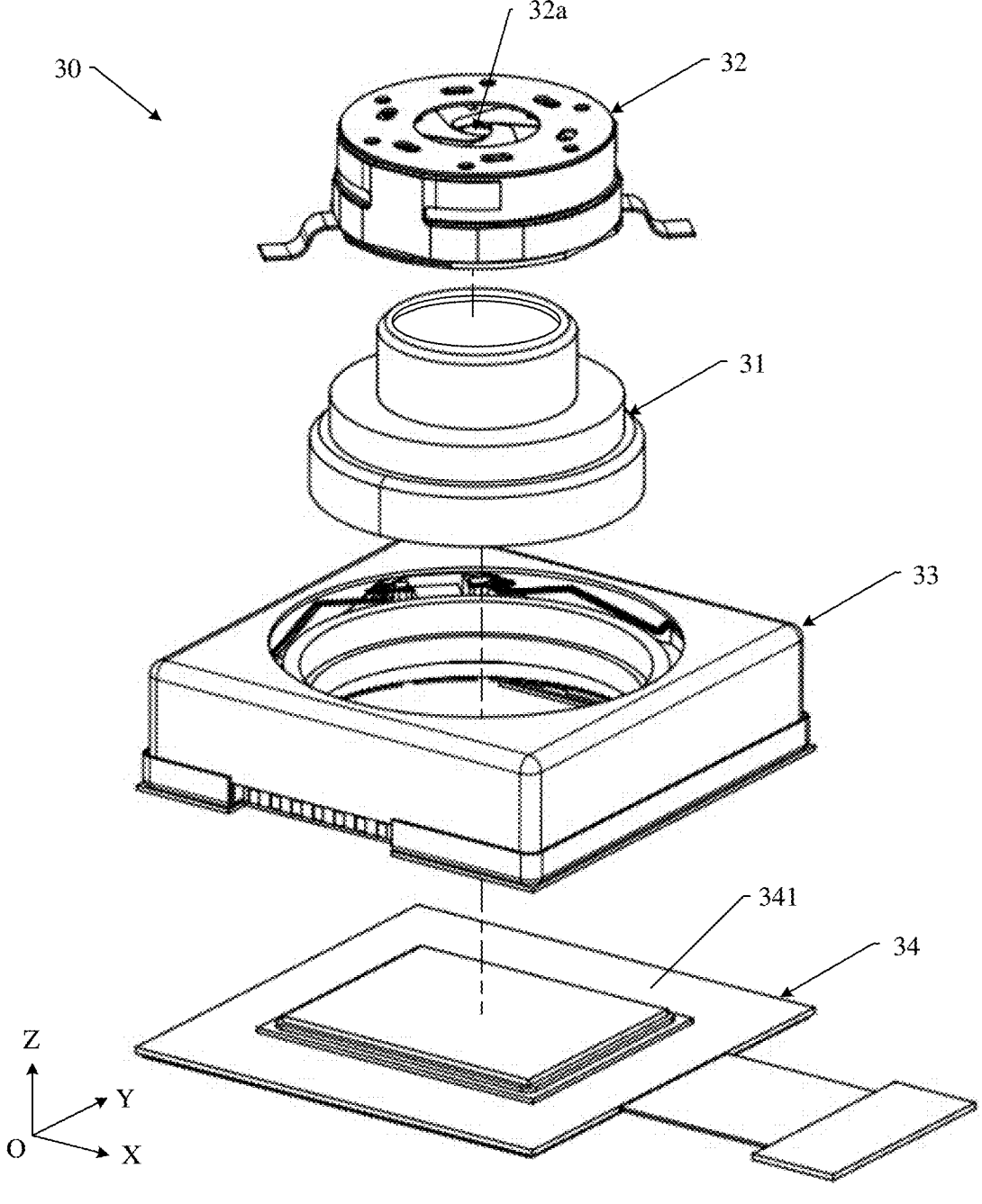
FIG. 5 is an exploded view of the camera module shown in FIG. 4.

Refer to FIG. 4 and FIG. 5. FIG. 4 is a three-dimensional diagram of the camera module 30 in the electronic device 100 shown in FIG. 1 and FIG. 2. FIG. 5 is an exploded view of the camera module 30 shown in FIG. 4. In this embodiment, the camera module 30 includes an optical camera lens 31, a variable aperture 32, a drive motor 33, and a photosensitive assembly 34.

It may be understood that FIG. 4 and FIG. 5 merely show, as an example, some components included in the camera module 30, and actual shapes, actual sizes, actual positions, and actual structures of these components are not limited by FIG. 4 and FIG. 5.

The optical camera lens 31 is configured to image a to-be-shot scene. For example, the optical camera lens 31 may be a vertical camera lens, and an optical axis of the vertical camera lens extends in the Z-axis direction. The optical camera lens 31 may be alternatively a periscope camera lens, and an optical axis of the periscope camera lens is parallel to the plane XY. The optical camera lens 31 is fastened to the drive motor 33.

Figure 6:
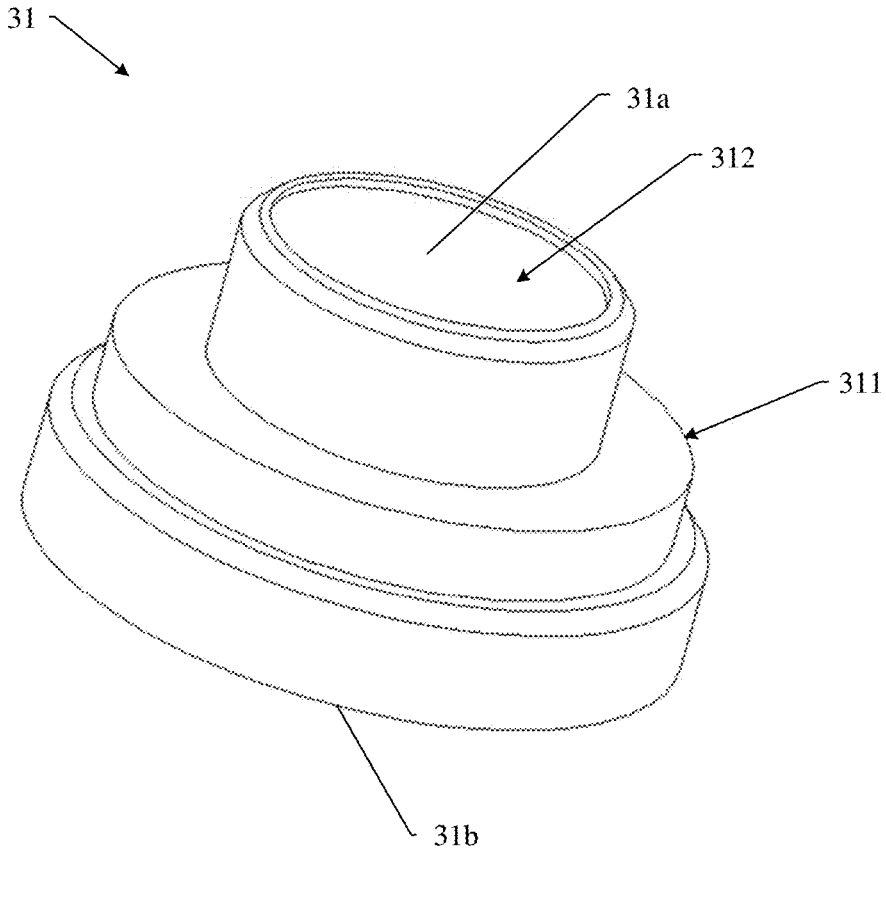
FIG. 6 is a schematic diagram of a structure of an optical camera lens in the camera module shown in FIG. 5.

FIG. 6 is a schematic diagram of a structure of the optical camera lens 31 in the camera module 30 shown in FIG. 5. The optical camera lens 31 includes a lens tube 311 and an optical lens group 312. The lens tube 311 is configured to fasten and protect the optical lens group 312. The lens tube 311 is a tubular structure. In other words, two ends of the lens tube 311 in a direction of an optical axis are open. The optical lens group 312 is mounted in the lens tube 311. The optical lens group 312 includes at least one optical lens. When the optical lens group 312 includes a plurality of optical lenses, the plurality of optical lenses are stacked in the direction of the optical axis.

The optical camera lens 31 may alternatively include only the optical lens group 312. The optical lens group 312 is mounted in the drive motor 33. In this way, the optical lens group 312 is fastened and protected by using the drive motor 33. In this embodiment, the drive motor 33 and the optical camera lens 31 are integrated. This helps reduce a volume of the camera module 30.

An optical camera lens having different features such as a wide angle, a standard mode, and a long focus can be obtained by designing a structural composition of the optical lens group 312 and a shape and a size of each optical lens.

Still refer to FIG. 6. The optical camera lens 31 includes a light inlet surface 31*a* and a light outlet surface 31*b*. The light inlet surface 31*a* is a surface that faces the to-be-shot scene when the optical camera lens 31 is used and that is of the optical camera lens 31. The scene light comes into the optical camera lens 31 from the light inlet surface 31*a*. The light outlet surface 31*b* of the optical camera lens 31 is a surface that backs onto the to-be-shot scene when the optical camera lens 31 is used and that is of the optical camera lens 31. The scene light comes out from the light outlet surface 31*b*.

Refer to FIG. 5. The variable aperture 32 has an aperture hole 32*a* whose size is variable. The aperture hole 32*a* is located on a light inlet side of the optical camera lens 31. Refer to FIG. 6. The light inlet side of the optical camera lens 31 is a side that is far away from the light outlet surface 31*b* of the optical camera lens 31 and that is of the light inlet surface 31*a* of the optical camera lens 31. In addition, the aperture hole 32*a* is opposite to the light inlet surface 31*a* of the optical camera lens 31. In other words, an orthographic projection of the aperture hole 32*a* on the light inlet surface 31*a* of the optical camera lens 31 partially or fully overlaps the light inlet surface 31*a* of the optical camera lens 31. In some embodiments, a central axis of the aperture hole 32*a* is collinear with an optical axis of the optical camera lens 31. The scene light comes into the optical camera lens 31 through the aperture hole 32*a*. In this way, the variable aperture 32 can adjust the size of the aperture hole 32*a* to adjust an amount of admitted light of the optical camera lens 31.

Figure 7:
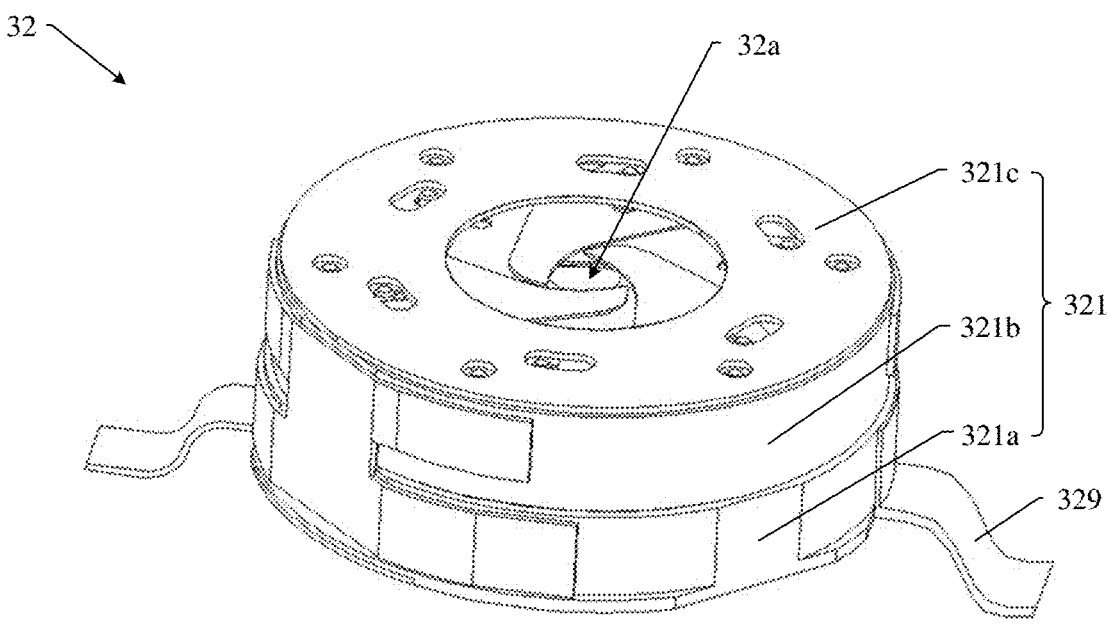
FIG. 7 is a three-dimensional diagram of a variable aperture in the camera module shown in FIG. 5.
Figure 8:
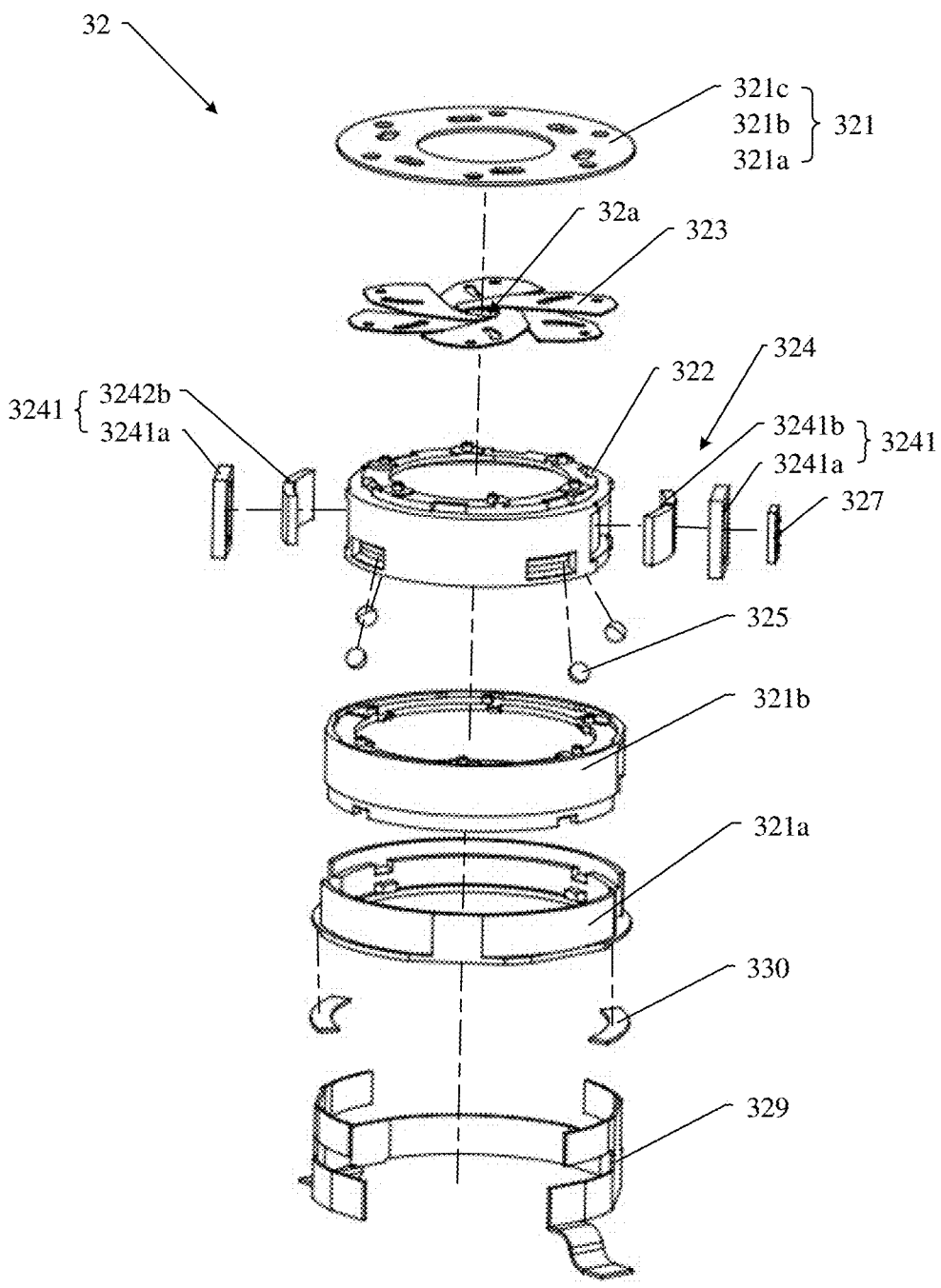
FIG. 8 is an exploded view of the variable aperture shown in FIG. 7.

Refer to FIG. 7 and FIG. 8. FIG. 7 is a three-dimensional diagram of the variable aperture 32 in the camera module 30 shown in FIG. 5. FIG. 8 is an exploded view of the variable aperture 32 shown in FIG. 7. The variable aperture 32 includes a case 321, a second carrier 322, a plurality of blades 323, and a drive apparatus 324.

It may be understood that FIG. 7 and FIG. 8 merely show, as an example, some components included in the variable aperture 32, and actual shapes, actual sizes, actual positions, and actual structures of these components are not limited by FIG. 7 and FIG. 8.

The case 321 is configured to protect an internal component of the variable aperture 32 from dust. A material of the case 321 includes but is not limited to metal and plastic.

The case 321 may be an integrated structure, or may be formed by assembling a plurality of parts. For example, refer to FIG. 7 and FIG. 8. The case 321 includes a pedestal 321a, a side frame 321b, and a cover plate 321c. The pedestal 321a and the cover plate 321c are respectively located on two opposite sides of the side frame 321b. In addition, the side frame 321b is fastened together with the pedestal 321a and the cover plate 321c in a manner, for example, adhesive bonding or clamping. In this way, the case 321 is formed by assembling three parts: the pedestal 321a, the side frame 321b, and the cover plate 321c. This can consider both molding difficulty and assembly difficulty of the case 321.

Figure 9:
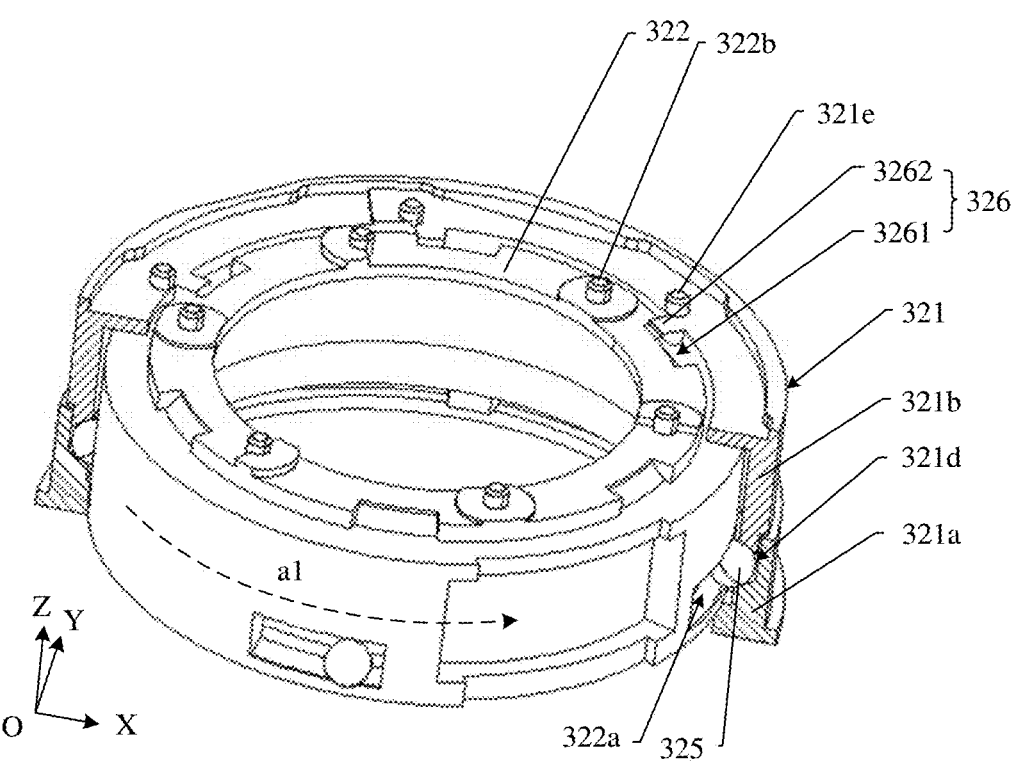
FIG. 9 is an assembly diagram of a case and a second carrier in the variable aperture shown in FIG. 7 and FIG. 8.

FIG. 9 is an assembly diagram of the case 321 and the second carrier 322 in the variable aperture 32 shown in FIG. 7 and FIG. 8. In this embodiment, half of the case 321 is cut off. The second carrier 322 is located in the case 321. In addition, the second carrier 322 is rotatably connected to the case 321. In some embodiments, a rotation axis of the second carrier 322 is collinear with the central axis of the aperture hole 32a in FIG. 7 and FIG. 8.

In some embodiments, refer to FIG. 9. A plurality of first long grooves 322a are disposed on an outer side surface of the second carrier 322, to implement the rotatable connection between the second carrier 322 and the case 321. "A plurality of" means more than two. Optionally, there are four first long grooves 322a. The plurality of first long grooves 322a are evenly disposed in a circumferential direction of the second carrier 322. In addition, each first long groove 322a extends in the circumferential direction of the second carrier 322. A second long groove 321d is disposed at a position that corresponds to each first long groove 322a and that is on an inner side surface of the case 321. The second long groove 321d and the first long groove 322a form a raceway through enclosure. The variable aperture 32 further includes a plurality of balls 325. The plurality of balls 325 are respectively located in a plurality of raceways, and can roll along the plurality of raceways. In this way, the second carrier 322 is rotatably connected to the case 321 by using a rolling friction pair. The rolling friction pair has a little wear, and can prolong a service life of the variable aperture 32. In another embodiment, the second carrier 322 may be alternatively rotatably connected to the case 321 by using a sliding friction pair.

Still refer to FIG. 9. In some embodiments, the second long groove 321d is formed by butting two half long grooves in the Z-axis direction, to facilitate assembly of the ball 325. The two half long grooves are respectively located on the pedestal 321a and the side frame 321b. When the ball 325 is mounted, the ball 325 may be first mounted in the first long groove 322a of the second carrier 322 and the half long groove on the pedestal 321a. Then, the side frame 321b is fastened to the pedestal 321a, and the half long groove on the side frame 321b is butted with the half long groove on the pedestal 321a, to limit the ball 325. In this way, the ball 325 is mounted, and the mounting operation is simple, and is easy to implement.

Refer to FIG. 8. The plurality of blades 323 are evenly arranged in the circumferential direction of the second carrier 322. The plurality of blades 323 form the aperture hole 32a through enclosure. A quantity of the plurality of blades 323 may be two, three, four, five, six, eight, or the like. In some embodiments, refer to FIG. 8. There are six blades 323.

Figure 10:
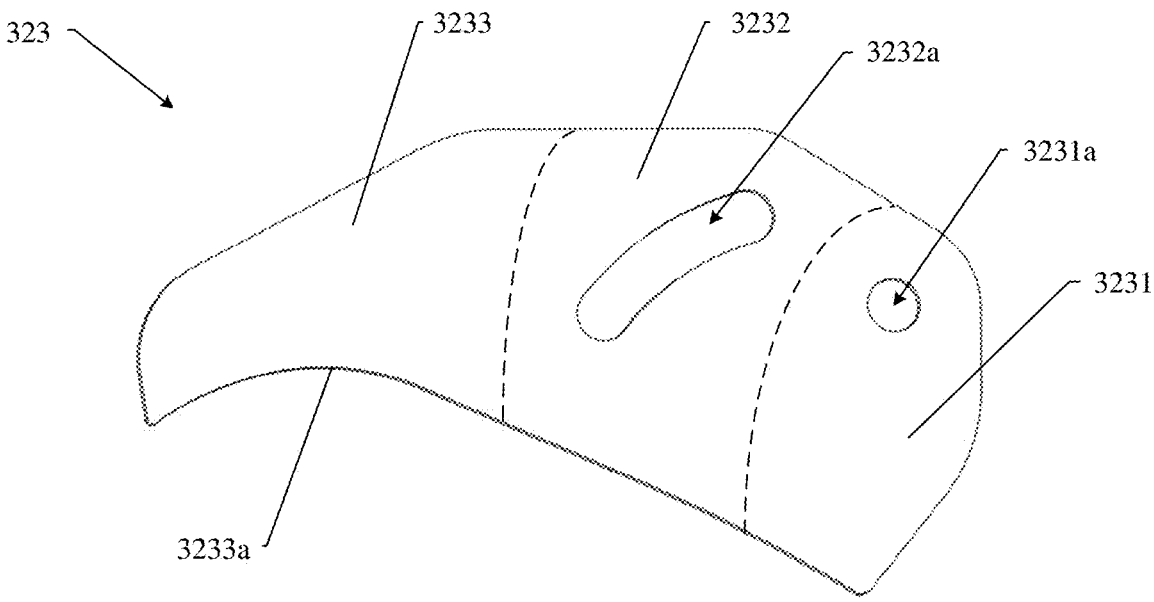
FIG. 10 is a schematic diagram of a structure of a blade in the variable aperture shown in FIG. 8.

FIG. 10 is a schematic diagram of a structure of the blade 323 in the variable aperture 32 shown in FIG. 8. In this embodiment, one of the blades 323 is used as an example to describe the structure of the blade 323 in detail, and a structure of another blade 323 is the same as the structure of the blade 323. Therefore, details are not described again. The blade 323 includes a first part 3231, a second part 3232, and a third part 3233 that are connected in sequence.

It should be noted that shapes of the first part 3231, the second part 3232, and the third part 3233 may be adjusted as required. FIG. 10 merely shows one of the shapes as an example, and this shall not be considered as a special limitation on this application.

In some embodiments, the first part 3231, the second part 3232, and the third part 3233 are an integrated structure. In other words, the first part 3231, the second part 3232, and the third part 3233 are an integral mechanical component. In another embodiment, the first part 3231, the second part 3232, and the third part 3233 may be alternatively different structures, and the different structures are assembled to form the blade 323.

Figure 11:
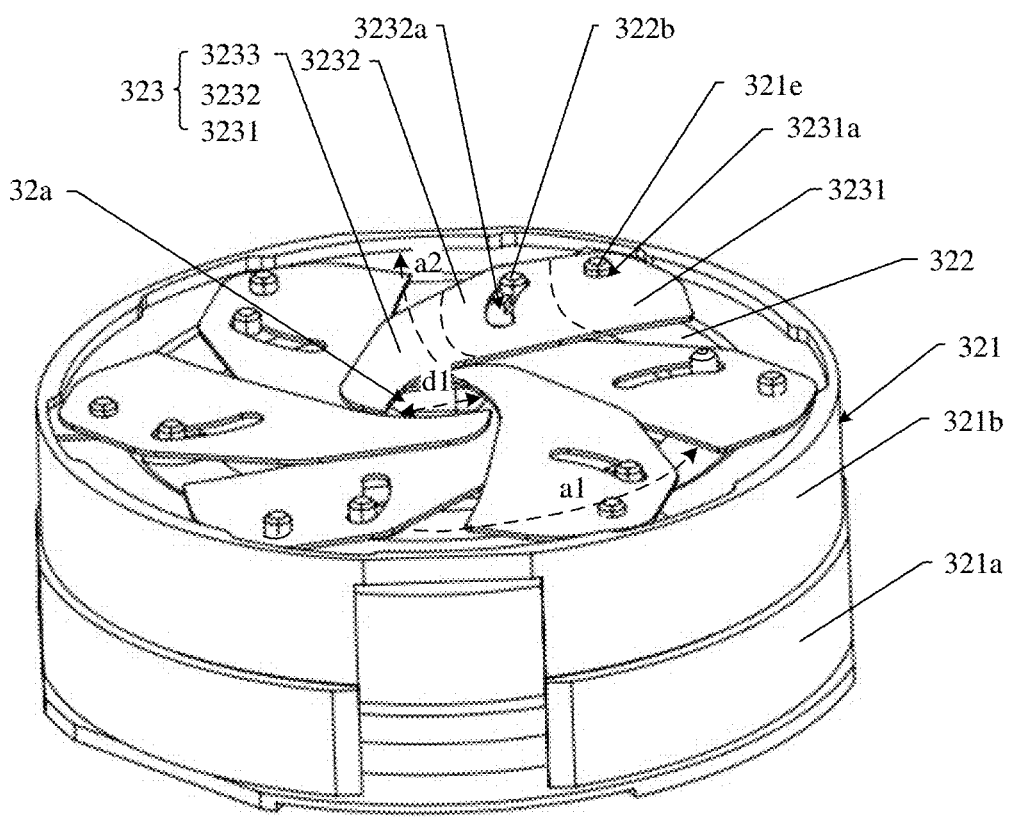
FIG. 11 is an assembly diagram of a case, a second carrier, and a plurality of blades in the variable aperture shown in FIG. 8.

The first part 3231 of the blade 323 is configured to rotatably connect to the case 321. In some embodiments, refer to FIG. 10. A rotation hole 3231a is disposed on the first part 3231 of the blade 323. For example, the rotation hole 3231a is a round hole. Refer to FIG. 9. A rotating shaft 321e is fastened to the case 321. FIG. 11 is an assembly diagram of the case 321, the second carrier 322, and the plurality of blades 323 in the variable aperture 32 shown in FIG. 8. The first part 3231 of the blade 323 is sleeved on the rotating shaft 321e through the rotation hole 3231a, and can be rotated around the rotating shaft 321e. In another embodiment, the rotation hole 3231a is disposed on the case 321, and the rotating shaft 321e is disposed on the first part 3231 of the blade 323.

Figure 12:
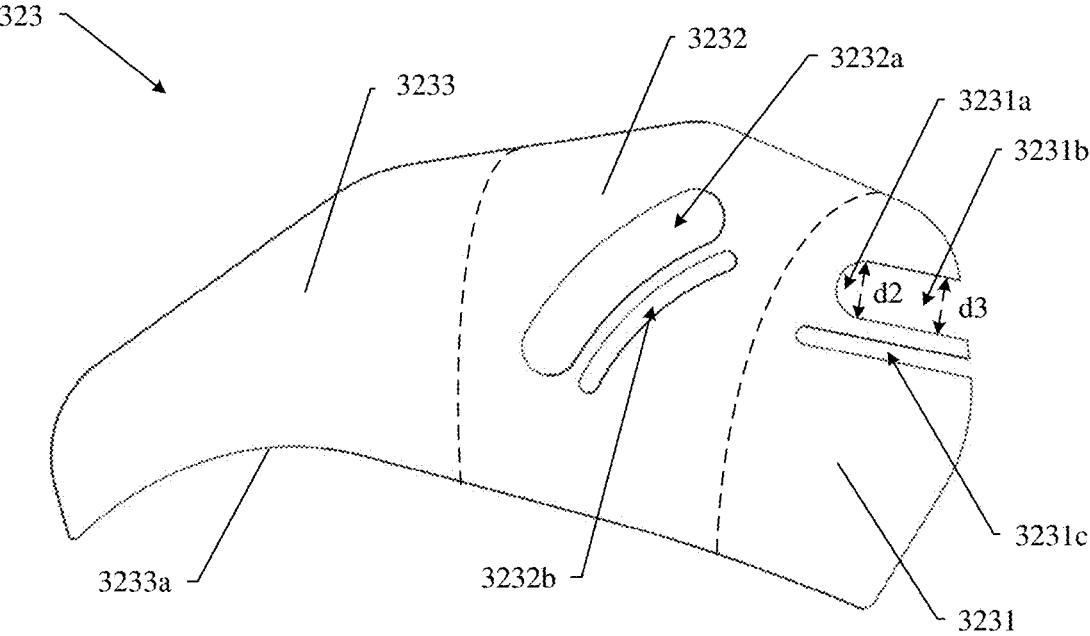
FIG. 12 is a schematic diagram of a structure of a blade according to some other embodiments of this application.

In some embodiments, FIG. 12 is a schematic diagram of a structure of the blade 323 according to some other embodiments of this application, to facilitate mounting of the blade 323 on the rotating shaft 321e. In this embodiment, a mounting notch 3231b is further disposed on the first part 3231 of the blade 323. One end of the mounting notch 3231b is connected to the rotation hole 3231a. The other end of the mounting notch 3231b runs through an edge of the blade 323. The blade 323 can be sleeved on the rotating shaft 321e in a radial direction of the rotating shaft 321e through the mounting notch 3231b, to reduce difficulty of mounting the blade 323 on the rotating shaft 321e.

On a basis of the foregoing embodiment, optionally, a width d3 of the mounting notch 3231b is slightly less than a diameter d2 of the rotation hole 3231a. On this basis, refer to FIG. 12. An elastic notch 3231c is further disposed on the first part 3231 of the blade 323. The elastic notch 3231c is disposed close to the mounting notch 3231b. A part that is located between the elastic notch 3231c and the mounting notch 3231b and that is on the blade 323 forms a first elastic rib. The first elastic rib has a small width, and has specific elasticity. In a process in which the rotating shaft 321e is mounted into the rotation hole 3231a through the mounting notch 3231b, the first elastic rib is forced to generate elastic deformation. When the rotating shaft 321e is mounted into the rotation hole 3231a, the first elastic rib is reset, to prevent the blade 323 from being separated from the rotating shaft 321e.

Figure 13:
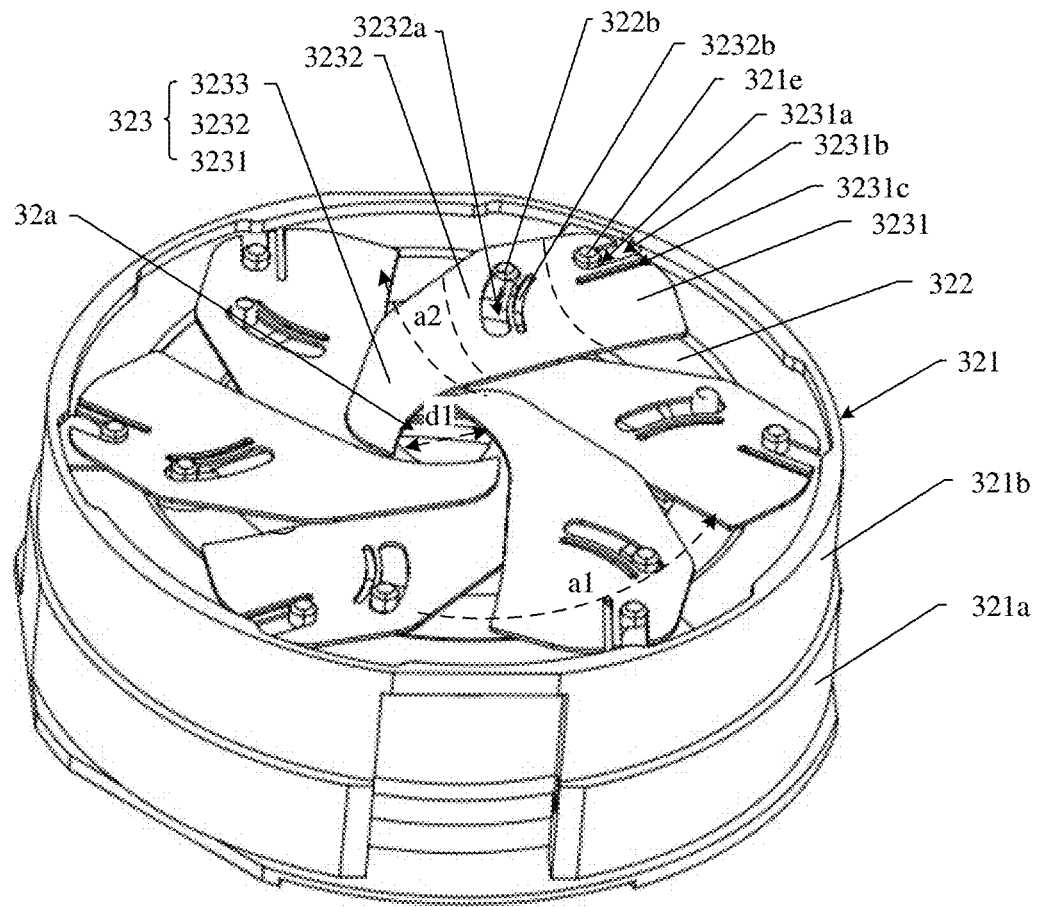
FIG. 13 is an assembly diagram of a case and a second carrier in the variable aperture shown in FIG. 8 and a plurality of blades shown in FIG. 12.

The second part 3232 of the blade 323 is configured to slidably connect to the second carrier 322. In some embodiments, refer to FIG. 10 or FIG. 12. A guide hole 3232a is disposed on the second part 3232 of the blade 323. For example, the guide hole 3232a is a strip-shaped hole. One of two ends of the guide hole 3232a that are in a length direction of the guide hole 3232a is disposed closer to the rotation hole 3231a than the other end. Refer to FIG. 9. A sliding column 322b is fastened to the second carrier 322. Refer to FIG. 11 or FIG. 13. FIG. 13 is an assembly diagram of the case 321 and the second carrier 322 in the variable aperture 32 shown in FIG. 8 and the plurality of blades 323 shown in FIG. 12. The second part 3232 of the blade 323 is sleeved on the sliding column 322b through the guide hole 3232a, and can be slid relative to the sliding column 322b. In another embodiment, the guide hole 3232a is disposed on the second carrier 322, and the sliding column 322b is disposed on the second part 3232 of the blade 323.

On a basis of the foregoing embodiment, optionally, a diameter of the sliding column 322b is slightly greater than a width of the guide hole 3232a. On this basis, refer to 12. An elastic hole 3232b is further disposed on the second part 3232 of the blade 323. The elastic hole 3232b is disposed close to the guide hole 3232a. A part that is located between the elastic hole 3232b and the guide hole 3232a and that is on the blade 323 forms a second elastic rib. The second elastic rib has a small width, and has specific elasticity. When the sliding column 322b is mounted into the guide hole 3232a, the second elastic rib is forced to generate elastic deformation, so as to apply elastic compression force to the sliding column 322b. This can improve fitting tightness between the sliding column 322b and the guide hole 3232a.

Refer to FIG. 11 and FIG. 13. The third part 3233 of the blade 323 is configured to cooperate with a third part of the another blade, to form the aperture hole 32a through enclosure. The third part 3233 of the blade 323 is long-strip-shaped. Refer to FIG. 10 and FIG. 12. The third part 3233 of the blade 323 includes an inner edge 3233a. The inner edge 3233a is an edge that forms the aperture hole 32a. A shape of the inner edge 3233a may be a straight line, an arc line, or partially a straight line and partially an arc line. A shape of the inner edge 3233a may be alternatively another irregular shape. In this embodiment, for example, the shape of the inner edge 3233a is an arc line.

In the foregoing embodiment, refer to FIG. 11 and FIG. 13. A diameter of the aperture hole 32a is d1. When the second carrier 322 is rotated relative to the case 321 in a direction a1, the sliding column 322b may push the blade 323 to rotate around the rotating shaft 321e in a direction a2. This can increase the diameter d1 of the aperture hole 32a. On the contrary, when the second carrier 322 is rotated relative to the case 321 in a reverse direction of the direction a1, the sliding column 322b may push the blade 323 to rotate around the rotating shaft 321e in a reverse direction of the direction a2. This can reduce the diameter d1 of the aperture hole 32a. In this way, the size of the aperture hole 32a can be adjusted.

Figure 14:
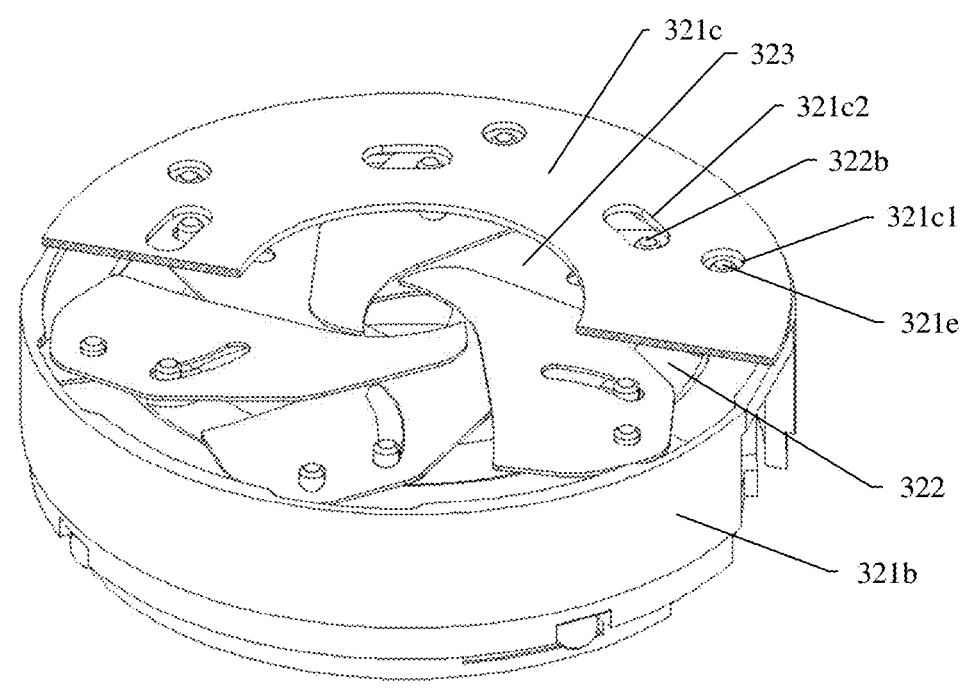
FIG. 14 is an assembly diagram of a side frame, a second carrier, a blade, and a cover plate in the variable aperture shown in FIG. 8.

FIG. 14 is an assembly diagram of the side frame 321b, the second carrier 322, the blade 323, and the cover plate 321c in the variable aperture 32 shown in FIG. 8. In this embodiment, half of the cover plate 321c is cut off. The cover plate 321c, the top of the rotating shaft 321e, and the top of the sliding column 322b are located on a same side of the blade 323. The top of the rotating shaft 321e means a highest end part that protrudes from the side frame 321b and that is of the rotating shaft 321e. Similarly, the top of the sliding column 322b means a highest end part that protrudes from the second carrier 322 and that is of the sliding column 322b. The cover plate 321c is configured to limit the blade 323, so as to prevent the blade 323 from being detached from the top of the rotating shaft 321e and the top of the sliding column 322b.

In some embodiments, still refer to FIG. 14. A first avoidance hole 321c1 is disposed at a position that corresponds to the rotating shaft 321e and that is on the cover plate 321c, to reduce a height of the variable aperture 32 in the Z-axis direction. The top of the rotating shaft 321e is located in the first avoidance hole 321c1. A second avoidance hole 321c2 is disposed at a position that corresponds to the sliding column 322b and that is on the cover plate 321c. The top of the sliding column 322b is located in the second avoidance hole 321c2. In this way, the cover plate 321c may be closer to the blade 323. The height of the variable aperture 32 in the Z-axis direction can be reduced.

The drive apparatus 324 is configured to drive the second carrier 322 to rotate relative to the case 321, so as to adjust the size of the aperture hole 32a. In some embodiments, refer to FIG. 8. The drive apparatus 324 includes at least one actuator 3241. For example, the drive apparatus 324 may include two actuators 3241. The two actuators 3241 are evenly arranged in the circumferential direction of the second carrier 322. In another example, the drive apparatus 324 may alternatively include one or more than three actuators 3241.

Figure 15:
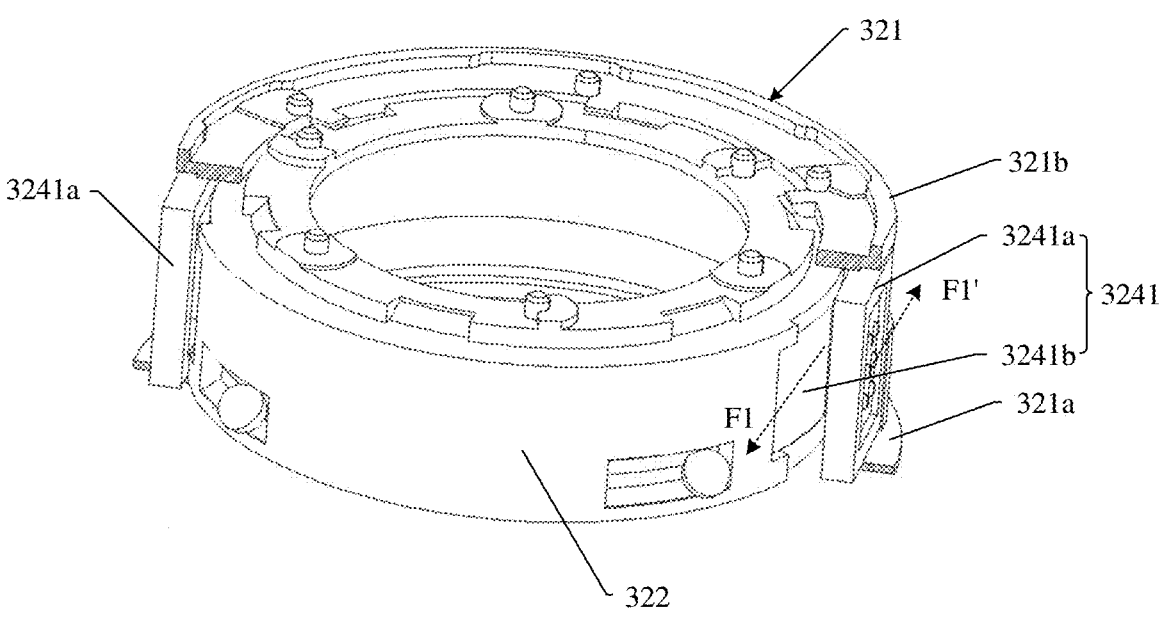
FIG. 15 is an assembly diagram of a case, a second carrier, and a drive apparatus in the variable aperture shown in FIG. 8.

Each actuator 3241 includes at least one coil 3241a and one first magnet 3241b. FIG. 15 is an assembly diagram of the case 321, the second carrier 322, and the drive apparatus 324 in the variable aperture 32 shown in FIG. 8. In this embodiment, half of the case 321 is cut off. The coil 3241a is fastened to the case 321, and the first magnet 3241b is fastened to the second carrier 322. In another embodiment, the coil 3241a may be alternatively fastened to the second carrier 322, and the first magnet 3241b may be alternatively fastened to the case 321.

The at least one coil 3241a is opposite to the first magnet 3241b. In other words, an orthographic projection of the at least one coil 3241a on the first magnet 3241b overlaps first magnet 3241b. When the coil 3241a is powered on, interaction force (ampere force) F1 and interaction force (ampere force) F1' that are tangential to a periphery of the second carrier 322 are generated between the at least one coil 3241a and the first magnet 3241b under an action of a magnetic field of the first magnet 3241b. Under the interaction force, the second carrier 322 may be driven to rotate relative to the case 321.

In the foregoing embodiment, there may be one or more coils 3241a included in each actuator 3241.

Figure 16A:
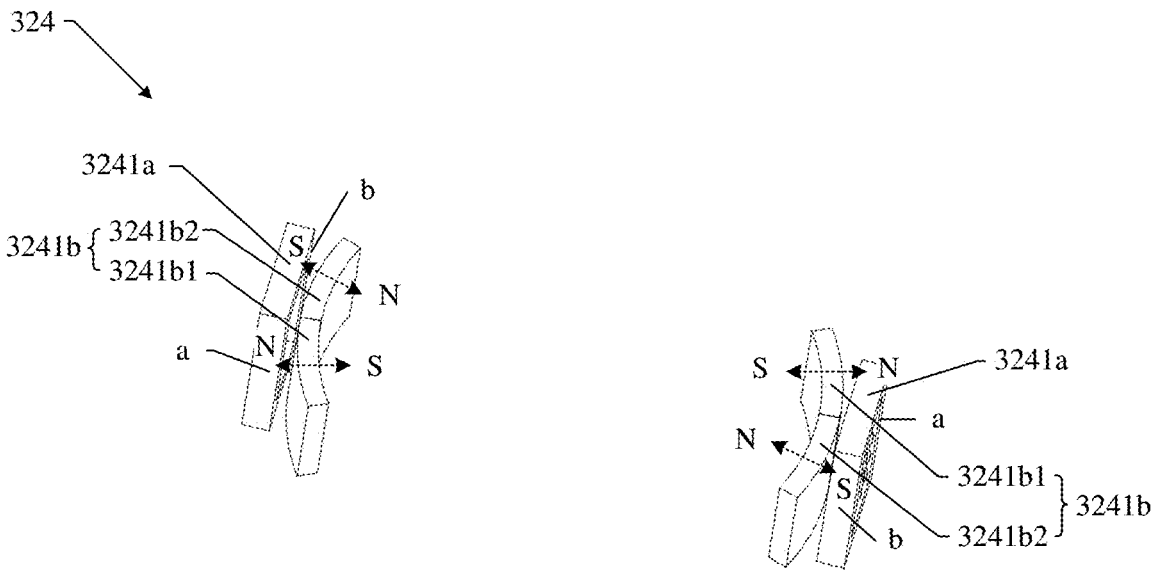
FIG. 16*a* is a schematic diagram of a structure of the drive apparatus in FIG. 15.

In some embodiments, FIG. 16a is a schematic diagram of a structure of the drive apparatus 324 in FIG. 15. Each actuator 3241 includes one coil 3241a. The coil 3241a is opposite to the first magnet 3241b. In other words, an orthographic projection of the coil 3241a on the first magnet 3241b overlaps the first magnet 3241b.

On this basis, optionally, the first magnet 3241b includes a first magnet unit 3242b1 and a second magnet unit 3242b2, to drive the second carrier 322 to rotate relative to the case 321. Two sides of the coil 3241a that are arranged in the circumferential direction of the second carrier 322 are defined as a first side a and a second side b respectively. The first side a is opposite to the first magnet unit 3242b1. In other words, an orthographic projection of the first side a on the first magnet unit 3242*b*1 overlaps the first magnet unit 3242*b*1. The second side b is opposite to the second magnet unit 3242*b*2. In other words, an orthographic projection of the second side b on the second magnet unit 3242*b*2 overlaps the second magnet unit 3242*b*2. Magnetization directions of the first magnet unit 3242*b*1 and the second magnet unit 3242*b*2 are reverse. A magnetization direction is an arrangement direction of an N pole and an S pole. In this way, directions of ampere force applied to the first side a and the second side b are the same, and the second carrier 322 can be driven to rotate relative to the case 321.

Figure 16B:
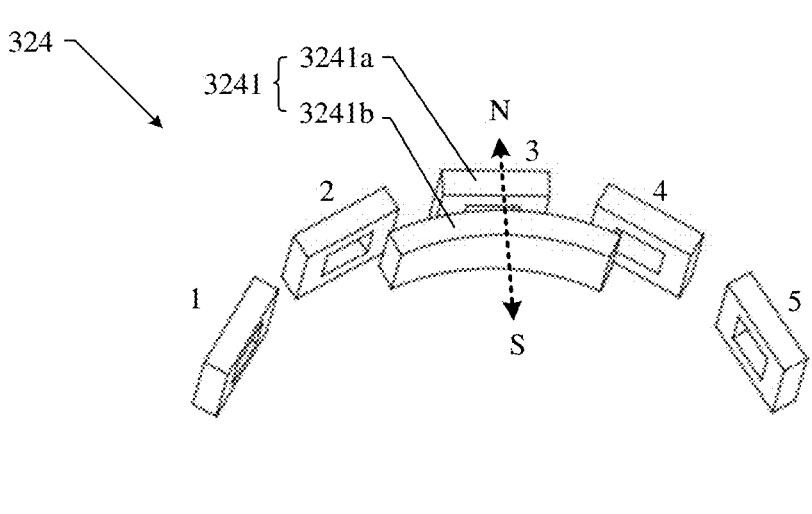
FIG. 16*b* is a schematic diagram of a structure of a drive apparatus according to some other embodiments of this application.
Figure 16B:
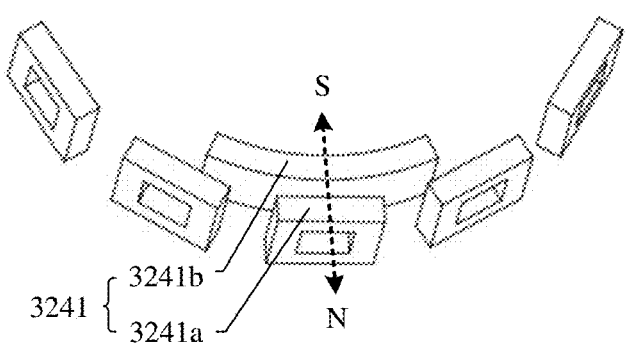

In some other embodiments, FIG. 16*b* is a schematic diagram of a structure of the drive apparatus 324 according to some other embodiments of this application. In this embodiment, the first magnet 3241*b* is fastened to the second carrier 322 in FIG. 15, and the coil 3241*a* is fastened to the case 321 in FIG. 15. Magnetization directions of the first magnet 3241*b* at all positions that are in the circumferential direction of the second carrier 322 are consistent. Each actuator 3241 includes a plurality of coils 3241*a*. The plurality of coils 3241*a* are arranged along an arc-shaped track line. A circle center line corresponding to the arc-shaped track line is collinear with the rotation axis of the second carrier 322. More than two adjacent coils 3241*a* in the plurality of coils 3241*a* are opposite to the first magnet 3241*b*. In other words, orthographic projections of the more than two adjacent coils 3241*a* in the plurality of coils 3241*a* on the first magnet 3241*b* overlap the first magnet 3241*b*. Different coils 3241*a* in the plurality of coils 3241*a* are powered on, so that the first magnet 3241*b* can be driven to rotate to be opposite to any coil 3241*a* in the plurality of coils 3241*a*. In this way, a rotation angle of the second carrier 322 relative to the case 321 can be increased by using the plurality of coils 3241*a*, to increase an adjustment range of the size of the aperture hole 32*a*. For example, an F value of the variable aperture 32 can be adjusted in a range from 1.X to 10.X.

For example, refer to FIG. 16*b*. Each actuator 3241 includes five coils 3241*a*: a coil 1, a coil 2, a coil 3, a coil 4, and a coil 5. Three adjacent coils 3241*a* (which are respectively the coil 2, the coil 3, and the coil 4) are opposite to the first magnet 3241*b*. When a current is supplied to the coil 2 and the coil 4, the first magnet 3241*b* may be driven to rotate in a direction, for example, rotate anticlockwise. When the first magnet 3241*b* is rotated anticlockwise to a position opposite to the coil 1, the coil 2, and the coil 3, the current is switched for supply to the coil 1 and the coil 3, to drive the first magnet 3241*b* to further rotate anticlockwise. This drive mode is similar to a drive mode of a stepper motor. Large-angle drive can be implemented.

In the foregoing embodiments, a magnetization direction of the first magnet 3241*b* may be a radial direction of the second carrier 322, or may be parallel to the rotation axis of the second carrier 322. This is not specifically limited herein.

In some embodiments, refer to FIG. 16*a* and FIG. 16*b*. The magnetization direction of the first magnet 3241*b* is the radial direction of the second carrier 322. Specifically, in the embodiment shown in FIG. 16*a*, both the magnetization directions of the first magnet unit 3242*b*1 and the second magnet unit 3242*b*2 are the radial direction of the second carrier 322. The first magnet unit 3242*b*1 has an N pole and an S pole from an outer side to an inner side. The second magnet unit 3242*b*2 has an S pole and an N pole from an outer side to an inner side. The outer side of the first magnet unit 3242*b*1 is a side that is far away from the rotation axis of the second carrier 322 and that is of the first magnet unit

3242*b*1. The inner side of the first magnet unit 3242*b*1 is a side that is close to the rotation axis of the second carrier 322 and that is of the first magnet unit 3242*b*1. In another embodiment, the first magnet unit 3242*b*1 has the S pole to the N pole from the outer side to the inner side, and the second magnet unit 3242*b*2 has the N pole to the S pole from the outer side to the inner side. In the embodiment shown in FIG. 16*b*, the first magnet 3241*b* has an N pole to an S pole from an outer side to an inner side. In another embodiment, the first magnet 3241*b* has the S pole to the N pole from the outer side to the inner side. A plane on which the coil 3241*a* is located is parallel to the rotation axis of the second carrier 322.

Figure 16C:
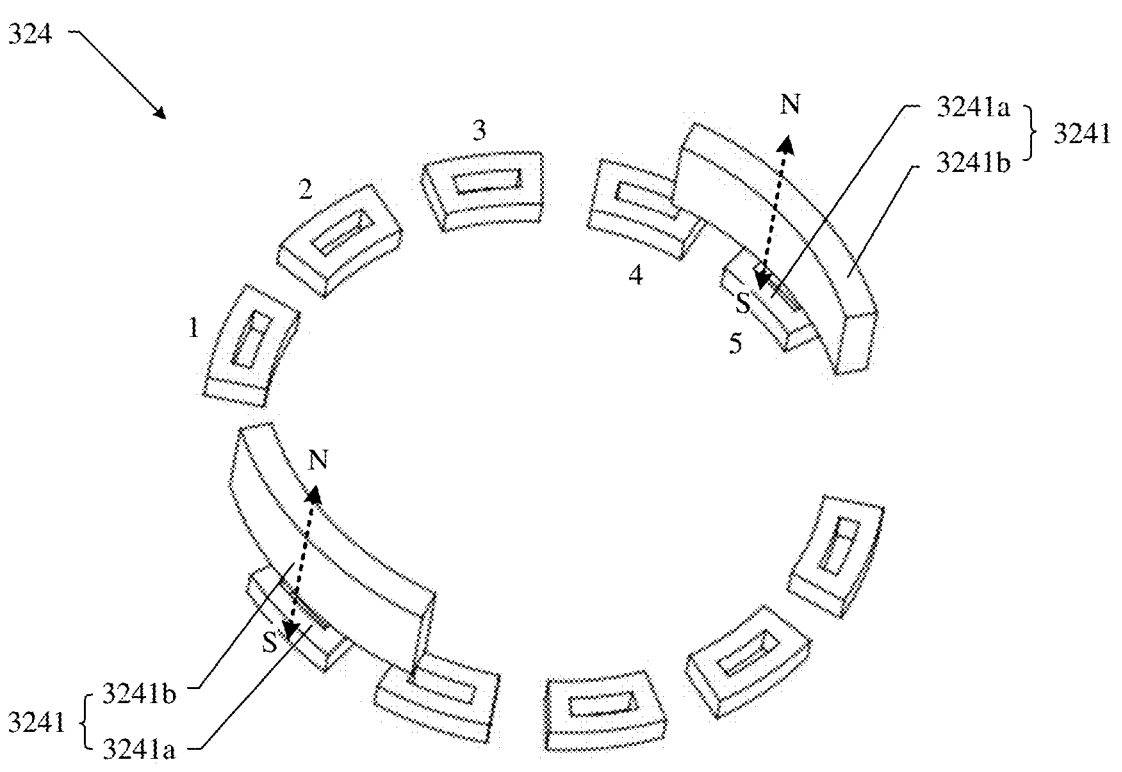
FIG. 16*c* is a schematic diagram of a structure of a drive apparatus according to still some embodiments of this application.

In some other embodiments, FIG. 16*c* is a schematic diagram of a structure of the drive apparatus 324 according to still some embodiments of this application. In this embodiment, the first magnet 3241*b* is fastened to the second carrier 322 in FIG. 15, and the coil 3241*a* is fastened to the case 321 in FIG. 15. Magnetization directions of the first magnet 3241*b* at all positions that are in the circumferential direction of the second carrier 322 are consistent. A magnetization direction of the first magnet 3241*b* is parallel to the rotation axis of the second carrier 322. A plane on which the coil 3241*a* is located is perpendicular to the rotation axis of the second carrier 322.

In some embodiments, refer to FIG. 9. The variable aperture 32 further includes a position-limiting structure 326, to limit the rotation angle of the second carrier 322 relative to the case 321, so as to prevent the first magnet 3241*b* from being detached from the coil 3241*a*. The position-limiting structure 326 is configured to limit the rotation angle of the second carrier 322 relative to the case 321. For example, the position-limiting structure 326 includes a long position-limiting groove 3261 and a position-limiting protrusion 3262. The long position-limiting groove 3261 is disposed on the second carrier 322, and the position-limiting protrusion 3262 is disposed on the case 321. In another embodiment, the long position-limiting groove 3261 is disposed on the case 321, and the position-limiting protrusion 3262 is disposed on the second carrier 322. The long position-limiting groove 3261 extends in the circumferential direction of the second carrier 322, and the position-limiting protrusion 3262 is located in the long position-limiting groove 3261. When the second carrier 322 is rotated relative to the case 321, the position-limiting protrusion 3262 is moved along the long position-limiting groove 3261. When the position-limiting protrusion 3262 is moved to an end part of the long position-limiting groove 3261, an inner wall of the end part of the long position-limiting groove 3261 implements a function of stopping the position-limiting protrusion 3262, to prevent the second carrier 322 from continuing to be rotated. In this way, the rotation angle of the second carrier 322 is limited.

On a basis of the foregoing embodiment, optionally, still refer to FIG. 9. There are a plurality of long position-limiting grooves 3261, and the plurality of long position-limiting grooves 3261 are evenly arranged in the circumferential direction of the second carrier 322. Correspondingly, there are a plurality of position-limiting protrusions 3262, and the plurality of position-limiting protrusions 3262 are evenly arranged along a circumference of an inner wall of the case 321. The plurality of position-limiting protrusions 3262 are respectively located in the plurality of long position-limiting grooves 3261. When the second carrier 322 is rotated relative to the case 321, the plurality of position-limiting protrusions 3262 are separately moved in the plurality of long position-limiting grooves 3261, and are separately limited by using end parts of the plurality of long position-limiting grooves 3261. In this way, impact force during position limitation is evenly dispersed between the plurality of position-limiting protrusions 3262 and the end parts of the plurality of long position-limiting grooves 3261. Impact wear can be reduced, and a service life can be prolonged.

Refer to FIG. 8. The variable aperture 32 may further include a first drive chip 327. The first drive chip 327 is electrically connected to the coil 3241a in the drive apparatus 324. The first drive chip 327 is further electrically connected to a circuit board 341 of the photosensitive assembly 34 in FIG. 5. The circuit board 341 is configured to send a first power signal and a first control signal to the first drive chip 327. The first drive chip 327 is configured to control, based on the first power signal and the first control signal, the drive apparatus 324 to drive the second carrier 322 to rotate relative to the case 321, so as to adjust the size of the aperture hole 32a.

Figure 17:
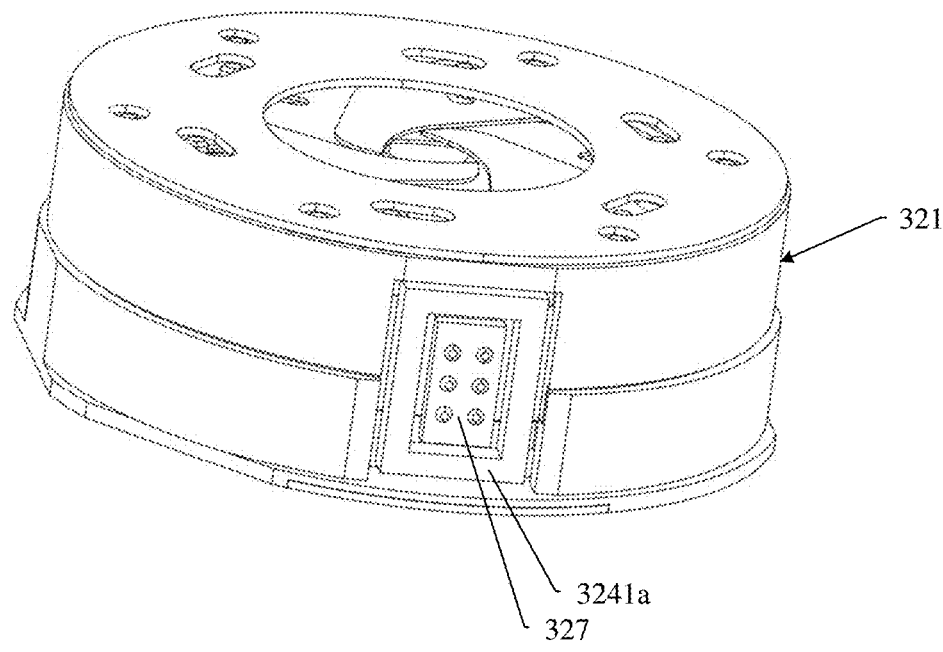
FIG. 17 is a schematic diagram of a position of a first drive chip in the variable aperture shown in FIG. 8.

For example, FIG. 17 is a schematic diagram of a position of the first drive chip 327 in the variable aperture 32 shown in FIG. 8. In this embodiment, the first drive chip 327 is disposed in a hollow area formed by one coil 3241a in the drive apparatus 324 through enclosure. In addition, relative positions of the first drive chip 327 and the coil 3241a are fixed. In another embodiment, the first drive chip 327 may be alternatively integrated on the circuit board 341 of the photosensitive assembly 34 in FIG. 5.

Figure 18:
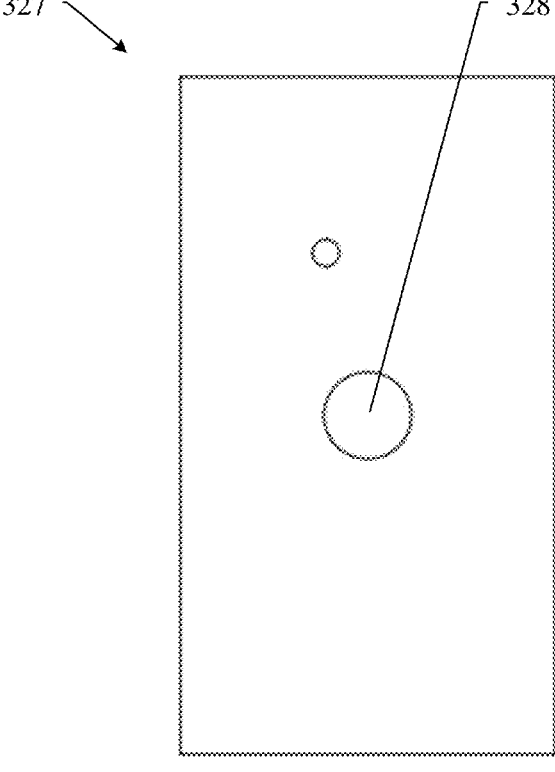
FIG. 18 is a schematic diagram of a surface that faces a first magnet and that is of a first drive chip in the variable aperture shown in FIG. 8.

In some embodiments, the variable aperture 32 further includes a detection element. The detection element is electrically connected to the circuit board 341 of the photosensitive assembly 34 in FIG. 5. The detection element is configured to detect the rotation angle of the second carrier 322 relative to the case 321. The circuit board 341 is configured to control, based on a detection value of the detection element, the first drive chip 327 to drive the second carrier 322 to rotate relative to the case 321, so as to implement closed-loop control of the variable aperture 32. For example, the detection element is a Hall effect sensor 328. FIG. 18 is a schematic diagram of a surface that faces the first magnet 3241b and that is of the first drive chip 327 in the variable aperture 32 shown in FIG. 8. The Hall effect sensor 328 is integrated on the surface that faces the first magnet 3241b and that is of the first drive chip 327. When the first magnet 3241b is rotated with the second carrier 322, the Hall effect sensor 328 can detect the rotation angle of the second carrier 322 by sensing a change of a magnetic field. In this embodiment, the Hall effect sensor 328 may communicate with the circuit board 341 by using a signal cable of the first drive chip 327. In another embodiment, the variable aperture 32 may alternatively include no detection element.

Figure 19:
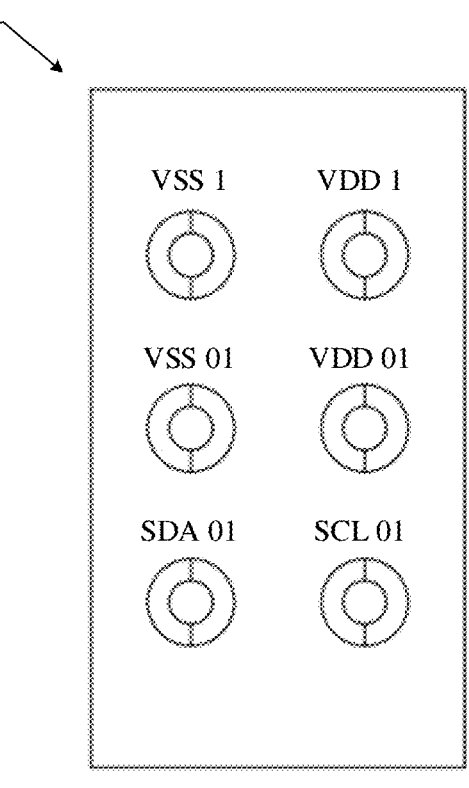
FIG. 19 is a schematic diagram of an outer surface of a first drive chip in the variable aperture shown in FIG. 8.

In some embodiments, FIG. 19 is a schematic diagram of an outer surface of the first drive chip 327 in the variable aperture 32 shown in FIG. 8. The outer surface of the first drive chip 327 is a surface that is far away from the first magnet 3241b and that is of the first drive chip 327. In some embodiments, a power output terminal VSS 1, a ground output terminal VDD 1, a first power input terminal VSS 11, a first ground input terminal VDD 01, a first serial data terminal SDA 01, and a first serial clock terminal SCL 01 may be disposed on the first drive chip 327. The power output terminal VSS 1 and the ground output terminal VDD 1 are configured to connect to the coil 3241a, so as to output a current to the coil 3241a. In this way, a magnetic field is generated between the coil 3241a and the first magnet 3241b, to drive the second carrier 322 to rotate. When each actuator in the drive apparatus 324 includes a plurality of coils 3241a, there are also a plurality of pairs of power output terminals VSS 1 and ground output terminals VDD 1. The plurality of pairs of power output terminals VSS 1 and ground output terminals VDD 1 are electrically connected to the plurality of coils 3241a respectively, to implement separate driving of the plurality of coils 3241a. The first power input terminal VSS 11 and the first ground input terminal VDD 01 are configured to connect to the circuit board 341 of the photosensitive assembly 34 in FIG. 5, so as to input the first power signal by using the circuit board 341. The first serial data terminal SDA 01 and the first serial clock terminal SCL 01 are configured to connect to the circuit board 341, so as to transmit the first control signal by using the circuit board 341, and implement communication between the Hall effect sensor 328 and the circuit board 341. The first drive chip 327 is configured to determine, based on the first power signal and the first control signal, magnitudes of currents output by the power output terminal VSS 1 and the ground output terminal VDD 1 and time points at which the currents are output. In this way, the second carrier 322 is driven to rotate relative to the case 321, so as to adjust the size of the aperture hole 32a to a target value.

Figure 20A:
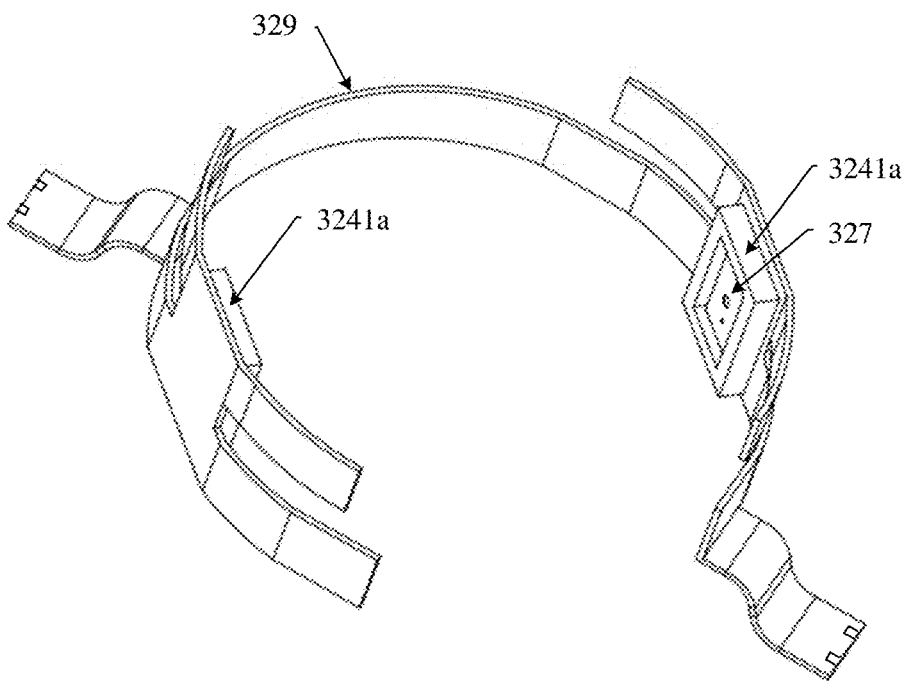
FIG. 20*a* is a schematic diagram of an assembly structure of a third electrical connection structure, a drive chip, and a coil in the variable aperture 32 shown in FIG. 8.

Refer to FIG. 8. The variable aperture 32 further includes a third electrical connection structure 329. For example, the third electrical connection structure 329 may be a rigid circuit board. The third electrical connection structure 329 may be a flexible circuit board (flexible printed circuit, FPC). The third electrical connection structure 329 may be alternatively a structure formed by connecting a plurality of conducting wires by using a flexible structure. The third electrical connection structure 329 wraps and is fastened to a side wall of the case 321. FIG. 20a is a schematic diagram of an assembly structure of the third electrical connection structure 329, the drive chip 327, and the coil 3241a in the variable aperture 32 shown in FIG. 8. The third electrical connection structure 329 is located on an outer side of the coil 3241a. The third electrical connection structure 329 electrically connects a positive electrode of the coil 3241a to the power output terminal VSS 1, and electrically connects a negative electrode of the coil 3241a to the ground output terminal VDD 1. In this way, power output by the first drive chip 327 can be transferred to the coil 3241a.

Figure 20B:
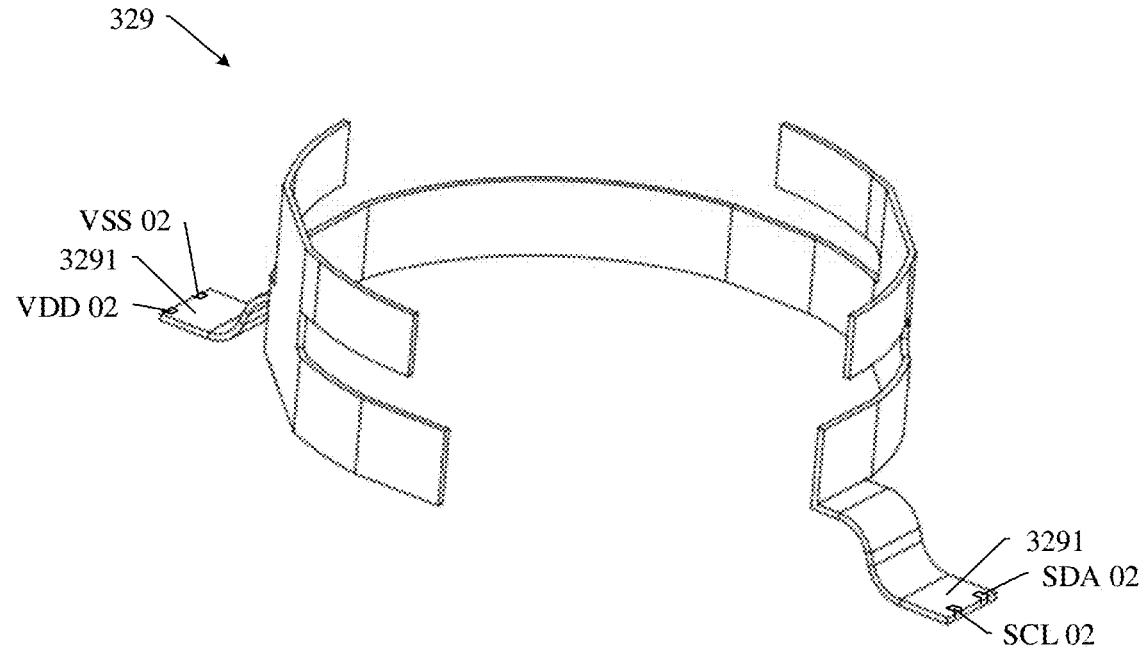
FIG. 20*b* is a schematic diagram of a structure of a third electrical connection structure in the variable aperture shown in FIG. 8.

Further, in some embodiments, FIG. 20b is a schematic diagram of a structure of the third electrical connection structure 329 in the variable aperture 32 shown in FIG. 8. The third electrical connection structure 329 further has two end parts 3291. The two end parts 3291 have a second power input terminal VSS 02, a second ground input terminal VDD 02, a second serial data terminal SDA 02, and a second serial clock terminal SCL 02. For example, one end part 3291 has the second power input terminal VSS 02 and the second ground input terminal VDD 02, and the other end part 3291 has the second serial data terminal SDA 02 and the second serial clock terminal SCL 02. In another example, one end part 3291 has the second power input terminal VSS 02 and the second serial data terminal SDA 02, and the other end part 3291 has the second ground input terminal VDD 02 and the second serial clock terminal SCL 02. The third electrical connection structure 329 electrically connects the second power input terminal VSS 02 to the first power input terminal VSS 11, electrically connects the second ground input terminal VDD 02 to the first ground input terminal VDD 01, electrically connects the second serial data terminal SDA 02 to the first serial data terminal SDA 01, and electrically connects the second serial clock terminal SCL 02 to the first serial clock terminal SCL 01. In this way, the first power signal and the first control signal of the first drive chip 327 are introduced by using the third electrical connection structure 329.

In some embodiments, refer to FIG. 8. The variable aperture 32 further includes a reset structure 330, to reset the blade 323, so that a next adjustment operation of the aperture hole is not affected. The reset structure 330 is configured to apply reset force to the second carrier 322 after the drive apparatus 324 drives the second carrier 322 to rotate by a specific angle relative to the case 321 and driving force generated by the drive apparatus 324 is removed. The reset force can drive the second carrier 322 to restore to an initial position, so that the next adjustment operation of the aperture hole is not affected.

The reset structure 330 has a plurality of structural forms.

Figure 21:
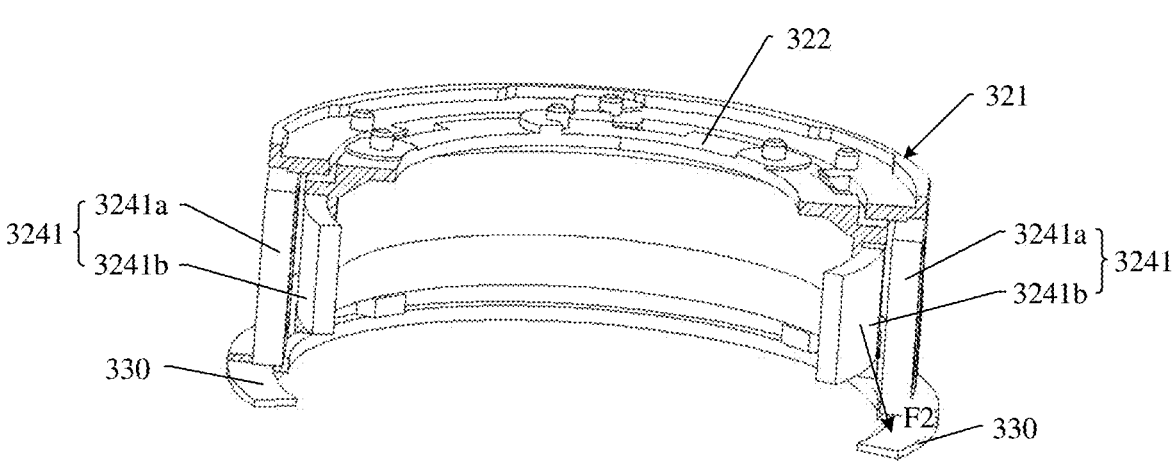
FIG. 21 is an assembly diagram of a case, a second carrier, a drive apparatus, and a reset structure in the variable aperture shown in FIG. 8.
Figure 22:
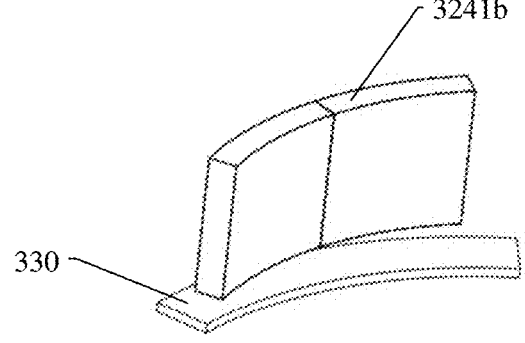
FIG. 22 is an analysis diagram of force exerted between a first magnetic plate and a first magnet after the second carrier is rotated by a specific angle relative to the case in FIG. 21.
Figure 22:
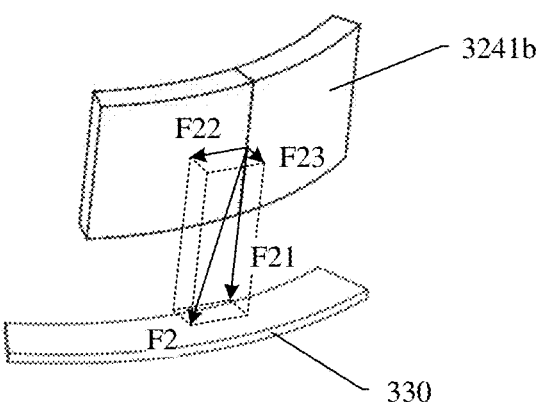

In some embodiments, FIG. 21 is an assembly diagram of the case 321, the second carrier 322, the drive apparatus 324, and the reset structure 330 in the variable aperture 32 shown in FIG. 8. In this embodiment, half of each of both the case 321 and the second carrier 322 is cut off. The reset structure 330 includes a first magnetic plate. The first magnetic plate is fastened to the case 321. For example, the first magnetic plate may be fastened to the pedestal 321*a* of the case 321. In another embodiment, the first magnetic plate may be alternatively fastened to the side frame 321*b* or the cover plate 321*c* of the case 321. There are a plurality of first magnetic plates, and the plurality of first magnetic plates are evenly disposed in a circumferential direction of the case 321. For example, there are two first magnetic plates. The two first magnetic plates are separately disposed close to two first magnets 3241*b*. There is magnetic attraction force F2 between each of the two first magnetic plates and the two first magnets 3241*b*. FIG. 22 is an analysis diagram of force exerted between the first magnetic plate and the first magnet 3241*b* after the second carrier 322 is rotated by the specific angle relative to the case 321 in FIG. 21. In one aspect, the magnetic attraction force F2 has first component force F21 in an extension direction of the rotation axis of the second carrier 322 and third component force F23 in the radial direction of the second carrier 322. Under an action of the first component force F21 and the third component force F23, the second carrier 322 may press the ball 325 in FIG. 9 tightly, to ensure driving stability. To be specific, the second carrier 322 is not likely to tilt or shake in a static state or in a rotation process. In another aspect, still refer to FIG. 22. When the drive apparatus 324 drives the second carrier 322 to rotate relative to the case 321, the magnetic attraction force F2 has second component force F22 that is tangential to the periphery of the second carrier 322. When the driving force of the drive apparatus 324 is removed, under an action of the second component force F22, the second carrier 322 can be driven to restore to the initial position.

Figure 23:
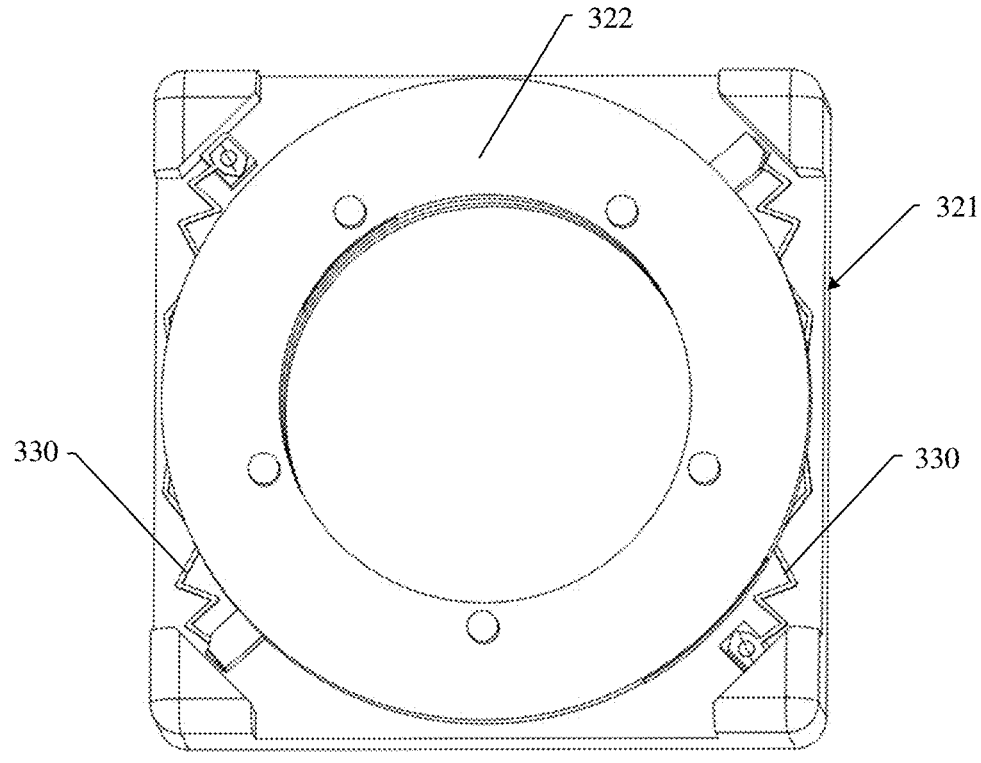
FIG. 23 is an assembly diagram of a case, a second carrier, and a reset structure in a variable aperture according to some other embodiments of this application.

In some other embodiments, FIG. 23 is an assembly diagram of the case 321, the second carrier 322, and the reset structure 330 in the variable aperture 32 according to some other embodiments of this application. In this embodiment, the reset structure 330 includes an elastic member. The elastic member includes but is not limited to a spring plate and a spiral spring. In some embodiments, the elastic member is the spring plate. One end of the elastic member is fixedly connected to the case 321, and the other end of the elastic member is fixedly connected to the second carrier 322. When the drive apparatus 324 drives the second carrier 322 to rotate relative to the case 321, the elastic member generates elastic deformation and accumulates elastic force. When the driving force of the drive apparatus 324 is removed, under an action of the elastic force, the second carrier 322 can be driven to reset.

Refer to FIG. 4 and FIG. 5. The drive motor 33 is configured to drive the optical camera lens 31 to move, so as to implement automatic focusing and/or optical image stabilization. Specifically, the drive motor 33 may be configured to only drive the optical camera lens 31 to move in the Z-axis direction, to implement automatic focusing. Alternatively, the drive motor 33 may be configured to only drive the optical camera lens 31 to move on the plane XY or tilt in any direction around the optical axis of the optical camera lens 31, to implement optical image stabilization. Alternatively, the drive motor 33 may be configured to implement both automatic focusing and optical image stabilization. This is not specifically limited herein.

Figure 24:
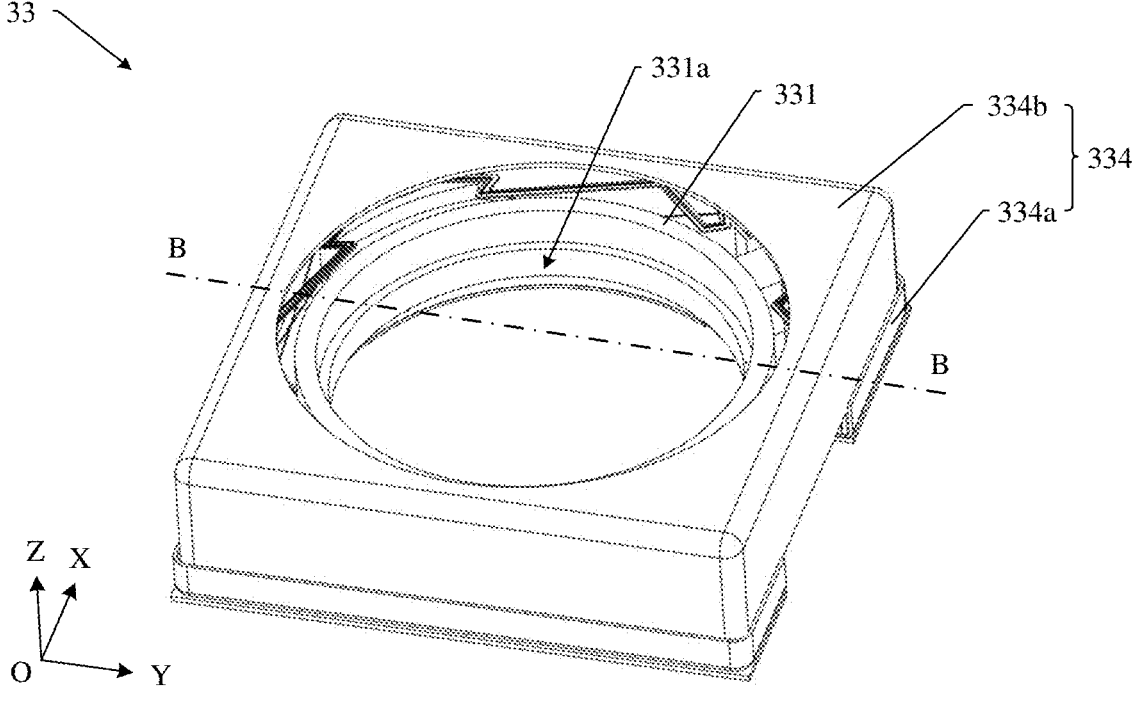
FIG. 24 is a three-dimensional diagram of a drive motor in the camera module shown in FIG. 4 and FIG. 5.
Figure 25:
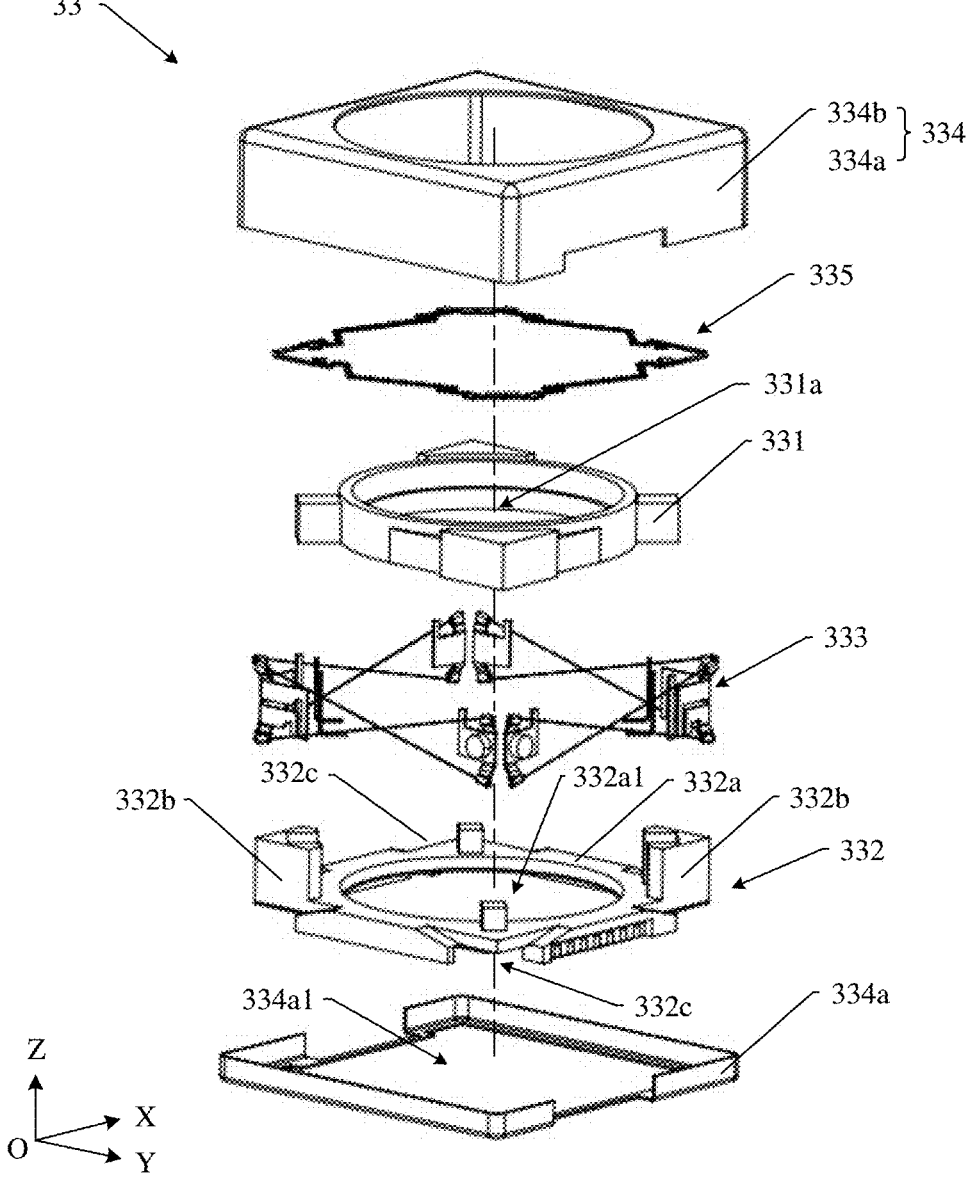
FIG. 25 is an exploded view of the drive motor shown in FIG. 24.
Figure 26:
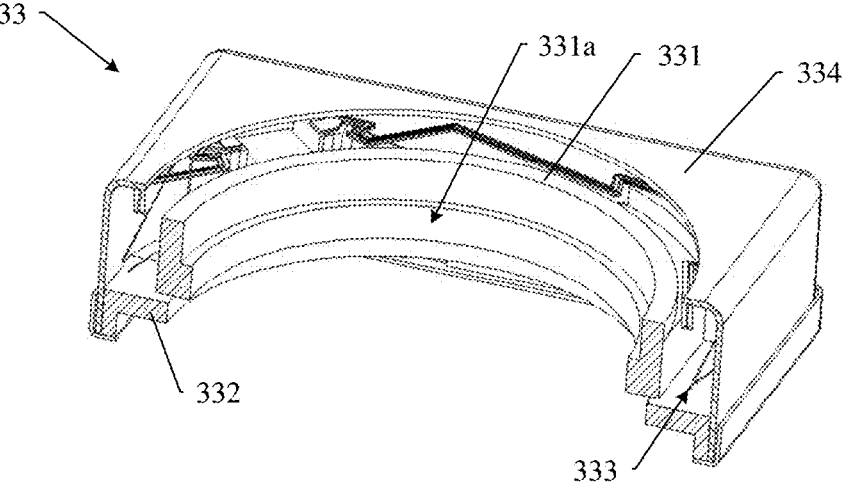
FIG. 26 is a three-dimensional sectional view of the drive motor shown in FIG. 24 along a line B-B.

Refer to FIG. 24 to FIG. 26. FIG. 24 is a three-dimensional diagram of the drive motor 33 in the camera module 30 shown in FIG. 4 and FIG. 5. FIG. 25 is an exploded view of the drive motor 33 shown in FIG. 24. FIG. 26 is a three-dimensional sectional view of the drive motor 33 shown in FIG. 24 along a line B-B. The drive motor 33 includes a first carrier 331, a base 332, a drive assembly 333, and a housing 334.

It may be understood that FIG. 24 to FIG. 26 merely show, as an example, some components included in the drive motor 33, and actual shapes, actual sizes, actual positions, and actual structures of these components are not limited by FIG. 24 to FIG. 26. In some embodiments, the drive motor 33 may alternatively include no housing 334.

The first carrier 331 has a camera lens mounting hole 331*a*. Both ends of the camera lens mounting hole 331*a* in an axial direction are open. The optical camera lens 31 in FIG. 6 is mounted in the camera lens mounting hole 331*a*. In some embodiments, the optical camera lens 31 is mounted in the camera lens mounting hole 331*a* in a manner of a detachable connection, for example, clamping or a threaded connection, to facilitate replacement of the optical camera lens 31. In addition, when the optical camera lens 31 is mounted in the camera lens mounting hole 331*a*, an extension direction of the optical axis of the optical camera lens 31 is consistent with the axial direction of the camera lens mounting hole 331*a*. A material for forming the first carrier 331 includes but is not limited to metal and plastic. In some embodiments, the material for forming the first carrier 331 is the plastic.

The base 332 includes a substrate part 332*a* and a support column 332*b*. The substrate part 332*a* is located on a side that is far away from the aperture hole 32*a* of the variable aperture 32 in FIG. 5 and that is of the first carrier 331. In some embodiments, a third avoidance hole 332*a*1 is disposed on the substrate part 332*a*. When the optical camera lens 31 shown in FIG. 6 is mounted in the camera lens mounting hole 331*a* of the first carrier 331, an end at which the light outlet surface 31*b* of the optical camera lens 31 is located is accommodated in the third avoidance hole 332*a*1. This helps reduce a height of the camera module 30 in the Z-axis direction.

The support column 332*b* is fastened to a surface that is close to the first carrier 331 and that is of the substrate part 332*a*. In some embodiments, there are two support columns 332*b*. The two support columns 332*b* are evenly disposed in a circumferential direction of the first carrier 331.

The drive assembly 333 is connected between the first carrier 331 and the base 332. Specifically, the drive assembly 333 is connected between the first carrier 331 and the support column 332*b* of the base 332. The drive assembly 333 supports the first carrier 331 on the base 332. In addition, the drive assembly 333 is further configured to drive the first carrier 331 and the optical camera lens 31 to move together in the Z-axis direction, to implement automatic focusing. Alternatively, the drive assembly 333 is configured to drive the first carrier 331 and the optical camera lens 31 to move together on the plane XY or tilt in any direction around, to implement optical image stabilization.

The housing 334 covers the first carrier 331, the base 332, and the drive assembly 333, and is fastened relative to the base 332, to prevent dust. A material of the housing 334 includes but is not limited to plastic and metal.

The housing 334 may be an integrated structure, or may be formed by assembling a plurality of parts. In some embodiments, refer to FIG. 25. The housing 334 includes a lower cover 334a and an upper cover 334b. The lower cover 334a covers a side that is far away from the first carrier 331 and that is of the substrate part 332a. An optical path avoidance hole 334a1 is disposed on the lower cover 334a. The optical path avoidance hole 334a1 is configured to avoid light coming out from the light outlet surface 31b of the optical camera lens 31. The lower cover 334a and the base 332 are fastened together. For example, the lower cover 334a and the base 332 are fastened together through adhesive bonding. The upper cover 334b covers the first carrier 331, the base 332, and the drive assembly 333, and the upper cover 334b and the lower cover 334a are butted and fastened together in a manner, for example, a threaded connection, clamping, or adhesive bonding. In this way, the housing 334 is formed by assembling the lower cover 334a and the upper cover 334b. This can consider both molding difficulty and assembly difficulty of the housing 334.

The optical camera lens 31, the variable aperture 32, and the drive motor 33 in the camera module 30 shown in FIG. 4 and FIG. 5 are separately described in detail above. The optical camera lens 31 is mounted in the first carrier 331 of the drive motor 33. However, an assembly relationship between the variable aperture 32, the optical camera lens 31, and the drive motor 33 is not mentioned. The following mainly describes the assembly relationship between the variable aperture 32, the optical camera lens 31, and the drive motor 33.

Figure 27:
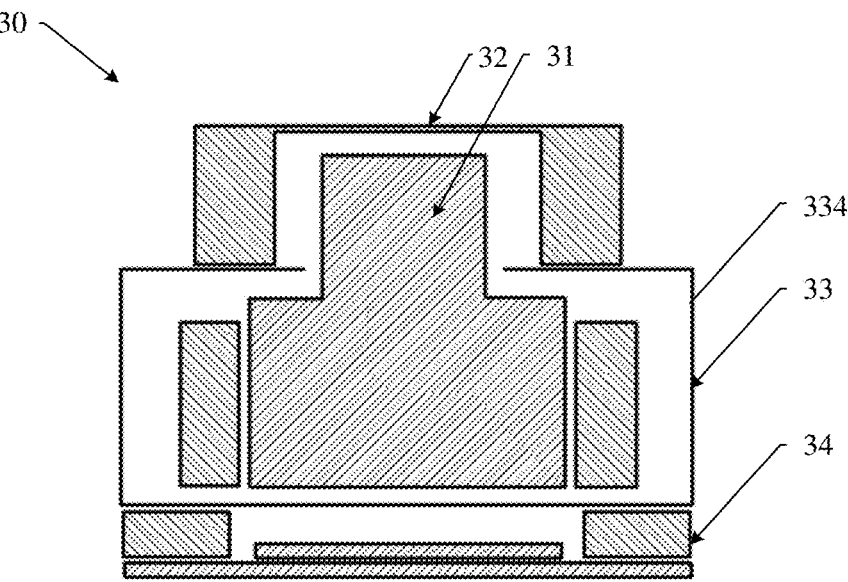
FIG. 27 is a schematic diagram of an assembly relationship between a variable aperture, an optical camera lens, and a drive motor in a camera module according to this application.

In some embodiments, FIG. 27 is a schematic diagram of an assembly relationship between the variable aperture 32, the optical camera lens 31, and the drive motor 33 in the camera module 32 according to this application. In this embodiment, the variable aperture 32 is mounted on the housing 334 of the drive motor 33. Specifically, the variable aperture 32 in FIG. 7 and FIG. 8 may be fastened to the housing 334 of the drive motor 33 shown in FIG. 24 and FIG. 25 by using the case 321. In this case, a load of the drive motor 33 is only the optical camera lens 31, and the load is smaller. The drive assembly 333 in the drive motor 33 is usually a structure including a magnet and a coil. A volume of the drive assembly 333 can be designed to be smaller. This can reduce the volume of the camera module 30. However, the variable aperture 32 is isolated from the optical camera lens 31. Therefore, when the drive assembly 333 drives the first carrier 331 and the optical camera lens 31 to move together to implement automatic focusing and/or optical image stabilization, relative positions of the variable aperture 32 and the light inlet surface of the optical camera lens 31 change. A part of light originally coming into the optical camera lens 31 is blocked by the blade 323 in the variable aperture 32. As a result, a taken image has a dark corner and a black edge. Consequently, shooting quality of the camera module 30 is reduced.

The variable aperture 32 may be integrally fastened to the optical camera lens 31, or may be integrally fastened to the first carrier 331, to avoid the foregoing problem. In this way, the drive assembly 333 drives the variable aperture 32, the optical camera lens 31, and the first carrier 331 to move together relative to the housing 334. In this case, during driving by the drive assembly 333 for motion, relative positions of the variable aperture 32 and the optical camera lens 31 can remain unchanged, so that the shooting quality of the camera module 30 can be ensured. However, the load of the drive motor 33 not only includes the optical camera lens 31, but also includes the variable aperture 32. As a result, the load of the drive motor 33 is larger. If the drive assembly 333 that includes the magnet and the coil is still used for driving, the volume of the drive assembly 333 needs to be designed to be larger, so as to provide sufficient driving force. Consequently, the volume of the camera module 30 cannot be reduced.

In some embodiments, the coil 3241a of the variable aperture 32 shown in FIG. 8 may be fastened to the housing 334 of the drive motor 33 shown in FIG. 25, and the case 321, the second carrier 322, and the first magnet 3241b of the variable aperture 32 may be fastened to the optical camera lens 31 or the first carrier 331, to consider both the volume and the shooting quality of the camera module 30. This reduces the load of the drive motor 31, and reduces the volume of the camera module 30. However, in this case, for reservation of sufficient AF and OIS motion space, a distance between the first magnet 3241b and the coil 3241a is large, and the driving force of the drive apparatus 324 in the variable aperture 32 is insufficient. In addition, when the drive motor 33 drives the variable aperture 32 and the optical camera lens 31 to move, relative positions of the first magnet 3241b and the coil 3241a changes. This further results in the insufficient driving force and low driving stability of the drive apparatus 324.

In this embodiment of this application, the variable aperture 32 is integrally fastened to the optical camera lens 31 or the first carrier 331, to avoid the foregoing problem. This ensures that the relative positions of the variable aperture 32 and the optical camera lens 31 remain unchanged, and the aperture hole 32a of the variable aperture 32 can be independently and stably adjusted.

Figure 28:
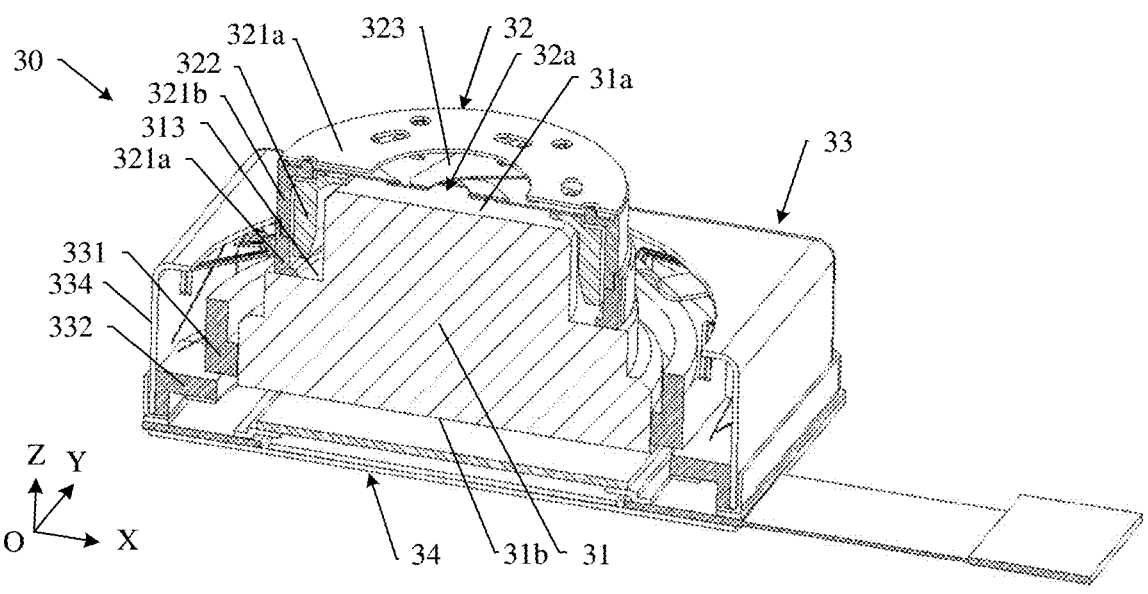
FIG. 28 is a three-dimensional sectional view of the camera module shown in FIG. 4 along a line A-A.

For example, FIG. 28 is a three-dimensional sectional view of the camera module 30 shown in FIG. 4 along a line A-A. The variable aperture 32 is fastened to the optical camera lens 31. Specifically, a step surface 313 is formed on an outer wall of the optical camera lens 31. An orientation of the step surface 313 is consistent with an orientation of the light inlet surface 31a of the optical camera lens 31. The case 321 of the variable aperture 32 is fastened to the step surface 313 in a manner, for example, adhesive bonding, a threaded connection, or clamping. In this way, the variable aperture 32 is integrally fastened to the optical camera lens 31.

Figure 29:
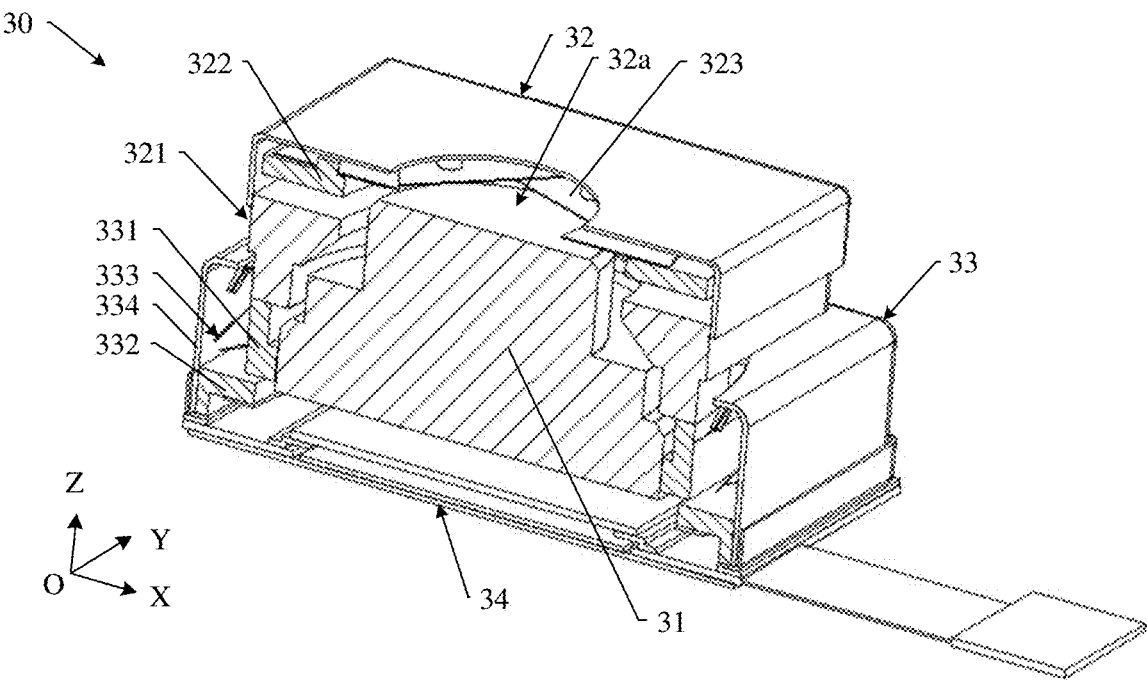
FIG. 29 is a three-dimensional sectional view of a camera module according to some other embodiments of this application.

For another example, FIG. 29 is a three-dimensional sectional view of the camera module 30 according to some other embodiments of this application. In this embodiment, the case 321 of the variable aperture 32 is fastened to the first carrier 331 of the drive motor 33 in a manner, for example, adhesive bonding, a threaded connection, or clamping.

In this way, the drive assembly 333 in the drive motor 33 drives the variable aperture 32, the optical camera lens 31, and the first carrier 331 to move together relative to the housing 334, to implement automatic focusing and/or optical image stabilization. On this basis, the drive assembly 333 of the drive motor 33 may be a shape memory alloy (shape memory alloy, SMA) drive assembly, to form an SMA drive motor, so as to reduce the volume of the drive assembly 333. The SMA drive assembly has features such as large driving force and a small volume. The SMA drive assembly can drive the variable aperture 32, the optical camera lens 31, and the first carrier 331 to move together relative to the housing 334, so as to implement automatic focusing and/or optical image stabilization, and reduce the volume of the camera module 30.

Specifically, the drive assembly 333 may be a four-wire SMA drive assembly, an eight-wire SMA drive assembly, or a more-than-12-wire SMA drive assembly. This is not specifically limited herein. When being a four-wire SMA drive assembly, the drive assembly 333 can drive only the variable aperture 32, the optical camera lens 31, and the first carrier 331 to move together on the plane XY relative to the housing 334, so as to implement optical image stabilization. If an automatic focusing function is required, a drive structure needs to be added. As a result, a function and an application scope are limited.

Figure 30:
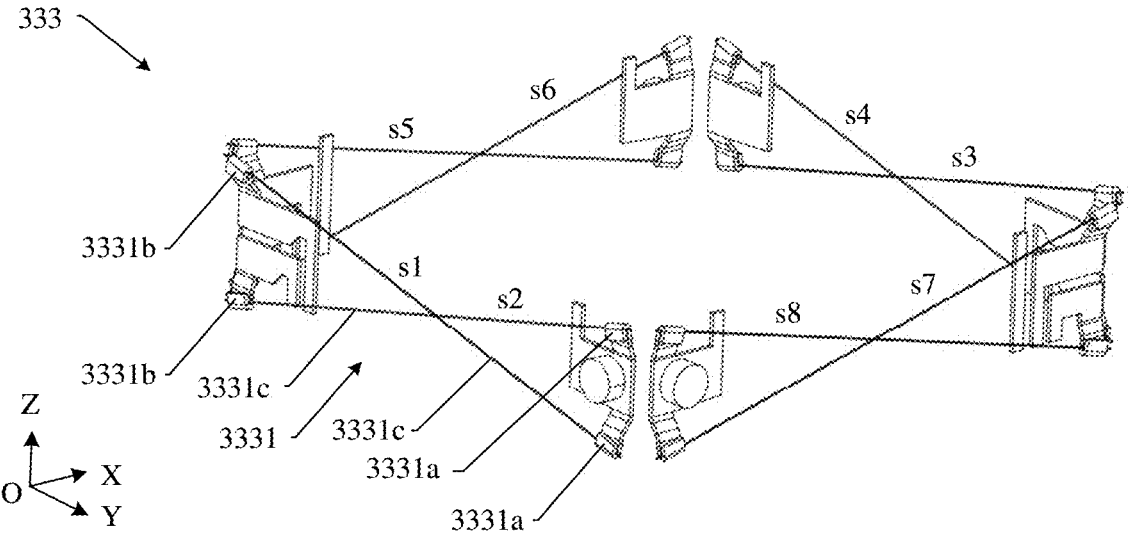
FIG. 30 is a schematic diagram of a structure of a drive assembly in the drive motor shown in FIG. 25.

In some other embodiments, FIG. 30 is a schematic diagram of a structure of the drive assembly 333 in the drive motor 33 shown in FIG. 25. In this embodiment, the drive assembly 333 includes at least four groups of drive units 3331 that are evenly arranged in the circumferential direction of the first carrier 331. There may be four groups, six groups, or eight groups of drive units 3331, or the like. This is not specifically limited herein. In this application, only an example in which there are four groups of drive units 3331 is used for description, and this shall not be considered as a special limitation on this application.

Each group of drive units 3331 includes one pair of movable clamping jaws 3331a, one pair of fixed clamping jaws 3331b, and two SMA wires 3331c.

Figure 31:
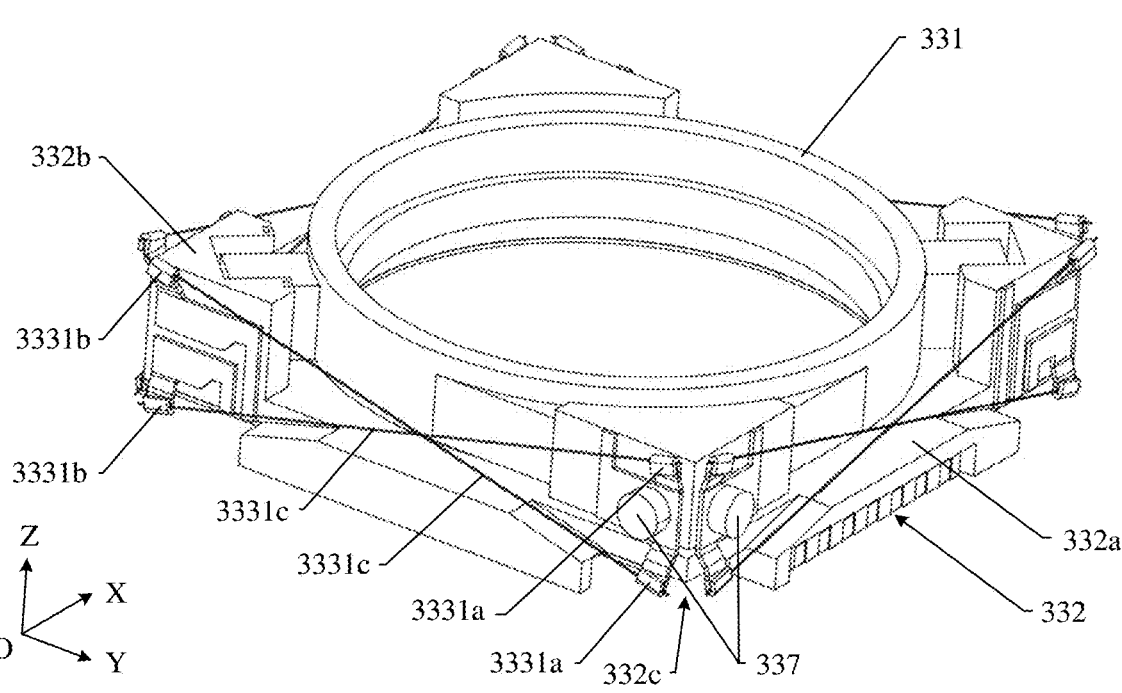
FIG. 31 is an assembly diagram of a first carrier, a base, and a drive assembly in the drive motor shown in FIG. 25.

The pair of movable clamping jaws 3331a includes two movable clamping jaws 3331a. FIG. 31 is an assembly diagram of the first carrier 331, the base 332, and the drive assembly 333 in the drive motor 33 shown in FIG. 25. The two movable clamping jaws 3331a are fastened to the first carrier 331. A material for forming the movable clamping jaw 3331a may be a conductive material or an insulation material. In some embodiments, the material for forming the movable clamping jaw 3331a is a conductive material, for example, metal. In this way, the movable clamping jaw 3331a can be used as a wiring terminal of a first electrode of the SMA wire 3331c, to facilitate wiring of the SMA wire 3331c. The first electrode is one of a positive electrode and a negative electrode.

The pair of fixed clamping jaws 3331b includes two fixed clamping jaws 3331b. Refer to FIG. 31. The two fixed clamping jaws 3331b are fastened to the base 332. Specifically, the two fixed clamping jaws 3331b are fastened to the support column 332b of the base 332. A material for forming the fixed clamping jaw 3331b may be a conductive material or an insulation material. In some embodiments, the material for forming the fixed clamping jaw 3331b is a conductive material, for example, metal. In this way, the fixed clamping jaw 3331b can be used as a wiring terminal of a second electrode of the SMA wire 3331c, to facilitate wiring of the SMA wire 3331c. The second electrode is the other of the positive electrode and the negative electrode.

The two movable clamping jaws 3331a in the pair of movable clamping jaws 3331a are arranged at an interval in the Z-axis direction (namely, the extension direction of the optical axis of the optical camera lens 31). In some embodiments, refer to FIG. 30 and FIG. 31. The two movable clamping jaws 3331a are connected to form a whole. In this way, the drive motor 33 has a simple structural composition, and is convenient to assemble. The two fixed clamping jaws 3331b in the pair of fixed clamping jaws 3331b are also arranged at an interval in the Z-axis direction, and the two fixed clamping jaws 3331b are independent of each other, to separately supply power to the two SMA wires 3331c. The pair of movable clamping jaws 3331a and the pair of fixed clamping jaws 3331b are arranged at an interval in the circumferential direction of the first carrier 331. In addition, pairs of movable clamping jaws 3331a of two adjacent groups of drive units 3331 are disposed adjacently or pairs of fixed clamping jaws 3331b of two adjacent groups of drive units 3331 are disposed adjacently in the circumferential direction of the first carrier 331.

The two SMA wires 3331c are crosswise connected between the pair of movable clamping jaws 3331a and the pair of fixed clamping jaws 3331b. In other words, in the two SMA wires 3331c, one SMA wire 3331c is connected between a movable clamping jaw 3331a close to the variable aperture 32 in FIG. 5 and a fixed clamping jaw 3331b far away from the variable aperture 32. The other SMA wire 3331c is connected between a movable clamping jaw 3331a far away from the variable aperture 32 and a fixed clamping jaw 3331b close to the variable aperture 32.

The SMA wire 3331c is a wire structure made of an SMA. The SMA is a nickel-titanium alloy material, and has features of thermal contraction and cold expansion. When no current is supplied to the SMA wire 3331c, the SMA wire 3331c is in a loose state. When a current flows into the SMA wire 3331c, the SMA wire 3331c converts some electrical energy into thermal energy because of a resistance feature. Further, the SMA wire 3331c contracts under an action of the thermal energy of the SMA wire 3331c, to apply pulling force to the first carrier 331. In this way, the first carrier 331 can be driven to move along a Z axis, so as to implement automatic focusing. In addition, the first carrier 331 can be driven to tilt in any direction around, to implement optical image stabilization.

For example, refer to FIG. 30. The SMA wires 3331c of the four groups of drive units 3331 are respectively recorded as s1, s2, s3, s4, s5, s6, s7, and s8. When the current is supplied to s1, s3, s5, and s7, the first carrier 331 in FIG. 31 may be driven to move upward along the Z axis. When the current is supplied to s2, s4, s6, and s8, the first carrier 331 in FIG. 31 may be driven to move downward along the Z axis. In this way, automatic focusing can be implemented. When the current is supplied to s1, s4, s6, and s7, the first carrier 331 in FIG. 31 may be driven to tilt forward. When the current is supplied to s2, s3, s5, and s8, the first carrier 331 in FIG. 31 may be driven to tilt backward. When the current is supplied to s2, s3, s6, and s7, the first carrier 331 in FIG. 31 may be driven to tilt leftward. When the current is supplied to s1, s4, s5, and s8, the first carrier 331 in FIG. 31 may be driven to tilt rightward. In this way, optical image stabilization can be implemented.

The drive assembly 333 that includes the four groups of drive units 3331 and that is shown in FIG. 30 is an eight-wire SMA drive assembly. The drive assembly has a simple structure, large driving force, and a small volume, can implement both automatic focusing and optical image stabilization, and can further reduce the volume of the camera module 30.

The drive motor 33 further includes a second drive chip (not shown in the figure). The second drive chip is electrically connected to the circuit board 341 of the photosensitive assembly 34 in FIG. 5, and the second drive chip is further electrically connected to the drive assembly 333. The circuit board 341 is configured to send a second power signal and a second control signal to the second drive chip. The second drive chip controls, based on the second power signal and the second control signal, the drive assembly 333 to drive the first carrier 331 to move relative to the base 332, so as to implement automatic focusing and/or optical image stabilization. The second drive chip may be integrated on the circuit board 341, or may be disposed in the housing 334 of the drive motor 33. This is not specifically limited herein. The following electrical connection path of the drive assembly 333 is described by using an example in which the second drive chip is integrated on the circuit board 341, and this shall not indicate that the second drive chip can be integrated only on the circuit board 341.

Figure 32:
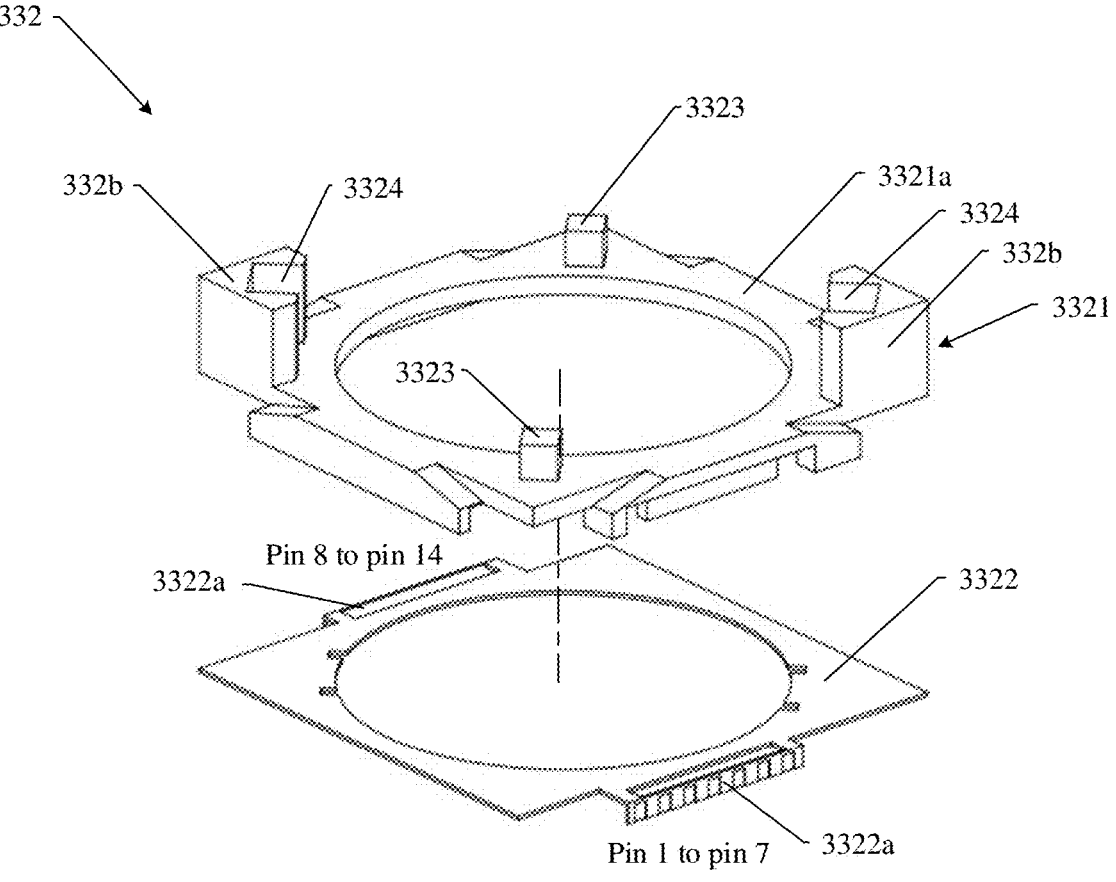
FIG. 32 is an exploded view of a base in the drive motor shown in FIG. 25.

Specifically, in some embodiments, FIG. 32 is an exploded view of the base 332 in the drive motor 33 shown in FIG. 25, to electrically connect the drive assembly 333 to the second drive chip on the circuit board 341. The base 332 includes a base body 3321 and a second electrical connection structure 3322.

The base body 3321 is made of an insulation material, for example, plastic. The base body 3321 includes a substrate part body 3321*a* and the support column 332*b* described above. The support column 332*b* is fastened to a surface that is close to the first carrier 331 in FIG. 25 and that is of the substrate part body 3321*a*. For example, the support column 332*b* is fastened to the substrate part body 3321*a* through adhesive bonding. The support column 332*b* and the substrate part body 3321*a* may be alternatively an integrated structure.

In some embodiments, the second electrical connection structure 3322 may be located on a side that is far away from the support column 332*b* and that is of the substrate part body 3321*a*. The second electrical connection structure 3322 and the substrate part body 3321*a* are stacked and are fastened together in a manner, for example, adhesive bonding, a threaded connection, or insert molding (insert molding). The second electrical connection structure 3322 may be a rigid circuit board, a flexible circuit board, or a flexible-rigid circuit board. The second electrical connection structure 3322 may be an FR-4 dielectric plate, a Rogers (Rogers) dielectric plate, a Rogers and FR-4 hybrid dielectric plate, or the like. In another embodiment, the second electrical connection structure 3322 may be a plurality of conducting wires embedded in the substrate part body 3321*a*.

The second electrical connection structure 3322 and the substrate part body 3321*a* jointly form the substrate part 332*a* described above.

In some embodiments, the second electrical connection structure 3322 may have a golden finger 3322*a*. The second electrical connection structure 3322 is electrically connected to the circuit board 341 of the photosensitive assembly 34 in FIG. 5 by using the golden finger 3322*a*, to introduce a drive current of the second drive chip on the circuit board 341 to the second electrical connection structure 3322 by using the golden finger 3322*a*. In some embodiments, there are two golden fingers 3322*a*. The two golden fingers 3322*a* are respectively located on two opposite edges of the second electrical connection structure 3322. A plurality of pins are disposed on the golden finger 3322*a*. For example, refer to FIG. 32. 14 pins are disposed on the two golden fingers 3322*a* in total. One golden finger 3322*a* has seven pins in total: a pin 1 to a pin 7, and the other golden finger 3322*a* has seven pins in total: a pin 8 to a pin 14. In another embodiment, the second electrical connection structure 3322 may be alternatively electrically connected to the circuit board 341 of the photosensitive assembly 34 in FIG. 5 through a conducting wire.

Relative positions of the second electrical connection structure 3322 and the fixed clamping jaw 3331*b* fastened to the support column 332*b* in FIG. 31 are fixed. The second electrical connection structure 3322 is electrically connected to the eight fixed clamping jaws 3331*b* of the drive assembly 333 in a manner, for example, contact or welding. The second electrical connection structure 3322 separately electrically connects eight pins (for example, the pin 1 to the pin 8) on the golden fingers 3322*a* to the eight fixed clamping jaws 3331*b* in a one-to-one correspondence. In this way, the second electrical connection structure 3322 can introduce the drive current to the eight fixed clamping jaws 3331*b*, and further separately introduce the drive current to the eight SMA wires and the eight movable clamping jaws 3331*a* by using the eight fixed clamping jaws 3331*b*.

On this basis, refer to FIG. 25. The drive motor 33 further includes a first electrical connection structure 335. The first electrical connection structure 335 is connected between the first carrier 331 and the base 332. The first electrical connection structure 335 is configured to lead back drive currents of the eight movable clamping jaws 3331*a* to the golden finger 3322*a* of the second electrical connection structure 3322, so as to further lead back the drive current to the second drive chip on the circuit board 341 by using the golden finger 3322*a*. In this way, an electrical connection loop is formed. Driving of the drive assembly 333 may be implemented by using the electrical connection loop.

Figure 33A:
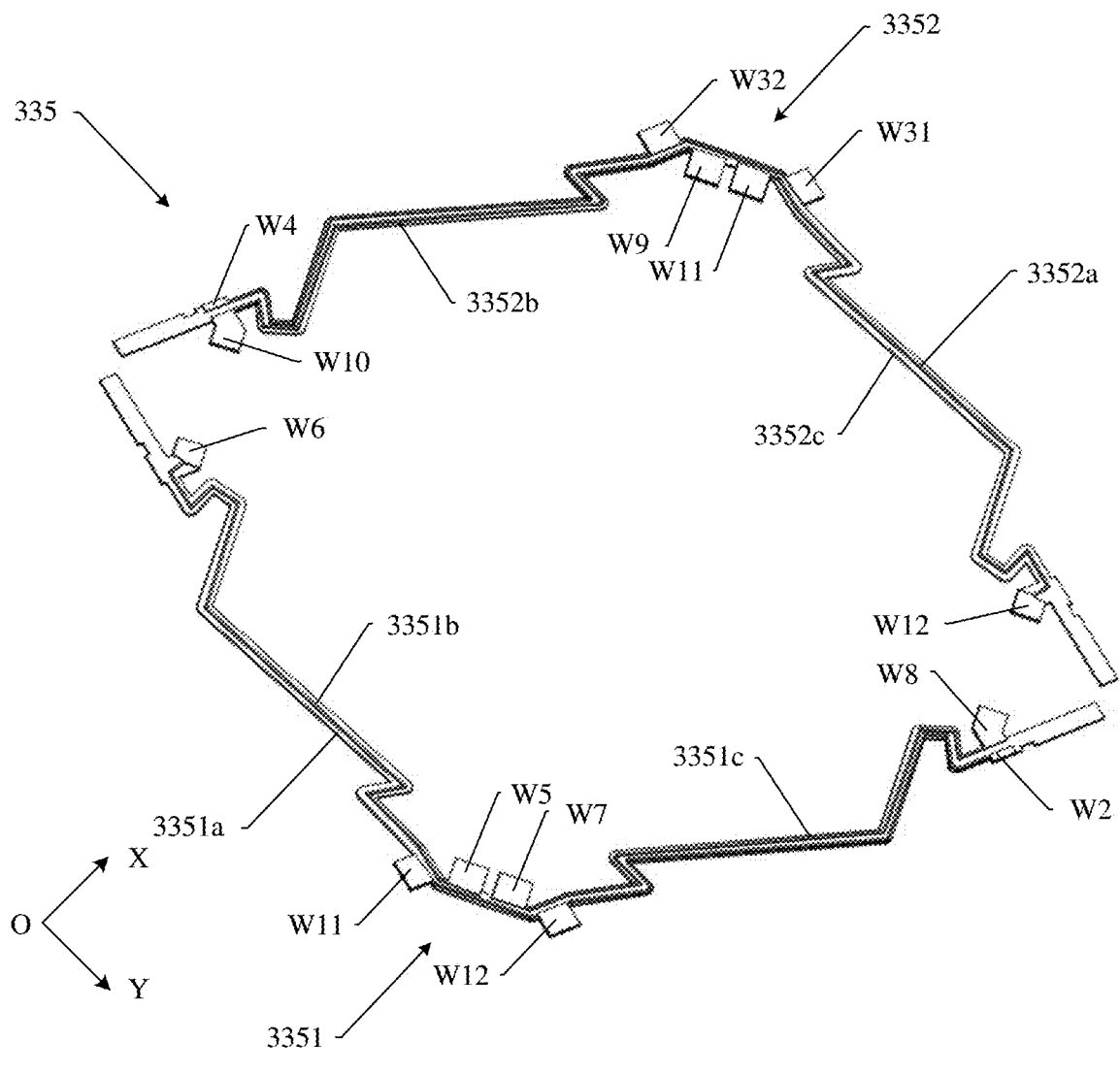
FIG. 33*a* is a schematic diagram of a structure of a first electrical connection structure in the drive motor shown in FIG. 25.
Figure 33B:
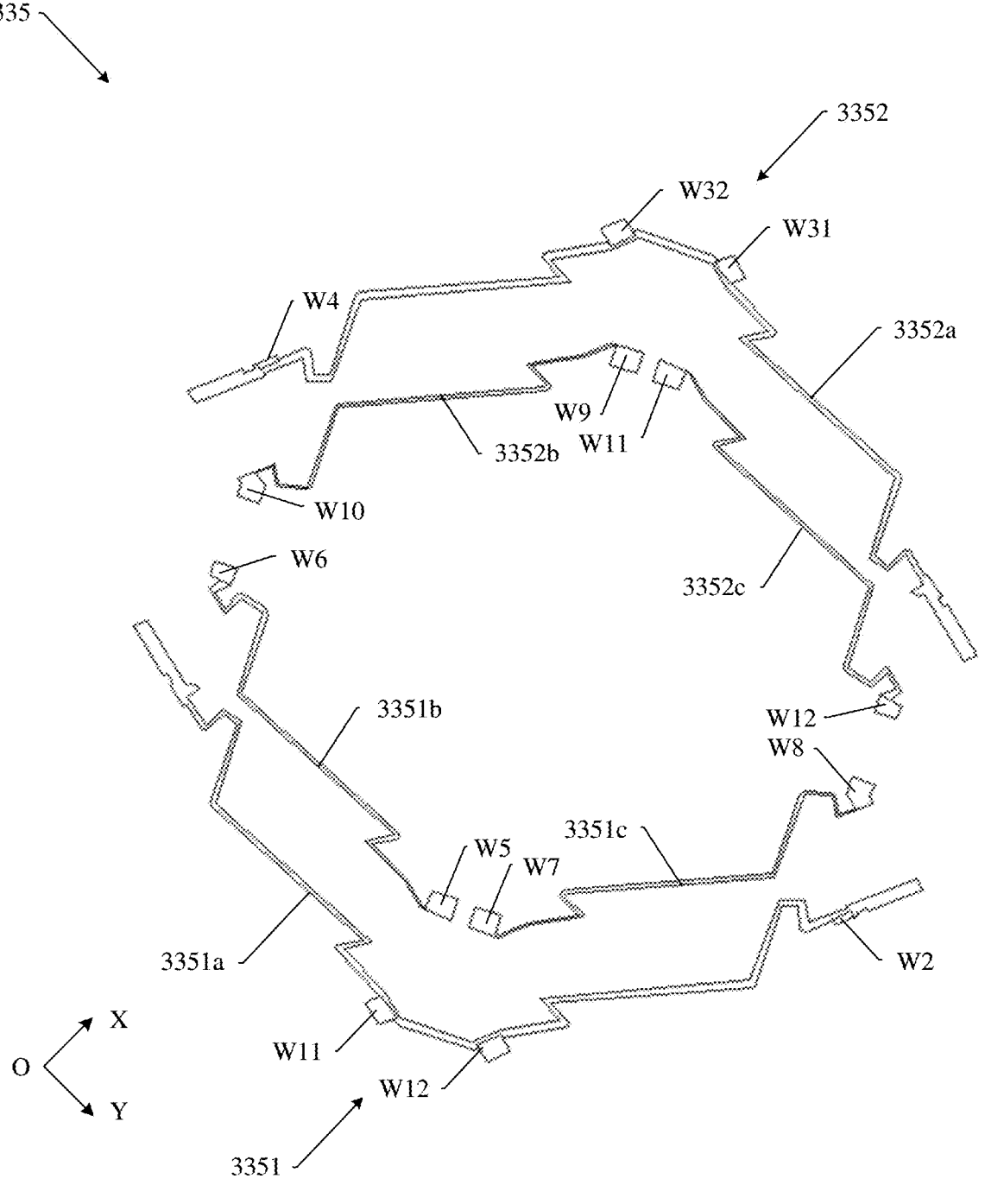
FIG. 33*b* is an exploded view of the first electrical connection structure shown in FIG. 33*a;*

In some embodiments, refer to FIG. 33*a* and FIG. 33*b*. FIG. 33*a* is a schematic diagram of a structure of the first electrical connection structure 335 in the drive motor 33 shown in FIG. 25. FIG. 33*b* is an exploded view of the first electrical connection structure 335 shown in FIG. 33*a*. The first electrical connection structure 335 has an SMA drive line. The SMA drive line includes a first part and a second part. The first part is located on the first carrier 331 and is electrically connected to the movable clamping jaw 3331*a* on the first carrier 331. The second part is located on the base 332.

Figure 34:
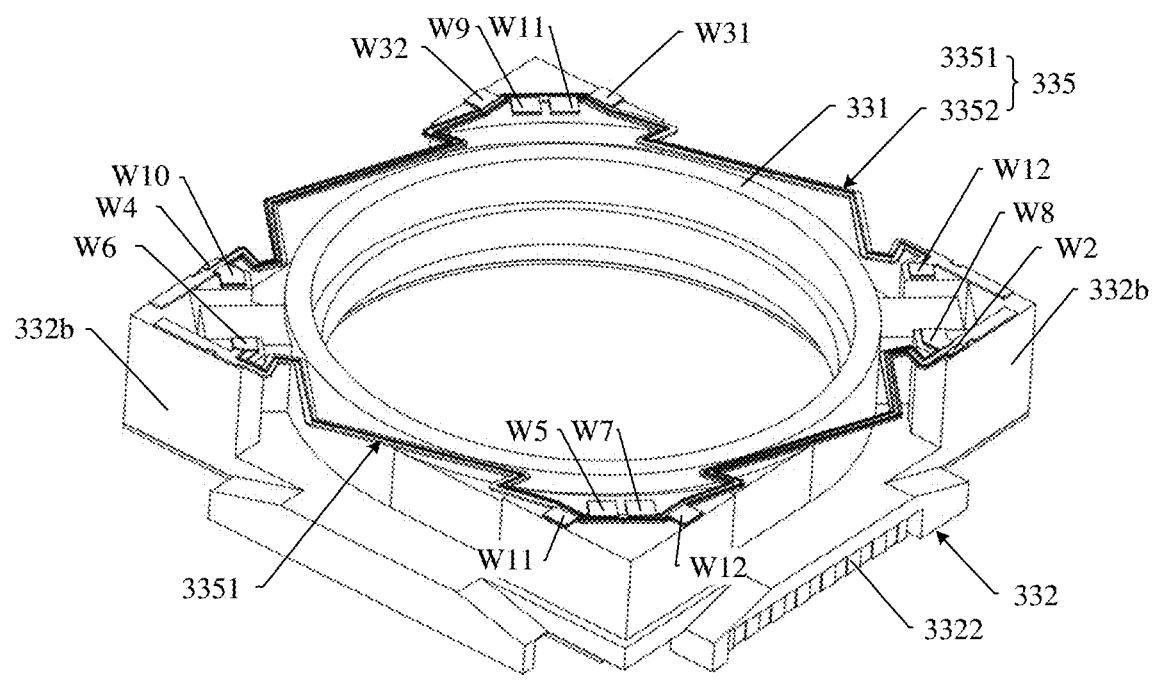
FIG. 34 is an assembly diagram of a first carrier, a base, and a first electrical connection structure in the drive motor shown in FIG. 25.

For example, the drive assembly 333 includes the four groups of drive units 3331. Refer to FIG. 33*a* and FIG. 33*b*. The SMA drive line includes a first electrical connection line 3351*a* and a second electrical connection line 3352*a*. The first electrical connection line 3351*a* has a first place and a second place. The first place of the first electrical connection line 3351*a* is a place at which two terminals W11 and W12 are located. FIG. 34 is an assembly diagram of the first carrier 331, the base 332, and the first electrical connection structure 335 in the drive motor 33 shown in FIG. 25. The first place of the first electrical connection line 3351*a* is fastened to the first carrier 331. The first place of the first electrical connection line 3351*a* is electrically connected to movable clamping jaws 3331*a* of two adjacent groups of drive units 3331 by using the two terminals W11 and W12. The second place of the first electrical connection line 3351*a* is a place at which a terminal W2 is located. The second place of the first electrical connection line 3351*a* is fastened to one support column 332*b*. The second electrical connection line 3352*a* has a first place and a second place. The first place of the second electrical connection line 3352*a* is a place at which two terminals W31 and W32 are located. The first place of the second electrical connection line 3352*a* is electrically connected to movable clamping jaws 3331*a* of other two adjacent groups of drive units 3331 by using the two terminals W31 and W32. The second place of the second electrical connection line 3352*a* is a place at which a terminal W4 is located. The second place of the second electrical connection line 3352*a* is fastened to the other support column 332*b*.

In the foregoing embodiment, the first place of the first electrical connection line 3351*a* and the first place of the second electrical connection line 3352*a* form the first part of the SMA drive line. The second place of the first electrical connection line 3351*a* and the second place of the second electrical connection line 3352*a* form the second part of the SMA drive line.

Figure 35A:
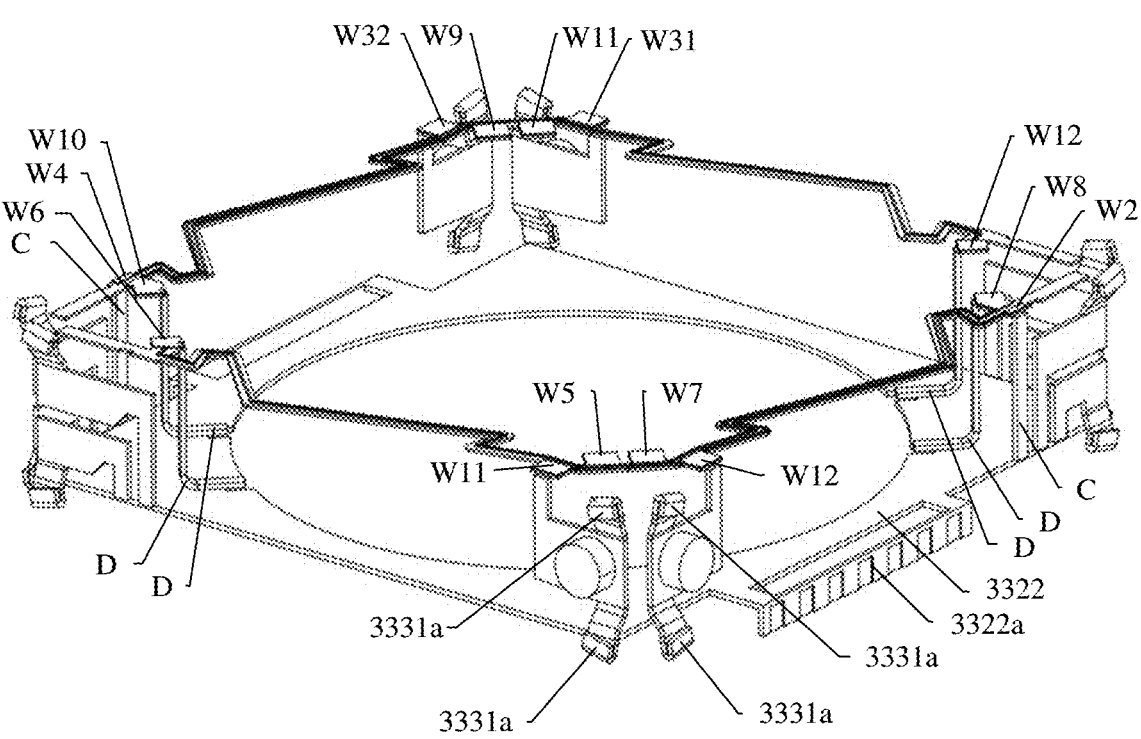
FIG. 35*a* is an assembly diagram of a second electrical connection structure, a drive assembly, and a first electrical connection structure in the drive motor shown in FIG. 25.

Further, FIG. 35*a* is an assembly diagram of the second electrical connection structure 3322, the drive assembly 333, and the first electrical connection structure 335 in the drive motor 33 shown in FIG. 25. The drive motor 33 further includes a first conductive connector C. The first conductive connector C is fastened to the base 332. One end of the first conductive connector C is electrically connected to the second part of the SMA drive line, and the other end of the first conductive connector C is electrically connected to the second electrical connection structure 3322.

For example, refer to FIG. 35*a*. There are two first conductive connectors C. For example, the two first conductive connectors C are respectively disposed on the two support columns 332*b*. One end of one first conductive connector C and one end of the other conductive connector C are electrically connected to the terminal W2 of the first electrical connection line 3351*a* and the terminal W4 of the second electrical connection line 3352*a* respectively. The other end of each of the two first conductive connectors C is electrically connected to the second electrical connection structure 3322.

Further, the second electrical connection structure 3322 electrically connects the first conductive connector C to the pin on the golden finger 3322*a*, to further lead back to the second drive chip on the circuit board 341 by using the golden finger 3322*a*. In this way, an electrical connection loop is formed. For example, the second electrical connection structure 3322 electrically connects the two first conductive connectors C to two pins (for example, a pin 9 and a pin 10) on the golden finger 3322*a*.

In some embodiments, the drive assembly 333 includes the four groups of drive units 3331. Refer to FIG. 33*a* and FIG. 33*b*. The first electrical connection structure 335 includes a first electrical connection unit 3351 and a second electrical connection unit 3352. For example, the first electrical connection unit 3351 and the second electrical connection unit 3352 may be independent of each other. In another example, the first electrical connection unit 3351 and the second electrical connection unit 3352 may be connected to form a whole. The first electrical connection line 3351*a* may be located on the first electrical connection unit 3351, and the second electrical connection line 3352*a* may be located on the second electrical connection unit 3352. In another embodiment, the first electrical connection line 3351*a* may be located on the second electrical connection unit 3352, and the second electrical connection line 3352*a* may be located on the first electrical connection unit 3351.

Refer to FIG. 34. Both the first electrical connection unit 3351 and the second electrical connection unit 3352 are connected between the first carrier 331 and the base 332. In some embodiments, both the first electrical connection unit 3351 and the second electrical connection unit 3352 are long-strip-shaped. The middle parts of the first electrical connection unit 3351 and the second electrical connection unit 3352 are fastened to the first carrier 331. Two ends of each of the first electrical connection unit 3351 and the second electrical connection unit 3352 are respectively fastened to the two support columns 332*b* of the base 332.

Further, in some embodiments, refer to FIG. 33*a* and FIG. 33*b*. The first electrical connection structure 335 further has a variable aperture drive line, to electrically connect the variable aperture 32 to the circuit board 341 of the photosensitive assembly 34 in FIG. 5. The variable aperture drive line has a first part and a second part. The first part of the variable aperture drive line is located on the first carrier 331 and is electrically connected to the variable aperture 32. The second part of the variable aperture drive line is located on the base 332.

For example, refer to 33. The variable aperture drive line includes a third electrical connection line 3351*b*, a fourth electrical connection line 3351*c*, a fifth electrical connection line 3352*b*, and a sixth electrical connection line 3352*c*. The third electrical connection line 3351*b* and the fourth electrical connection line 3351*c* are located on the first electrical connection unit 3351, and are respectively located on two sides of the middle part of the first electrical connection unit 3351. The fifth electrical connection line 3352*b* and the sixth electrical connection line 3352*c* are located on the second electrical connection unit 3352, and are respectively located on two sides of the middle part of the second electrical connection unit 3352.

One end (having a terminal W5) of the third electrical connection line 3351*b*, one end (having a terminal W7) of the fourth electrical connection line 3351*c*, one end (having a terminal W9) of the fifth electrical connection line 3352*b*, and one end (having the terminal W11) of the sixth electrical connection line 3352*c* form the first part of the variable aperture drive line. The other end (having a terminal W6) of the third electrical connection line 3351*b*, the other end (having a terminal W8) of the fourth electrical connection line 3351*c*, the other end (having a terminal W10) of the fifth electrical connection line 3352*b*, and the other end (having the terminal W12) of the sixth electrical connection line 3352*c* form the second part of the variable aperture drive line.

The terminal W5, the terminal W7, the terminal W9, and the terminal W11 are fastened to the first carrier 331. The terminal W6, the terminal W8, the terminal W10, and the terminal W12 are fastened to the base 332. Specifically, the terminal W6 and the terminal W10 are fastened to one support column 332*b* of the base 332, and the terminal W8 and the terminal W12 are fastened to the other support column 332*b* of the base 332.

Figure 35B:
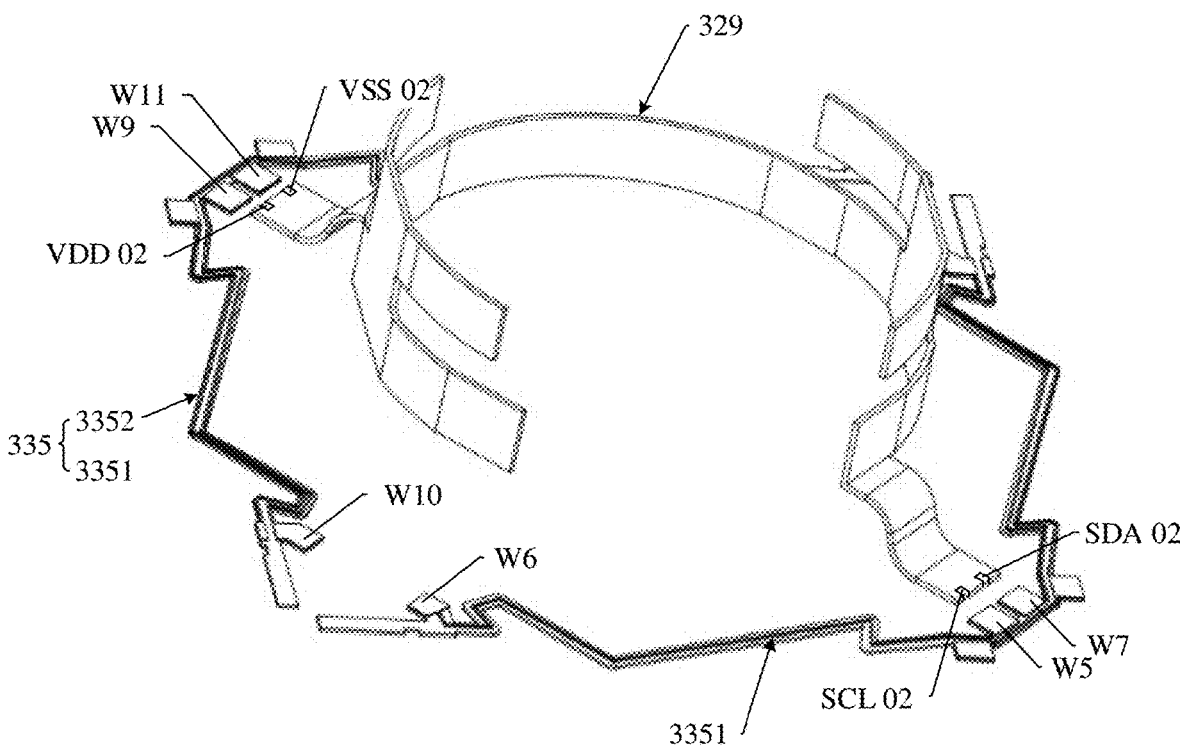
FIG. 35*b* is a schematic diagram of relative positions of a first electrical connection structure in the drive motor shown in FIG. 25 and the third electrical connection structure shown in FIG. 20*b;*

The terminal W5, the terminal W7, the terminal W9, and the terminal W11 are electrically connected to the second power input terminal VSS 02, the second ground input terminal VDD 02, the second serial data terminal SDA 02, and the second serial clock terminal SCL 02 of the third electrical connection structure 329 in FIG. 20*b* in a one-to-one correspondence. For example, FIG. 35*b* is a schematic diagram of relative positions of the first electrical connection structure 335 in the drive motor 33 shown in FIG. 25 and the third electrical connection structure 329 shown in FIG. 20*b*. In this embodiment, the terminal W5 and the terminal W7 may be electrically connected to the second serial data terminal SDA 02 and the second serial clock terminal SCL 02 respectively. The terminal W9 and the terminal W11 may be electrically connected to the second power input terminal VSS 02 and the second ground input terminal VDD 02 respectively. In another embodiment, the terminal W5 and the terminal W7 may be alternatively electrically connected to the second power input terminal VSS 02 and the second ground input terminal VDD 02 respectively. The terminal W9 and the terminal W11 may be alternatively electrically connected to the second serial data terminal SDA 02 and the second serial clock terminal SCL 02 respectively.

Further, refer to FIG. 35*a*. The drive motor 33 further includes a second electrical connector D. The second electrical connector D is fastened to the base 332. For example, the second electrical connector D is fastened to the support column 332*b*. In addition, one end of the second electrical connector D is electrically connected to the second part of the variable aperture drive line. The other end of the second electrical connector D is electrically connected to the second electrical connection structure 3322.

For example, there are four second conductive connectors D. The four second conductive connectors D may be separately fastened to the two support columns 332*b* in FIG. 34. For example, two second conductive connectors D are fastened to one support column 332*b*, and the other two second conductive connectors D are fastened to the other support column 332*b*. One end of one second conductive connector D, one end of another second conductive connector D, one end of still another second conductive connector D, and one end of yet still another second conductive connector D are electrically connected to the terminal W6, the terminal W8, the terminal W10, and the terminal W12 respectively. The other end of each of the four second conductive connectors D is electrically connected to the second electrical connection structure 3322.

Further, the second electrical connection structure 3322 electrically connects the four second conductive connectors D to four pins (for example, a pin 11 to the pin 14) on the golden finger 3322*a*. In this way, the variable aperture 32 can be electrically connected to the circuit board 341 by using the golden finger 3322*a*.

In some embodiments, refer to FIG. 33*a* and FIG. 34. At least parts that are located between the first carrier 331 and the base 332 and that are in the first electrical connection unit 3351 and the second electrical connection unit 3352 each are a flexible structure extending along a curve, to prevent the first electrical connection structure 335 from interfering with relative motion between the first carrier 331 and the base 332. For example, as shown in FIG. 33*a*, a part that is located between W5 and W6 and that is of the first electrical connection unit 3351 and a part that is located between W7 and W8 and that is of the first electrical connection unit 3351 extend along curves. A part that is located between W9 and W10 and that is of the second electrical connection unit 3352 and a part that is located between W11 and W12 and that is of the second electrical connection unit 3352 extends along curves. Specifically, the part may be an FPC, or may be a structure formed by connecting a plurality of conducting wires by using a flexible structure. In addition, an extension line of the part includes but is not limited to a fold wire and a serpentine wire. In this way, when the first carrier 331 is moved relative to the base 332, the part has specific elongation and shortening capabilities. As a result, the first electrical connection structure 335 can be prevented from interfering with relative motion between the first carrier 331 and the base 332.

In some embodiments, refer to FIG. 32. A first position-limiting column and/or a first position-limiting groove are/is further disposed on the surface that is close to the first carrier 331 in FIG. 25 and that is of the substrate part body 3321*a*, to ensure motion stability of the first carrier 331 relative to the base 332. In the embodiment shown in FIG. 32, two first position-limiting columns 3323 and two first position-limiting grooves 3324 are disposed on the surface that is close to the first carrier 331 in FIG. 25 and that is of the substrate part body 3321*a*.

The first position-limiting column 3323 may be in a shape of a square column, a circular column, or a prism. FIG. 32 shows only an example in which the first position-limiting column 3323 is in the shape of the square column. The first position-limiting groove 3324 may be a square groove, a circular groove, or a triangular groove. FIG. 32 shows only an example in which the first position-limiting groove 3324 is a square groove.

The two first position-limiting columns 3323 are disposed along a diagonal of the substrate part body 3321*a*. The two first position-limiting grooves 3324 are disposed along another diagonal of the substrate part body 3321*a*. In addition, the two first position-limiting grooves 3324 are respectively disposed on the two support columns 332*b*.

Figure 36:
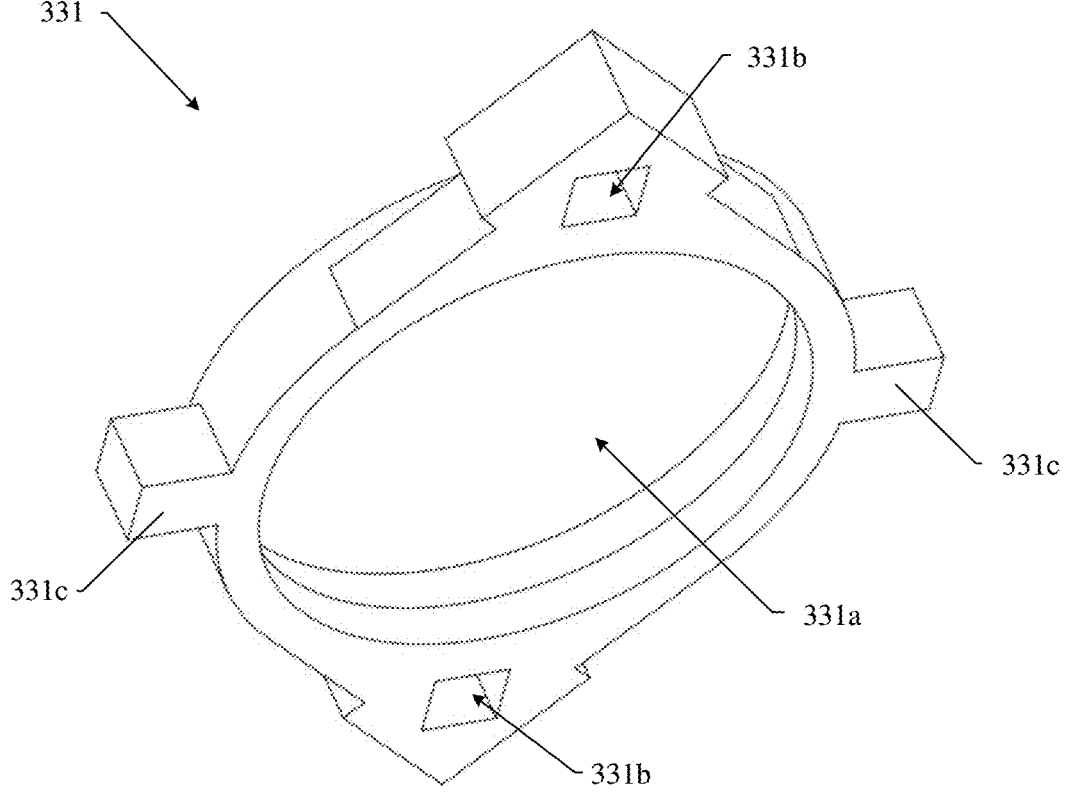
FIG. 36 is a schematic diagram of a structure that is viewed from a side close to a substrate part body and that is of a first carrier in the drive motor shown in FIG. 25.

FIG. 36 is a schematic diagram of a structure that is viewed from a side close to the substrate part body 3321*a* and that is of the first carrier 331 in the drive motor 33 shown in FIG. 25. A second position-limiting groove 331*b* is disposed at a position that corresponds to the first position-limiting column 3323 and that is on the first carrier 331. In some embodiments, a shape of the second position-limiting groove 331*b* matches the shape of the first position-limiting column 3323. In other words, if the second position-limiting groove 331*b* is a square groove, the first position-limiting column 3323 is the square column. If the second position-limiting groove 331*b* is a circular groove, the first position-limiting column 3323 is the circular column. If the second position-limiting groove 331*b* is a triangular groove, the first position-limiting column 3323 is the prism. A second position-limiting column 331*c* is disposed at a position that corresponds to the first position-limiting groove 3324 and that is on the first carrier 331. In some embodiments, a shape of the second position-limiting column 331*c* matches the shape of the first position-limiting groove 3324.

Figure 37:
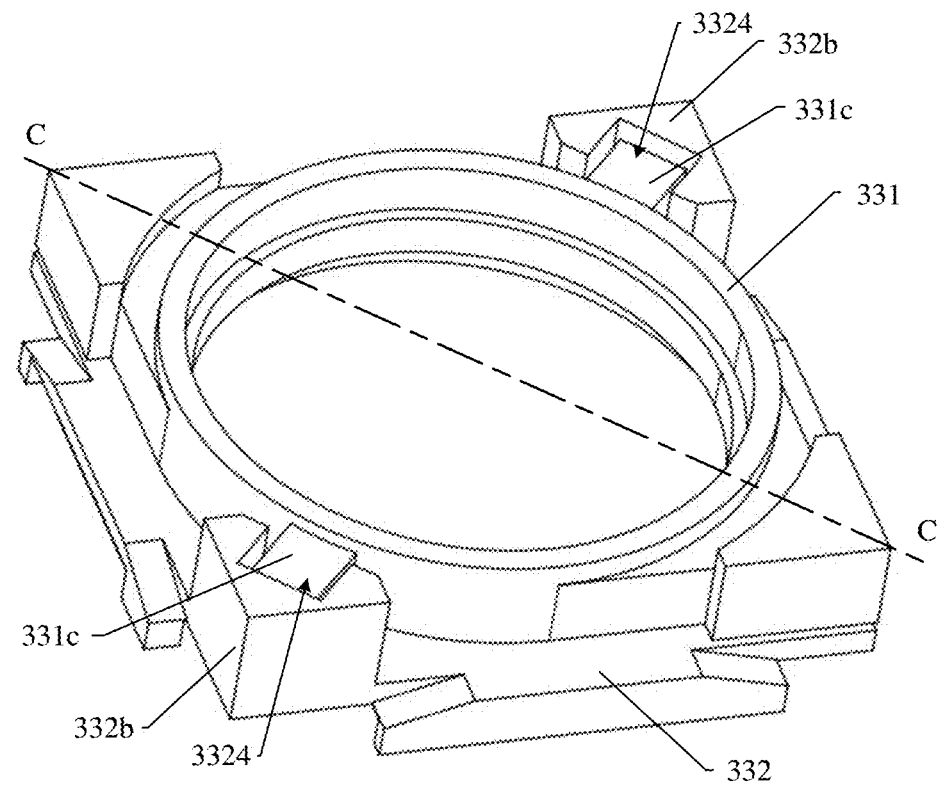
FIG. 37 is an assembly diagram of a first carrier and a base in the drive motor shown in FIG. 25.
Figure 38:
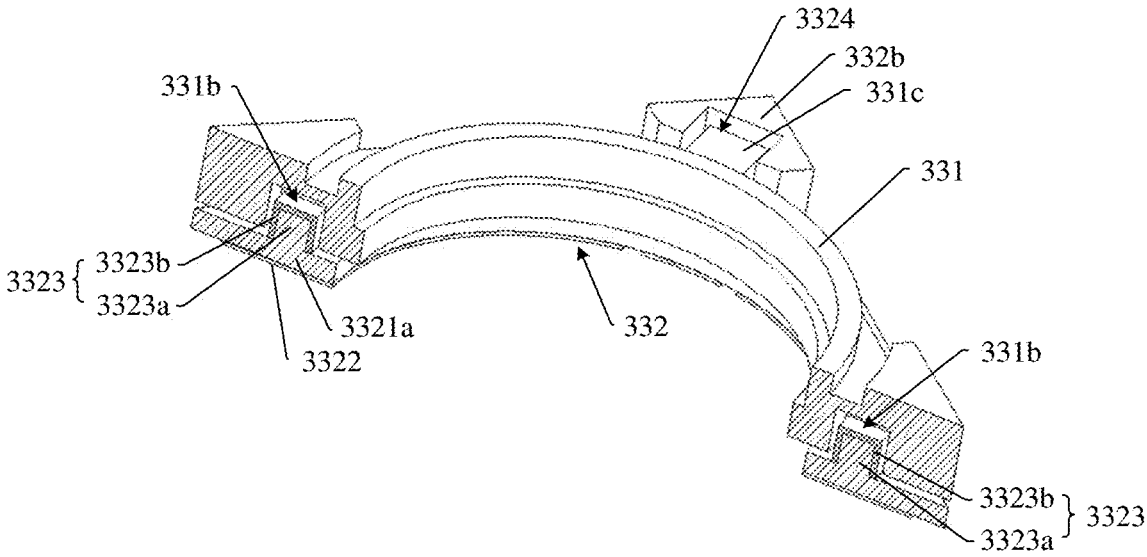
FIG. 38 is a three-dimensional sectional view of the assembly diagram shown in FIG. 37 along a line C-C.

Refer to FIG. 37 and FIG. 38. FIG. 37 is an assembly diagram of the first carrier 331 and the base 332 in the drive motor 33 shown in FIG. 25. FIG. 38 is a three-dimensional sectional view of the assembly diagram shown in FIG. 37 along a line C-C. The first position-limiting column 3323 is located in the second position-limiting groove 331*b*. The second position-limiting column 331*c* is located in the first position-limiting groove 3324. There are a gap between the first position-limiting column 3323 and an inner wall of the second position-limiting groove 331*b* and a gap between the second position-limiting column 331*c* and an inner wall of the first position-limiting groove 3324. The gaps enable the first carrier 331 to move close to the substrate part body 3321*a* of the base 332 in the Z-axis direction, and tilt in any direction around, so as to implement automatic focusing and optical image stabilization. When the first carrier 331 is moved close to the substrate part body 3321*a* for a specific distance or tilts to the any direction around by a specific angle, the first position-limiting column 3323 and the first position-limiting groove 3324 can stop the first carrier 331, to limit a maximum distance and a maximum tilt angle for and by which the first carrier 331 is moved close to the substrate part body 3321*a*.

A material of the first position-limiting column 3323 may be a rigid material, for example, plastic or metal, or may be a soft elastic material, for example, rubber or silica gel, or may include both a rigid material and a soft elastic material. Because the first carrier 331 carries the optical camera lens 31 and the variable aperture 32, a load of the first carrier 331 is large. When the first carrier 331 is stopped by using the first position-limiting column 3323 and the first position-limiting groove 3324, the first carrier 331 has large impact force for the first position-limiting column 3323 and the first position-limiting groove 3324. As a result, dust is likely to fall due to impact. The falling dust is likely to enter the optical path and affect the shooting quality.

In some embodiments, still refer to FIG. 37 and FIG. 38. The first position-limiting column 3323 includes an inner core 3323a and a cladding 3323b, to resolve the foregoing problem. The inner core 3323a is made of a rigid material. The inner core 3323a is fastened to the substrate part body 3321a. For example, the inner core 3323a may be fastened to the substrate part body 3321a through adhesive bonding. The inner core 3323a and the substrate part body 3321a may be alternatively an integrated structure. The cladding 3323b is made of a soft elastic material, for example, rubber or silicon gel. The cladding 3323b wraps and is fastened to a circumference of a side wall and the top wall of the inner core 3323a. For example, the cladding 3323b may be fastened to the inner core 3323a through adhesive bonding. The cladding 3323b may be alternatively molded on the inner core 3323a. In other words, the cladding 3323b and the inner core 3323a are an integral mechanical component.

In this way, the cladding 3323b is used for buffering, so that generation of a fragment under impact of the first carrier 331 can be avoided, to prevent an impurity from entering the optical path and affecting the shooting quality. In addition, the soft elastic material is used for buffering, so that a service life of the first position-limiting column 3323 can be prolonged.

It should be noted that the second position-limiting column 331c may also include a rigid inner core and an elastic cladding. Details are not described herein.

Figure 39:
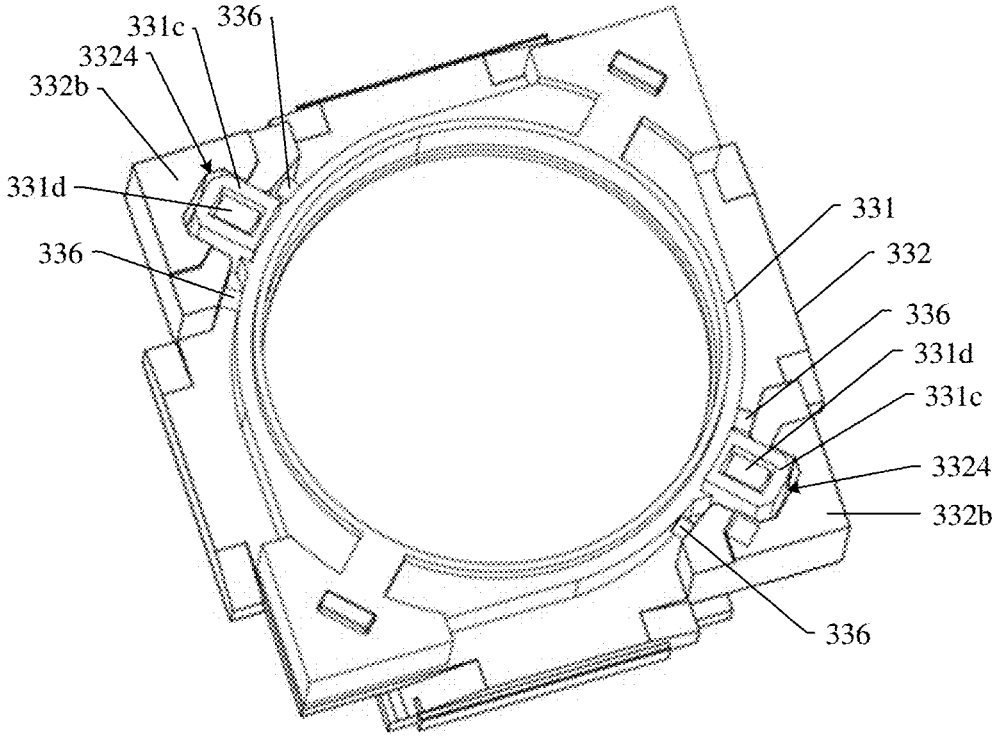
FIG. 39 is an assembly diagram of a first carrier and a base in a drive motor according to some other embodiments of this application.
Figure 40:
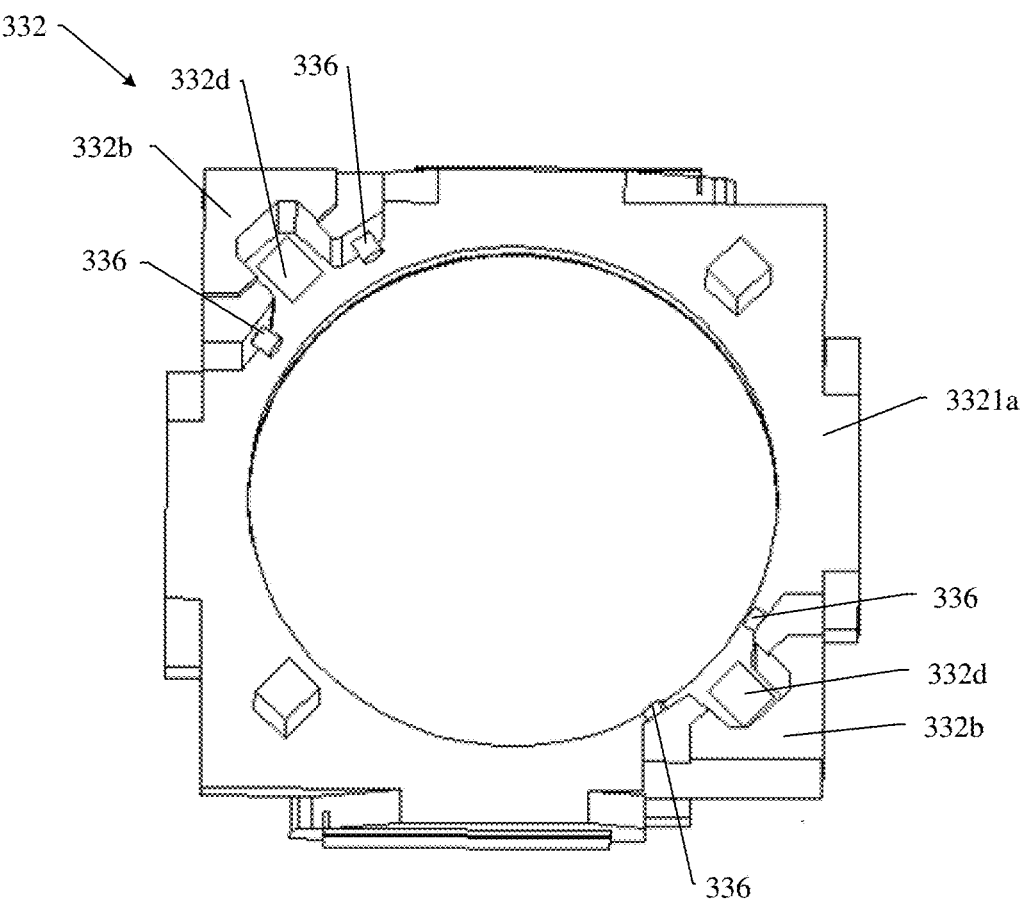
FIG. 40 is a schematic diagram of a structure of the base in the assembly diagram shown in FIG. 39.

FIG. 39 is an assembly diagram of the first carrier 331 and the base 332 in the drive motor 33 according to some other embodiments of this application, to further avoid generation of the fragment due to impact wear between the first carrier 331 and the base 332. In this embodiment, a first soft elastic material 336 is disposed in a gap between the first carrier 331 and the support column 332b. In some embodiments, there are four first soft elastic materials 336. Two first soft elastic materials 336 are disposed in a gap between the first carrier 331 and one support column 332b, and the other two first soft elastic materials 336 are disposed in a gap between the first carrier 331 and the other support column 332b. The first soft elastic material 336 is fastened to one of the first carrier 331 and the support column 332b. FIG. 40 is a schematic diagram of a structure of the base 332 in the assembly diagram shown in FIG. 39. In this example, the first soft elastic material 336 is fastened to the support column 332b. Optionally, the first soft elastic material 336 may be fastened to the support column 332b through adhesive bonding. The first soft elastic material 336 may be alternatively molded on the support column 332b. In other words, the first soft elastic material 336 and the support column 332b are an integral mechanical component.

In this way, the first soft elastic material 336 is used for buffering, so that generation of the fragment under impact of the first carrier 331 can be further avoided, to prevent the impurity from entering the optical path and affecting the shooting quality. In addition, the soft elastic material is used for buffering, so that the service life of the support column 332b can be prolonged.

In some embodiments, refer to FIG. 39. A second magnet 331d is fastened to the first carrier 331, to fix relative positions of the first carrier 331 and the base 332 when the drive assembly 333 does not work, so as to prevent noise or the fragment generated due to a collision between the first carrier 331 and the base 332 and a collision between the first carrier 331 and the housing 334. For example, there are two second magnets 331d. The two second magnets 331d are respectively fastened to the two second position-limiting columns 331c. Refer to FIG. 40. A second magnetic plate 332d is fastened to the base 332. Specifically, the second magnetic plate 332d is fastened to the substrate part body 3321a. For example, the second magnetic plate 332d may be fastened to the substrate part body 3321a through adhesive bonding. The second magnetic plate 332d may be alternatively molded on the substrate part body 3321a by using an in-mold injection molding technology. In some embodiments, there are two second magnetic plates 332d. The two second magnetic plates 332d are respectively opposite to the two second magnets 331d. Magnetic attraction force is generated between the two second magnets 331d and the two second magnetic plates 332d. When the drive assembly 333 does not work, the magnetic attraction force can fix the relative positions of the first carrier 331 and the base 332. When the drive assembly 333 works, driving force applied by the drive assembly 333 to the first carrier 331 can overcome the magnetic attraction force, to implement automatic focusing and optical image stabilization. In another embodiment, the second magnet 331d is fastened to the base 332, and the second magnetic plate 332d is fastened to the base 332.

Refer to FIG. 31. A second soft elastic material 337 is disposed in a gap between the movable clamping jaw 3331a and the housing 334 in FIG. 25, to avoid the fragment generated due to impact wear between the movable clamping jaw 3331a and the housing 334. In some embodiments, there are four second soft elastic materials 337. The four second soft elastic materials 337 are separately located between the movable clamping jaws 3331a of the four groups of drive units 3331 and the housing 334. The second soft elastic material 337 is fastened to one of the movable clamping jaw 3331a and the housing 334. For example, refer to FIG. 31. The second soft elastic material 337 is fastened to the movable clamping jaw 3331a. Optionally, the second soft elastic material 337 may be fastened to the movable clamping jaw 3331a through adhesive bonding. The second soft elastic material 337 may be alternatively molded on the movable clamping jaw 3331a. In other words, the second soft elastic material 337 and the movable clamping jaw 3331a are an integral mechanical component.

In this way, when the first carrier 331 is moved, impact wear between the movable clamping jaw 3331a on the first carrier 331 and an inner wall of the housing 334 can be reduced by using the second soft elastic material 337. This helps ensure the shooting quality and prolong the service life of the camera module 30.

In some embodiments, refer to FIG. 25. An avoidance notch 332c is disposed at a position that corresponds to the movable clamping jaw 3331a in FIG. 30 and that is on an edge of the base 332, to reduce a height of the drive motor 33 in the Z-axis direction. Refer to FIG. 31. The movable clamping jaw 3331a of the drive assembly 333 extends into the avoidance notch 332c. In some embodiments, there are two avoidance notches 332c. The two avoidance notches 332c are disposed along a diagonal. In the four groups of drive units 3331, movable clamping jaws 3331a of two adjacent groups of drive units 3331 sink into one avoidance notch 332c, and movable clamping jaws 3331a of other two adjacent groups of drive units 3331 sink into the other avoidance notch 332c. In this way, the height of the drive motor 33 in the Z-axis direction can be reduced.

Refer to FIG. 4 and FIG. 5. The photosensitive assembly 34 is located on a light output side of the optical camera lens 31 in FIG. 5. Refer to FIG. 6. The light output side of the optical camera lens 31 is a side that is far away from the light input surface 31*a* of the optical camera lens 31 and that is of the light output surface 31*b* of the optical camera lens 31. The photosensitive assembly 34 is fastened to the drive motor 33 in FIG. 5. Specifically, refer to FIG. 28. The photosensitive assembly 34 is fastened to the housing 334 of the drive motor 33.

Figure 41:
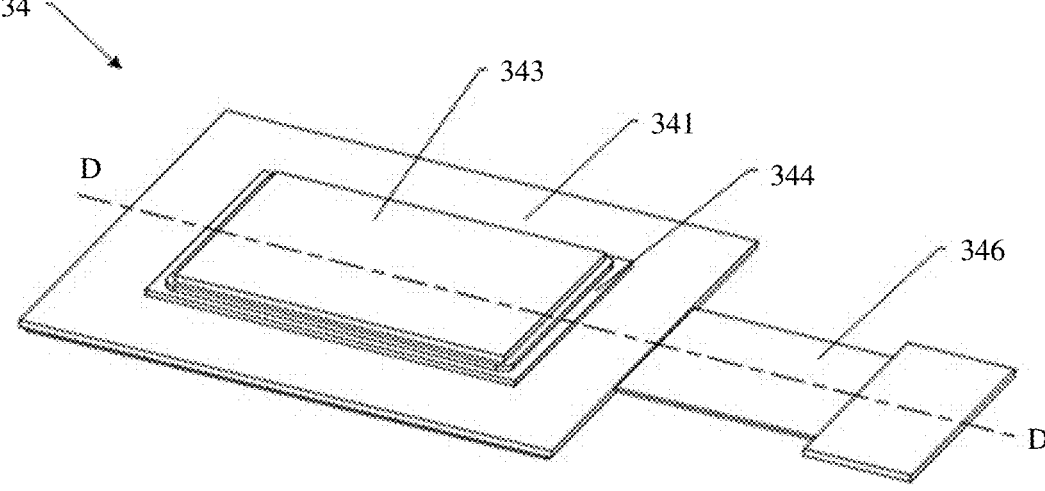
FIG. 41 is a schematic diagram of a structure of a photosensitive assembly in the camera module shown in FIG. 4 and FIG. 5.
Figure 42:
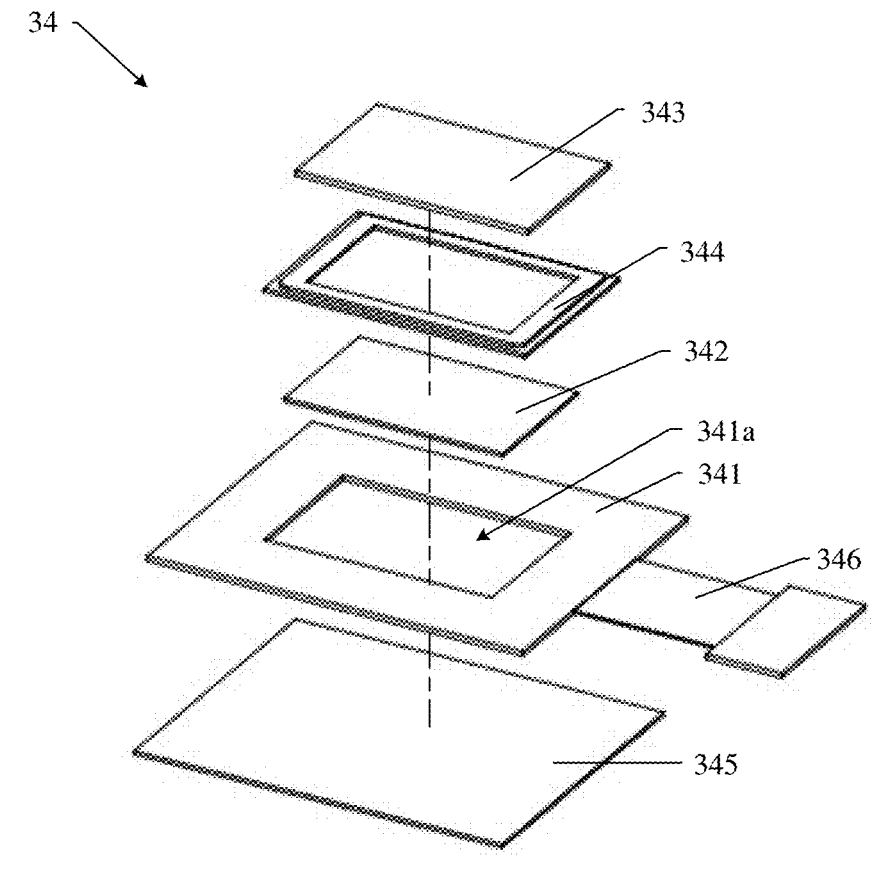
FIG. 42 is an exploded view of the photosensitive assembly shown in FIG. 41.

Refer to FIG. 41 and FIG. 42. FIG. 41 is a schematic diagram of a structure of the photosensitive assembly 34 in the camera module 30 shown in FIG. 4 and FIG. 5. FIG. 42 is an exploded view of the photosensitive assembly 34 shown in FIG. 41. The photosensitive assembly 34 includes a circuit board 341, an image sensor 342, a light filter 343, a holder 344, a reinforcement plate 345, and a third electrical connection structure 346.

It may be understood that FIG. 41 and FIG. 42 merely show, as an example, some components included in the photosensitive assembly 34, and actual shapes, actual sizes, actual positions, and actual structures of these components are not limited by FIG. 41 and FIG. 42. In some other examples, the photosensitive assembly 34 may alternatively include no light filter 343, holder 344, and reinforcement plate 345.

The circuit board 341 may be a rigid circuit board, a flexible circuit board, or a flexible-rigid circuit board. The circuit board 341 may be an FR-4 dielectric plate, a Rogers (Rogers) dielectric plate, a Rogers and FR-4 hybrid dielectric plate, or the like. The photosensitive assembly 34 is fastened to the drive motor 33 in FIG. 5 by using the circuit board 341. For example, the circuit board 341 may be fastened to the drive motor 33 in FIG. 5 in a manner of adhesive bonding. The circuit board 341 may be alternatively fastened to the drive motor 33 in FIG. 5 in a manner of a threaded connection.

The golden finger 3322*a* of the base 332 shown in FIG. 32 is electrically connected to the circuit board 341. When the first drive chip 327 in FIG. 8 and the second drive chip are integrated on the circuit board 341, the first drive chip 327 and the second drive chip may be a same chip or different chips. This is not specifically limited herein. The camera module is electrically connected to the computing control unit 41 in FIG. 3 by using the circuit board 341, to implement communication with the computing control unit 41.

Figure 43:
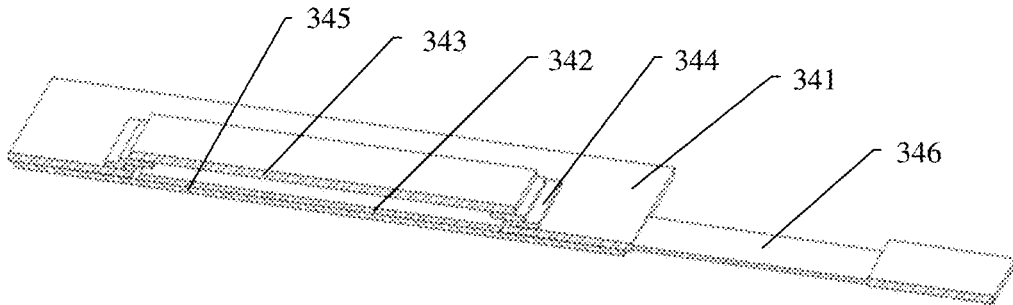
FIG. 43 is a three-dimensional sectional view of the photosensitive assembly shown in FIG. 41 along a line D-D.

The image sensor 342 may also be referred to as a photosensitive chip or a photosensitive element. The image sensor 342 is disposed on the circuit board 341. In some embodiments, refer to FIG. 42. A mounting opening 341*a* is disposed on the circuit board 341. FIG. 43 is a three-dimensional sectional view of the photosensitive assembly 34 shown in FIG. 41 along a line D-D. The image sensor 342 is embedded in and fastened to the mounting opening 341*a*. In this way, the height of the camera module in the Z-axis direction can be reduced. A photosensitive surface of the image sensor 342 is opposite to the light outlet surface 31*b* of the optical camera lens 31 shown in FIG. 6. The image sensor 342 is configured to: collect scene light passing through the optical camera lens 31, and convert image information carried in the scene light into an electrical signal.

The light filter 343 is located between the photosensitive surface of the image sensor 342 and the light outlet surface 31*b* of the optical camera lens 31. In addition, the light filter 343 is fastened to the circuit board 341 by using the holder

344. Specifically, the holder 344 is fastened to the circuit board 341 in a manner, for example, adhesive bonding, clamping, or a threaded connection. The light filter 343 is fastened to the holder 344 in a manner, for example, adhesive bonding, clamping, or a threaded connection.

The light filter 343 may be configured to filter out stray light of the scene light passing through the optical camera lens 31, so as to ensure that an image taken by the camera module 30 has better definition. The light filter 343 includes but is not limited to a blue glass light filter. For example, the light filter 343 may be alternatively a reflective infrared filter or a dual-pass filter. The dual-pass filter may enable both visible light and infrared light in the scene light to pass through, or enable both visible light and light of another specific wavelength (for example, ultraviolet light) in the scene light to pass through, or enable both infrared light and light of another specific wavelength (for example, ultraviolet light) to pass through.

The reinforcement plate 345 is located on a side that is far away from the optical camera lens 31 shown in FIG. 6 and that is of the circuit board 341. The reinforcement plate 345 and the circuit board 341 are stacked and are fastened together in a manner, for example, adhesive bonding, a threaded connection, or clamping. The reinforcement plate 345 may be a steel plate, an aluminum plate, or the like. The reinforcement plate 345 can improve overall strength of the circuit board 341. In another embodiment, the circuit board 341 may include no reinforcement plate 345.

The third electrical connection structure 346 is configured to lead out a circuit of the circuit board 341. One end of the third electrical connection structure 346 is connected to the circuit board 341, and the other end of the third electrical connection structure 346 is connected to the mainboard 40 in FIG. 2 and FIG. 3, so that the circuit board 341 is electrically connected to the computing control unit 41 on the mainboard 40. The third electrical connection structure 346 includes but is not limited to an FPC.

Figure 44:
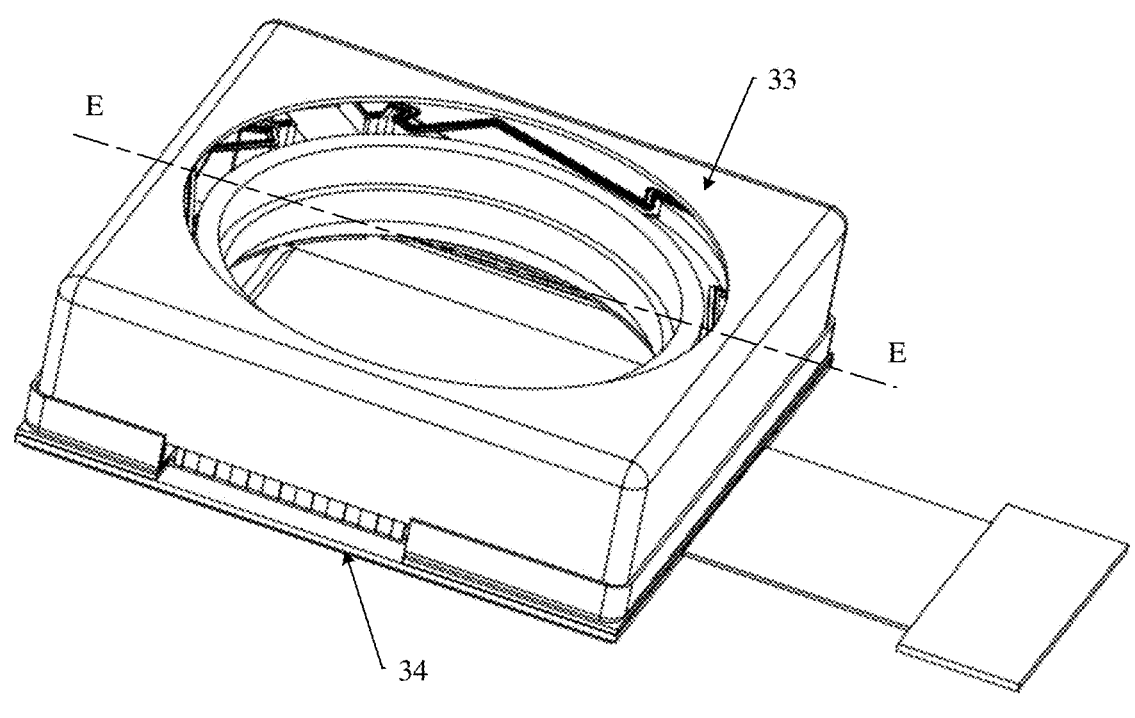
FIG. 44 is an assembly diagram of a drive motor and a photosensitive assembly in the camera module shown in FIG. 5.
Figure 45:
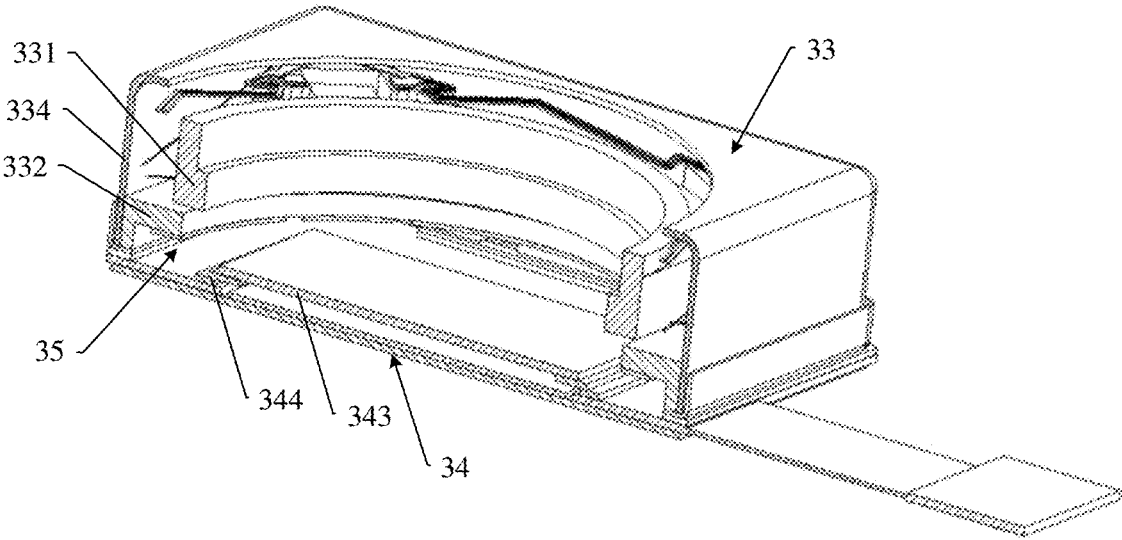
FIG. 45 is a three-dimensional sectional view of the assembly diagram shown in FIG. 44 along a line E-E.

Further, in some embodiments, refer to FIG. 44 and FIG. 45. FIG. 44 is an assembly diagram of the drive motor 33 and the photosensitive assembly 34 in the camera module 30 shown in FIG. 5, and FIG. 45 is a three-dimensional sectional view of the assembly diagram shown in FIG. 44 along a line E-E, to reduce the height of the camera module in the Z-axis direction. A sunken groove 35 is disposed on a surface that is close to the photosensitive assembly 34 and that is of the base 332. An avoidance opening is disposed on a wall plate that is close to the photosensitive assembly 34 and that is of the housing 334. The avoidance opening 36 is opposite to the sunken groove 35. In other words, an orthographic projection of the sunken groove 35 in the avoidance opening 36 overlaps or partially overlaps the avoidance opening. The light filter 343 and the holder 344 of the photosensitive assembly 34 is sleeved in the avoidance opening, and are accommodated in the sunken groove 35. In this way, the height of the camera module 30 in the Z-axis direction can be reduced.

In the descriptions of this specification, the described specific features, structures, materials, or characteristics may be combined in an appropriate manner in any one or more of embodiments or examples.

Finally, it should be noted that the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of this application.

What is claimed is:

1. A camera module, comprising:
an optical camera lens;
a variable aperture, comprising a case, a second carrier, and a plurality of blades, wherein each blade of the plurality of blades is rotatably connected to the case by a respective rotation shaft that is fastened to the case, and the case covers a sidewall of the second carrier between a surface of the second carrier that is closest to the plurality of blades and a surface of the second carrier that faces away from the plurality of blades; and
a shape memory alloy (SMA) motor,
wherein:
　relative positions of the variable aperture and the optical camera lens are fixed,
　the variable aperture has an aperture hole with an adjustable size,
　the aperture hole is located on a light inlet side of the optical camera lens, and
　the aperture hole is opposite to a light inlet surface of the optical camera lens, and
wherein:
　the SMA motor comprises a first carrier, a base, and an SMA drive assembly,
　the optical camera lens is fastened to the first carrier,
　the SMA drive assembly is connected between the first carrier and the base,
　the SMA drive assembly is configured to drive the first carrier, the optical camera lens, and the variable aperture to move together relative to the base to implement automatic focusing or optical image stabilization, and
　the case of the variable aperture is mounted on a step surface of the optical camera lens.

2. The camera module according to claim 1, wherein:
the variable aperture further comprises a drive apparatus,
relative positions of the case and the optical camera lens are fixed,
the second carrier is rotatably connected to the case,
a rotation axis of the second carrier is collinear with a central axis of the aperture hole,
the plurality of blades is disposed in a circumferential direction of the second carrier,
the plurality of blades form the aperture hole through enclosure,
each blade is slidably connected to the second carrier,
the drive apparatus is connected between the second carrier and the case, and
the drive apparatus is configured to drive the second carrier to rotate relative to the case, and to drive each blade to rotate relative to the case and slide relative to the second carrier, to change an aperture of the aperture hole.

3. The camera module according to claim 2, wherein:
each blade comprises a first part, a second part, and a third part that are connected in sequence,
the first part of each blade is rotatably connected to the case, the second part of each blade is slidably connected to the second carrier, and the third parts of the plurality of blades form the aperture hole through enclosure, and
when being rotated relative to the case, the second carrier drives the first parts of the plurality of blades to rotate relative to the case and the second parts of the plurality of blades to slide relative to the second carrier, to change the aperture of the aperture hole formed by the third parts of the plurality of blades through enclosure.

4. The camera module according to claim 2, wherein:
the drive apparatus comprises at least one actuator,
the at least one actuator comprises one first magnet and one coil,
the first magnet is fastened to the second carrier,
the coil is fastened to the case, and
the first magnet is opposite to the coil.

5. The camera module according to claim 4, wherein:
a magnetization direction of the first magnet is a radial direction of the second carrier, and
a plane on which at least one coil is located is parallel to the rotation axis of the second carrier.

6. The camera module according to claim 4, wherein:
a magnetization direction of the first magnet is parallel to the rotation axis of the second carrier, and
a plane on which at least one coil is located is perpendicular to the rotation axis of the second carrier.

7. The camera module according to claim 2, wherein:
the drive apparatus comprises at least one actuator,
the at least one actuator comprises one first magnet and a plurality of coils,
the first magnet is fastened to the second carrier,
the plurality of coils are fastened to the case,
the plurality of coils are arranged along an arc-shaped track line,
a circle center line corresponding to the arc-shaped track line is collinear with the rotation axis of the second carrier, and
the first magnet is opposite to more than two adjacent coils of the plurality of coils.

8. The camera module according to claim 2, wherein:
the variable aperture further comprises a first magnetic plate, and
the first magnetic plate is fastened to the case.

9. The camera module according to claim 1, wherein:
the SMA drive assembly comprises at least four groups of drive units,
the at least four groups of drive units are evenly arranged around a circumferential direction of the first carrier,
each group of the at least four groups of drive units comprises one pair of movable clamping jaws, one pair of fixed clamping jaws, and one set of two SMA wires,
a pair of movable clamping jaws of a first group of the at least four groups of drive units is fastened to the first carrier,
a pair of fixed clamping jaws of the first group of the at least four groups of drive units is fastened to the base,
the pair of movable clamping jaws and the pair of fixed clamping jaws are arranged at an interval in the circumferential direction of the first carrier,
the pair of movable clamping jaws are arranged in an extension direction of an optical axis of the optical camera lens,
the pair of fixed clamping jaws are arranged in the extension direction of the optical axis of the optical camera lens,
a first set of two SMA wires of the sets of two SMA wires are crosswise connected between the pair of movable clamping jaws and the pair of fixed clamping jaws, and
pairs of movable clamping jaws of two adjacent groups of drive units are disposed adjacently or pairs of fixed clamping jaws of two adjacent groups of drive units are disposed adjacently in the circumferential direction of the first carrier.

10. The camera module according to claim 9, wherein:
the base comprises a second electrical connection structure,
the second electrical connection structure is electrically connected to a fixed clamping jaw of the pairs of fixed clamping jaws of the at least four groups of drive units of the SMA drive assembly,
the SMA motor further comprises a first electrical connection structure and a first electrical connector C,
the first electrical connection structure is connected between the first carrier and the base,
the first electrical connection structure comprises an SMA drive line,
a first part of the SMA drive line that is located on the first carrier is electrically connected to the movable clamping jaw on the first carrier,
a second part of the SMA drive line that is located on the base is electrically connected to a first end of the first electrical connector C,
the first electrical connector C is fastened to the base, and
a second end of the first electrical connector C is electrically connected to the second electrical connection structure.

11. The camera module according to claim 10, wherein:
the SMA drive assembly comprises four groups of drive units of the at least four groups of drive units,
the SMA drive line comprises a first electrical connection line and a second electrical connection line,
the SMA motor further comprises another first electrical connector C, so that the SMA motor comprises two first electrical connectors C;
a first part of the first electrical connection line that is located on the first carrier is electrically connected to the pairs movable clamping jaws of the two adjacent groups of drive units of the at least four groups of drive units,
a second part of the first electrical connection line that is located on the base is electrically connected to one end of one of the two first electrical connectors C; and
a third part located on the first carrier and of the second electrical connection line is electrically connected to another pair of movable clamping jaws of two adjacent groups of drive units,
a fourth part located on the base and of the second electrical connection line is electrically connected to one end of the other first electrical connector C, and the other end of each of the two first electrical connectors C is electrically connected to the second electrical connection structure.

12. The camera module according to claim 11, wherein:
the first electrical connection structure comprises a first electrical connection unit and a second electrical connection unit,
both of the first electrical connection unit and the second electrical connection unit are long-strip-shaped,
middle parts of the first electrical connection unit and the second electrical connection unit are fastened to the first carrier,
two ends of each of the first electrical connection unit and the second electrical connection unit are fastened to the base, and the first electrical connection line and the second electrical connection line are respectively located on the first electrical connection unit and the second electrical connection unit.

13. The camera module according to claim 12, wherein:
the first electrical connection structure further has a variable aperture drive line,
a fifth part located on the first carrier and of the variable aperture drive line is electrically connected to the variable aperture,
the SMA motor further comprises a second electrical connector D,
the second electrical connector D is fastened to the base,
one end of the second electrical connector D is electrically connected to a sixth part located on the base and of the variable aperture drive line, and
the other end of the second electrical connector D is electrically connected to the second electrical connection structure.

14. The camera module according to claim 12, wherein parts located between the first carrier and the base and that are in the first electrical connection unit and the second electrical connection unit each are a flexible structure extending along a curve.

15. The camera module according to claim 10, further comprising a photosensitive assembly, and wherein:
the photosensitive assembly comprises a circuit board,
the circuit board is located on a light output side of the optical camera lens,
the circuit board and the base of the SMA motor are fastened relative to each other, and
the second electrical connection structure is electrically connected to the circuit board.

16. The camera module according to claim 15, wherein:
the photosensitive assembly further comprises an image sensor, a light filter, and a holder,
the image sensor is disposed on the circuit board,
a photosensitive surface of the image sensor faces a light output surface of the optical camera lens,
the light filter is located between the optical camera lens and the image sensor, and
the light filter is fastened to the circuit board by using the holder.

17. The camera module according to claim 16, wherein:
a sunken groove is disposed on a surface close to the photosensitive assembly and of the base, and
the light filter and the holder are located in the sunken groove.

18. The camera module according to claim 9, wherein:
an avoidance notch is disposed at a position corresponding to a movable clamping jaw of the pairs of movable clamping jaws of the at least four groups of drive units of the SMA drive assembly and that is on an edge of the base, and
the movable clamping jaw extends into the avoidance notch.

19. The camera module according to claim 1, wherein:
a second magnet is disposed on the first carrier,
a second magnetic plate is disposed on the base, and
the second magnet and the second magnetic plate are disposed opposite to each other.

20. An electronic device, comprising:
a computing controller; and
a camera module electrically connected to the computing controller and comprising:
an optical camera lens;

a variable aperture, comprising a case, a second carrier, and a plurality of blades, wherein each blade of the plurality of blades is rotatably connected to the case by a respective rotation shaft that is fastened to the case, and the case covers a sidewall of the second carrier between a surface of the second carrier that is closest to the plurality of blades and a surface of the second carrier that faces away from the plurality of blades; and a shape memory alloy (SMA) motor, wherein:

relative positions of the variable aperture and the optical camera lens are fixed, the variable aperture has an aperture hole whose size is adjustable, the aperture hole is located on a light inlet side of the optical camera lens, and the aperture hole is opposite to a light inlet surface of the optical camera lens, and wherein:

the SMA motor comprises a first carrier, a base, and an SMA drive assembly, the optical camera lens is fastened to the first carrier, the SMA drive assembly is connected between the first carrier and the base, the SMA drive assembly is configured to drive the first carrier, the optical camera lens, and the variable aperture to move together relative to the base to implement automatic focusing or optical image stabilization, and the case of the variable aperture is mounted on a step surface of the optical camera lens.

\* \* \* \* \*